United States Patent
De Vera et al.

(10) Patent No.: US 12,478,628 B2
(45) Date of Patent: Nov. 25, 2025

(54) GERM CELL NUCLEAR FACTOR LIGANDS AND METHODS OF USE THEREOF

(71) Applicants: Saint Louis University, St. Louis, MO (US); UNIVERSITY OF HEALTH SCIENCES AND PHARMACY IN ST. LOUIS, St. Louis, MO (US)

(72) Inventors: Ian Mitchelle Sayo De Vera, St. Louis, MO (US); Udayanga Sumith Wanninayake, Valley Park, MO (US); Tom Burriss, St. Louis, MO (US); Kristine Griffett, St. Louis, MO (US)

(73) Assignees: Saint Louis University, St. Louis, MO (US); University of Health Sciences and Pharmacy in St. Louis, St. Louis, MO (US)

( * ) Notice: Subject to any disclaimer, the term of this patent is extended or adjusted under 35 U.S.C. 154(b) by 265 days.

(21) Appl. No.: 17/486,695

(22) Filed: Sep. 27, 2021

(65) Prior Publication Data
US 2022/0110942 A1 Apr. 14, 2022

Related U.S. Application Data

(60) Provisional application No. 63/083,227, filed on Sep. 25, 2020.

(51) Int. Cl.
| | | |
|---|---|---|
| *A61K 31/5377* | (2006.01) | |
| *A61K 31/352* | (2006.01) | |
| *A61K 31/404* | (2006.01) | |
| *A61K 31/438* | (2006.01) | |
| *A61K 31/472* | (2006.01) | |
| *A61K 31/517* | (2006.01) | |
| *C12N 5/074* | (2010.01) | |

(52) U.S. Cl.
CPC ........ *A61K 31/5377* (2013.01); *A61K 31/352* (2013.01); *A61K 31/404* (2013.01); *A61K 31/438* (2013.01); *A61K 31/472* (2013.01); *A61K 31/517* (2013.01); *C12N 5/0696* (2013.01); *C12N 2501/38* (2013.01)

(58) Field of Classification Search
None
See application file for complete search history.

(56) References Cited

FOREIGN PATENT DOCUMENTS

| | | | | |
|---|---|---|---|---|
| GB | 937725 | * | 9/1963 | |
| WO | WO-2012009258 A2 | * | 1/2012 | ........... C07C 271/22 |
| WO | WO-2015157125 A1 | * | 10/2015 | ........... A61K 31/505 |

OTHER PUBLICATIONS

Louridas et al. "Galanin is highly expressed in bone marrow mesenchymal stem cells and facilitates migration of cells both in vitro and in vivo." Biophysical Research Communications. 390(3):867-871. (Year: 2009).*
Ouvry et al. ACS Medicinal Chemistry Letters (2019), 10(11), 1561-1567. (Year: 2019).*
Pubchem CID 45497495 entered Jun. 21, 2010 (Year: 2010).*
Pubchem CID 45497485 entered Jun. 21, 2010 (Year: 2010).*
Bulut-Karslioglu et al. Nature 540, 119-123 (2016) (Year: 2016).*
Akamatsu et al., "Suppression of Oct4 by Germ Cell Nuclear Factor Restricts Pluripotency and Promotes Neural Stem Cell Development in the Early Neural Lineage", *J Neurosci*, 29(7):2113-2124, 2009.
Anandakrishnan et al., "H++ 3.0: automating pK prediction and the preparation of biomolecular structures for atomistic molecular modeling and simulations", *Nucleic Acids Res*, 40(Web Server issue):W537-541, 2012.
Bramlett et al., "A Natural Product Ligand of the Oxysterol Receptor, Liver X Receptor", *J Pharmacol Exp Ther*, 307(1):291-296, 2003.
Case et al., "The Amber Biomolecular Simulation Programs", *J Comput Chem*, 26(16):1668-1688, 2005.
Chung et al., "Loss of orphan nuclear receptor GCNF function disrupts forebrain development an the establishment of the isthmic organizer", *Dev Biol*, 293(1):13-24, 2006.
Chung et al., "Loss of orphan receptor germ cell nuclear factor function results in ectopic development of the tail bud and a novel posterior truncation", *Mol Cell Biol*, 21(2):663-77, 2001.
Cooney et al., "Germ Cell Nuclear Factor Is a Response Element-Specific Repressor of Transcription", *Biochem Biophys Res Commun*, 245(1):94-100, 1998.
Fernandopulle et al., "Transcription Factor-Mediated Differentiation of Human iPSCs into Neurons", *Current Protocols in Cell Biology*, 79:e51, 2018.
Friesner et al., "Glide: a new approach for rapid, accurate docking and scoring. 1. Method and assessment of docking accuracy", *J Med Chem*, 47(7):1739-1749, 2004.
Friesner et al.,"Extra precision glide: docking and scoring incorporating a model of hydrophobic enclosure for protein-ligand complexes", *J Med Chem*, 49(21):6177-6196, 2006.

(Continued)

*Primary Examiner* — Jeffrey S Lundgren
*Assistant Examiner* — Michael J Schmitt
(74) *Attorney, Agent, or Firm* — pH IP Law

(57) ABSTRACT

In some aspects, the present disclosure provides germ cell nuclear factor ligands of the formula:

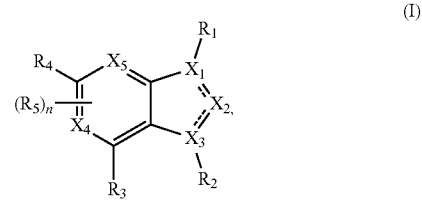

wherein the variables are defined herein, as well as pharmaceutical compositions and methods of use thereof. Also provided are cell cultures and cell culture media comprising the GNCF ligands of the present disclosure as well as methods of use thereof.

18 Claims, 13 Drawing Sheets

Specification includes a Sequence Listing.

(56) References Cited

OTHER PUBLICATIONS

Fuhrmann et al., "Mouse germline restriction of Oct4 expression by germ cell nuclear factor", *Dev Cell*, 1(3):377-387, 2001.

Greschik et al., "Characterization of the DNA-Binding and Dimerization Properties of the Nuclear Orphan Receptor Germ Cell Nuclear Factor", *Mol Cell Biol*, 19(1):690-703, 1999.

Griffett et al., "A Liver-Selective LXR Inverse Agonist That Suppresses Hepatic Steatosis", *ACS Chem Biol*, 8(3):559-567, 2012.

Griffett et al., "The Orphan Nuclear Receptor TXL Is a Receptor for Synthetic and Natural Retinoids", *Cell Chemical Biology*, 27:1272-1284, 2020.

Gu et al., "Orphan Nuclear Receptor GCNF Is Required for the Repression of Pluripotency Genes during Retinoic Acid-Induced Embryonic Stem Cell Differentiation", *Mol Cell Biol*, 25(19):8507-8519, 2005.

Gu et al., "Orphan Nuclear Receptor LRH-1 Is Required to Maintain Oct4 Expression at the Epiblast Stage of Embryonic Development", *Mol Cell Biol*, 25(9):3492-3505, 2005.

Halgren, "Identifying and Characterizing Binding Sites and Assessing Druggability", *J Chem Inf Model*, 49(2):377-389, 2009.

Hamelberg et al., "Accelerated molecular dynamics: a promising and efficient simulation method for biomolecules", *J Chem Phys*, 120(24):11919-11929, 2004.

Hopkins et al., "Long-Time_Step Molecular Dynamics through Hydrogen Mass Repartitioning", *J Chem Theory Comput*, 11(4):1864-1874, 2015.

Jorgensen et al., "Comparison of simple potential functions for simulating liquid water", *J. Chem. Phys.*, 79:926-935, 1983.

Joung & Cheatham, "Molecular Dynamics Simulations of the Dynamic and Energetic Properties of Alkali and Halide Ions Using Water-Model-Specific Ion Parameters", *J Phys Chem B*, 113(40):13279-13290, 2009.

Kelley et al., "The Phyre2 web portal for protein modeling, prediction and analysis", *Nat Protoc*, 10(6):845-858, 2015.

Kleckner et al., "An introduction to NMR-based approaches for measuring protein dynamics", *Biochim Biophys Acta*, 1814(8):942-968, 2011.

Mehta et al., "Characterization of the Expression of the Retinoid-related, Testis-associated Receptor (RTR) in Trophoblasts", *Placenta*, 23(4):281-287, 2002.

Millecamps & Julien, "Axonal transport deficites and neurodegenerative diseases", *Nat. Rev. Neurosci.*, 14(3):161-176, 2013.

Niesen et al., "The use of differential scanning fluorimetry to detect ligand interactions that promote protein stability", *Nat Protoc*, 2(9):2212-2221, 2007.

Roe & Cheatham, "PTRAJ and CPPTRAJ: Software for Processing and Analysis of Molecular Dynamics Trajectory Data", *J Chem Theory Comput*, 9(7):3084-3095, 2013.

Sattler et al., "The Expression Level of the Orphan Nuclear Receptor GCNF (Germ Cell Nuclear Factor) Is Critical for Neuronal Differentiation", *Mol Endocrinol*, 18(11):2714-2726, 2004.

Savkur et al., "Alternative splicing within the ligand binding domain of the human constitutive androstane receptor", *Mol Genet Metab*, 80(1-2):216-226, 2003.

Schlaepfer and Joshi, "CPT1A-mediated Fat Oxidation, Mechanisms, and Therapeutic Potential", *Endocrinology*, 161(2), 2020.

Solt et al., "Regulation of Circadian Behavior and Metabolism by Synthetic REV-ERB Agonists", *Nature*, 485(7396):62-68, 2012.

Takao et al., ß-Catenin up-regulates Nanog expression through interaction with Oct-3/4 in embryonic stem cells, *Biochem Biophys Res Commun*, 353(3):699-705, 2007.

Thomas et al., "A Chemical Switch Regulates Fibrate Specificity for Peroxisome Proliferator-activated Receptor α (PPARα) Versus Liver X Receptor", *J Biol Chem*, 278(4):2403-2410, 2002.

Tosney & Landmesser, "Development of the major pathways for neurite outgrowth in the chick hindlimb", *Developmental Biology*, 109(1):193-214, 1985.

Wang, et al., "Epigenetic reprogramming of the germ cell nuclear factor gene is required for proper differentiation of induced pluripotent cells", *Stem Cells* 2013, *31* (12), 2659-2666.

Wang et al., "Germ Cell Nuclear Factor (GCNF) Represses Oct4 Expression and Globally Modulates Gene Expression in Human Embryonic Stem (hES) Cells", *J Biol Chem* 2016, *291* (16), 8644-52.

Wang, et al., "NR6A1 regulates lipid metabolism through mammalian target of rapamycin complex 1 in HepG2 cells", *Cell Communication and Signaling* 2019, *17* (77), 1-12.

Wass, et al., "3DLigandSite: predicting ligand-binding sites using similar structures", *Nucleic Acids Res* 2010, *38* (Web Server issue), W469-73.

Weikum, et al., "Ortlund, E. A., A Structural Investigation into Oct4 Regulation by Orphan Nuclear Receptors, Germ Cell Nuclear Factor (GCNF), and Liver Receptor Homolog-1 (LRH-1)", *J Mol Biol* 2016, *428* (24 Pt B), 4981-4992.

Wu, et al., "Ligand and coactivator identity determines the requirement of the charge clamp for coactivation of the peroxisome proliferator-activated receptor gamma", *Journal of Biological Chemistry* 2003, *278* (10), 8637-8644.

Xiang, Z., "Advances in homology protein structure modeling", *Curr Protein Pept Sci* 2006, *7* (3), 217-27.

Yan, Z.; Jetten, A. M., "Characterization of the repressor function of the nuclear orphan receptor retinoid receptor-related testis-associated receptor/germ cell nuclear factor", *J Biol Chem* 2000, *275* (45), 35077-85.

Yang, et al., "Transcriptional regulation of human Oct4 by steroidogenic factor-1", *J Cell Biochem* 2007, *101* (5), 1198-209.

* cited by examiner

A

B

C

D

GERM CELL NUCLEAR FACTOR LIGANDS AND METHODS OF USE THEREOF

This application claims the benefit of priority to U.S. Provisional Application No. 63/083,227, filed on Sep. 25, 2020, the entire contents of which are hereby incorporated by reference.

BACKGROUND

1. Field

This disclosure relates to the fields of medicine, biology, and pharmacology. In particular, the present disclosure relates to pharmaceutical compositions, cell culture media, and cell cultures comprising ligands for germ cell nuclear factor (GCNF) as well as methods of using said ligands in the prevention and/or treatment of diseases, such as cancer. The present disclosure also relates to methods of using said GCNF ligands in maintaining induced pluripotent stem cells (iPSCs). The present disclosure further relates to methods of modulating GCNF using GCNF ligands.

2. Related Art

Germ cell nuclear factor (GCNF), also known as RTR or NR6A1, is an orphan nuclear receptor (NR) involved in regulating early embryonic development and reproduction. In embryonic stem (ES) cells, GCNF is a positive determinant of pluripotency being downregulated by the differentiating agent, all trans retinoic acid (RA). In adults, GCNF mRNA tissue specific expression is limited to ovary and testis. Mammary glands contain very low amounts of GCNF, which are generally upregulated in breast cancer. This suggests that NR6A1 may be endowed with oncogenic properties in breast cancer. Furthermore, human Cripto-1 (CR-1), which plays a critical role in the pathogenesis of human cancer, is suppressed by GCNF in embryonal carcinoma cells and in breast cancer cells.

In the absence of a ligand, GCNF is a transcriptional repressor that decreases Oct4 expression during retinoic acid (RA) differentiation by binding as a dimer to DR0 response elements. Pluripotent cell types owe their pluripotency to a primary axis composed of Oct4, Sox2 and Nanog. These transcription factors promote pluripotency through formation of complexes that directly regulate expression of genes that promote induced pluripotent stem cell (iPSC) self-renewal. Repression of target gene expression by GCNF is found to be mediated by interaction with the corepressors NCOR and SMRT. As such, there is a need for GCNF ligands that may be used as anticancer drugs or for the maintenance of iPSCs.

SUMMARY

In some aspects, the present disclosure provides pharmaceutical compositions comprising:
(A) a compound of the formula;

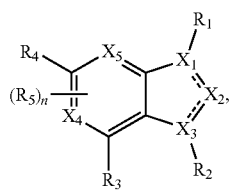

(I)

wherein:
n is 0, 1, or 2;
$R_1$ and $R_2$ are each independently absent, hydrogen, or -$L_1$-$R_a$, wherein:
$L_1$ is a covalent bond, —C(O)—, —S(O)$_2$—, -alkanediyl$_{(C\leq 6)}$—C(O)—, substituted -alkanediyl$_{(C\leq 6)}$—C(O)—, -alkanediyl$_{(C\leq 6)}$—S(O)$_2$—, or substituted -alkanediyl$_{(C\leq 6)}$—S(O)$_2$—;
$R_a$ is alkyl$_{(C\leq 12)}$, aryl$_{(C\leq 12)}$, heteroaryl$_{(C\leq 12)}$, acyl$_{(C\leq 12)}$, amido$_{(C\leq 12)}$, or
a substituted version of any of these groups; or
a group of the formula:

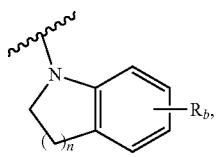

wherein:
n is 1 or 2;
$R_b$ is amino, halo, hydrogen, or hydroxy; or
alkyl$_{(C\leq 12)}$, alkylamino$_{(C\leq 12)}$, dialkylamino$_{(C\leq 12)}$, alkoxy$_{(C\leq 12)}$, or a substituted version of any of these groups;
$R_3$ is hydrogen; or
alkyl$_{(C\leq 12)}$, cycloalkyl$_{(C\leq 12)}$, heterocycloalkyl$_{(C\leq 12)}$, or a substituted version of any of these groups;
$R_4$ is amino, halo, hydrogen, or hydroxy; or
alkyl$_{(C\leq 12)}$, alkylamino$_{(C\leq 12)}$, dialkylamino$_{(C\leq 12)}$, alkoxy$_{(C\leq 12)}$, —NH-aralkyl$_{(C\leq 12)}$, —NH-heteroaralkyl$_{(C\leq 12)}$, —O-aralkyl$_{(C\leq 12)}$, —O-heteroaralkyl$_{(C\leq 12)}$, or a substituted version of any of these groups;
$R_5$ is, in each instance independently, amino, halo, or hydroxy; or
alkyl$_{(C\leq 12)}$, alkylamino$_{(C\leq 12)}$, dialkylamino$_{(C\leq 12)}$, alkoxy$_{(C\leq 12)}$, or a substituted version of any of these groups; and
$X_1$, $X_2$, $X_3$, $X_4$, and $X_5$ are each independently N or CH;
or a compound of the formula:

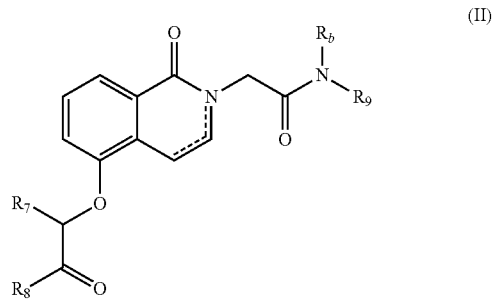

(II)

wherein:
$R_7$ and $R_b$ are each independently hydrogen, alkyl$_{(C\leq 6)}$, or substituted alkyl$_{(C\leq 6)}$;
$R_8$ is amino, hydroxy, alkoxy$_{(C\leq 6)}$, substituted alkoxy$_{(C\leq 6)}$, alkylamino$_{(C\leq 6)}$, substituted alkylamino$_{(C\leq 6)}$, dialkylamino$_{(C\leq 6)}$, or substituted dialkylamino$_{(C\leq 6)}$; and R$_9$ is aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups;

or a compound of the formula:

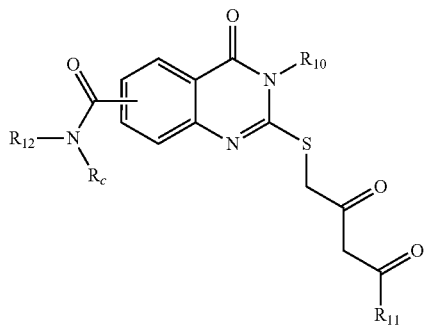

(III)

wherein:

R$_{10}$ and R$_2$ are each independently hydrogen, alkyl$_{(C \leq 6)}$, or substituted alkyl$_{(C \leq 6)}$;

R$_{12}$ is amino, hydroxy, alkoxy$_{(C \leq 6)}$, substituted alkoxy$_{(C \leq 6)}$, alkylamino$_{(C \leq 6)}$, substituted alkylamino$_{(C \leq 6)}$, dialkylamino$_{(C \leq 6)}$, or substituted dialkylamino$_{(C \leq 6)}$; and R$_{11}$ is aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups;

or a compound of the formula:

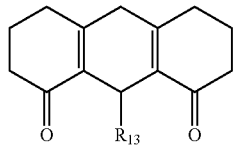

(IV)

wherein:

R$_{13}$ is aryl$_{(C \leq 12)}$, heteroaryl$_{(C \leq 12)}$, or a substituted version of either group; or a compound of the formula:

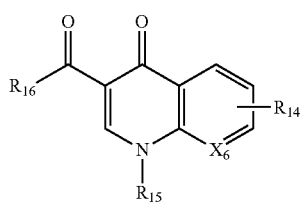

(V)

wherein:

R$_{14}$ is amino, halo, hydrogen, hydroxy, cyano, nitro, alkyl$_{(C \leq 6)}$, or substituted alkyl$_{(C \leq 6)}$;

R$_{15}$ and R$_{16}$ are each independently selected from aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups; and X$_6$ is CH or N;

or a compound of the formula:

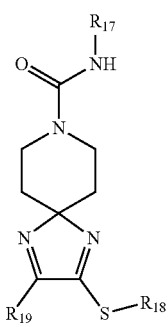

(VI)

wherein:

R$_{17}$, R$_{18}$, and R$_{19}$ are each independently selected from aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups;

or a compound of the formula:

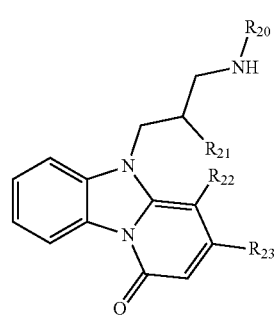

(VII)

wherein:

R$_{20}$ is aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups;

R$_{21}$ and R$_{22}$ are each independently selected from amino, cyano, halo, hydroxy, hydrogen, or nitro;

R$_{23}$ is amino, halo, hydrogen, hydroxy, cyano, nitro, alkyl$_{(C \leq 6)}$, or substituted alkyl$_{(C \leq 6)}$;

or a pharmaceutically acceptable salt thereof; and (B) an excipient.

In some embodiments, the composition is formulated for administration: orally, intraadiposally, intraarterially, intraarticularly, intracranially, intradermally, intralesionally, intramuscularly, intranasally, intraocularly, intrapericaidially, intraperitoneally, intrapleurally, intraprostatically, intrarectally, intrathecally, intratracheally, intratumorally, intraumbilically, intravaginally, intravenously, intravascularly, intravitreally, liposomally, locally, mucosally, parenterally, rectally, subconjunctival, subcutaneously, sublingually, topically, transbuccally, transdermally, vaginally, in crimes, in lipid compositions, via a catheter, via a lavage, via continuous infusion, via infusion, via inhalation, via injection, via local delivery, or via localized perfusion. In some embodiments, the pharmaceutical composition is formulated for oral, intraarterial, or intravenous administration. In further embodiments, the pharmaceutical composition is formulated for intravenous administration. In some embodiments, the pharmaceutical composition is formulated as a unit dose.

In other aspects, the present disclosure provides cell culture media comprising (A) a biologically acceptable buffer; and
(B) a compound of the formula:

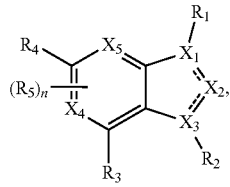

(I)

wherein:
n is 0, 1, or 2;
$R_1$ and $R_2$ are each independently absent, hydrogen, or $-L_1-R_a$, wherein:
$L_1$ is a covalent bond, —C(O)—, —S(O)$_2$—, -alkanediyl$_{(C \leq 6)}$—C(O)—, substituted -alkanediyl$_{(C \leq 6)}$—C(O)—, -alkanediyl$_{(C \leq 6)}$—S(O)$_2$—, or substituted -alkanediyl$_{(C \leq 6)}$—S(O)$_2$—;
$R_a$ is alkyl$_{(C \leq 12)}$, aryl$_{(C \leq 12)}$, heteroaryl$_{(C \leq 12)}$, acyl$_{(C \leq 12)}$, amido$_{(C \leq 12)}$, or
a substituted version of any of these groups; or
a group of the formula:

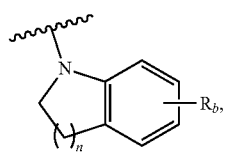

wherein:
n is 1 or 2;
$R_b$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, or a substituted version of any of these groups;
$R_3$ is hydrogen; or
alkyl$_{(C \leq 12)}$, cycloalkyl$_{(C \leq 12)}$, heterocycloalkyl$_{(C \leq 12)}$, or a substituted version of any of these groups;
$R_4$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, —NH-aralkyl$_{(C \leq 12)}$, —NH-heteroaralkyl$_{(C \leq 12)}$, —O-aralkyl$_{(C \leq 12)}$, —O-heteroaralkyl$_{(C \leq 12)}$, or a substituted version of any of these groups;
$R_5$ is, in each instance independently, amino, halo, or hydroxy; or
alkyl$_{(C \leq 12)}$, alkylamino$_{(C \leq 12)}$, dialkylamino$_{(C \leq 12)}$, alkoxy$_{(C \leq 12)}$, or a substituted version of any of these groups; and
$X_1$, $X_2$, $X_3$, $X_4$, and $X_5$ are each independently N or CH;

or a compound of the formula:

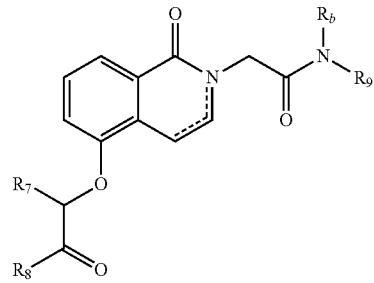

(II)

wherein:
$R_7$ and $R_b$ are each independently hydrogen, alkyl$_{(C \leq 6)}$, or substituted alkyl$_{C \leq 6}$;
$R_8$ is amino, hydroxy, alkoxy$_{(C \leq 6)}$, substituted alkoxy$_{(C \leq 6)}$, alkylamino$_{(C \leq 6)}$, substituted alkylamino$_{(C \leq 6)}$, dialkylamino$_{(C \leq 6)}$, or substituted dialkylamino$_{(C \leq 6)}$; and
$R_9$ is aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups;

or a compound of the formula:

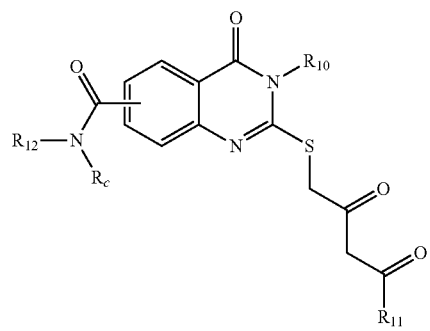

(III)

wherein:
$R_{10}$ and $R_c$ are each independently hydrogen, alkyl$_{(C \leq 6)}$, or substituted alkyl$_{(C \leq 6)}$;
$R_{12}$ is amino, hydroxy, alkoxy$_{(C \leq 6)}$, substituted alkoxy$_{(C \leq 6)}$, alkylamino$_{(C \leq 6)}$, substituted alkylamino$_{(C \leq 6)}$, dialkylamino$_{(C \leq 6)}$, or substituted dialkylamino$_{(C \leq 6)}$; and
$R_{11}$ is aryl$_{(C \leq 12)}$, heteroaryl$_{(C \leq 12)}$, aralkyl$_{(C \leq 12)}$, heteroaralkyl$_{(C \leq 12)}$, or a substituted version of any of these groups;

or a compound of the formula:

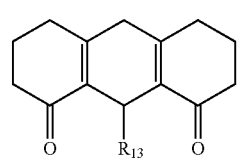

(IV)

wherein:
$R_{13}$ is aryl$_{(C \leq 12)}$, heteroaryl$_{(C \leq 12)}$, or a substituted version of either group;

or a compound of the formula:

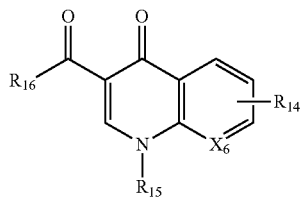

(V)

wherein:
$R_{14}$ is amino, halo, hydrogen, hydroxy, cyano, nitro, alkyl$_{(C\leq 6)}$, or substituted alkyl$_{(C\leq 6)}$;
$R_{15}$ and $R_{16}$ are each independently selected from aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups; and
$X_6$ is CH or N;
or a compound of the formula:

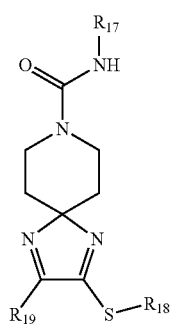

(VI)

wherein:
$R_{17}$, $R_{18}$, and $R_{19}$ are each independently selected from aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;
or a compound of the formula:

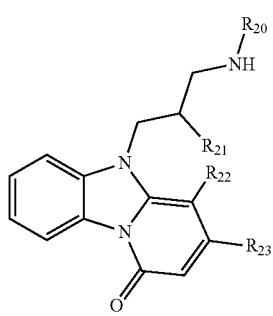

(VII)

wherein:
$R_{20}$ is aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;
$R_{21}$ and $R_{22}$ are each independently selected from amino, cyano, halo, hydroxy, hydrogen, or nitro;
$R_{23}$ is amino, halo, hydrogen, hydroxy, cyano, nitro, alkyl$_{(C\leq 6)}$, or substituted alkyl$_{(C\leq 6)}$;
or a pharmaceutically acceptable salt thereof.

In some embodiments, the cell culture medium is chemically-defined.

In still other embodiments, the present disclosure provides cell cultures comprising:
(A) a cell; and
(B) a compound of the formula:

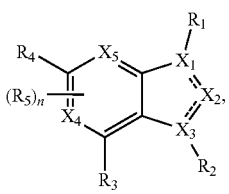

(I)

wherein:
n is 0, 1, or 2;
$R_1$ and $R_2$ are each independently absent, hydrogen, or -L$_1$-R$_a$, wherein:
$L_1$ is a covalent bond, —C(O)—, —S(O)$_2$—, -alkanediyl$_{(C\leq 6)}$—C(O)—, substituted -alkanediyl$_{(C\leq 6)}$—C(O)—, -alkanediyl$_{(C\leq 6)}$—S(O)$_2$—, or substituted -alkanediyl$_{(C\leq 6)}$—S(O)$_2$—;
$R_a$ is alkyl$_{(C\leq 12)}$, aryl$_{(C\leq 12)}$, heteroaryl$_{(C\leq 12)}$, acyl$_{(C\leq 12)}$, amido$_{(C\leq 12)}$, or
a substituted version of any of these groups; or
a group of the formula:

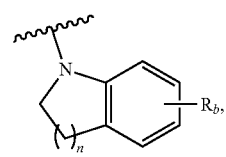

wherein:
n is 1 or 2;
$R_b$ is amino, halo, hydrogen, or hydroxy; or
alkyl$_{(C\leq 12)}$, alkylamino$_{(C\leq 12)}$, dialkylamino$_{(C\leq 12)}$, alkoxy$_{(C\leq 12)}$, or a substituted version of any of these groups;
$R_3$ is hydrogen; or
alkyl$_{(C\leq 12)}$, cycloalkyl$_{(C\leq 12)}$, heterocycloalkyl$_{(C\leq 12)}$, or a substituted version of any of these groups;
$R_4$ is amino, halo, hydrogen, or hydroxy; or
alkyl$_{(C\leq 12)}$, alkylamino$_{(C\leq 12)}$, dialkylamino$_{(C\leq 12)}$, alkoxy$_{(C\leq 12)}$, —NH-aralkyl$_{(C\leq 12)}$, —NH-heteroaralkyl$_{(C\leq 12)}$, —O-aralkyl$_{(C\leq 12)}$, —O-heteroaralkyl$_{(C\leq 12)}$, or a substituted version of any of these groups;
$R_5$ is, in each instance independently, amino, halo, or hydroxy; or
alkyl$_{(C\leq 12)}$, alkylamino$_{(C\leq 12)}$, dialkylamino$_{(C\leq 12)}$, alkoxy$_{(C\leq 12)}$, or a substituted version of any of these groups; and
$X_1$, $X_2$, $X_3$, $X_4$, and $X_5$ are each independently N or CH;

or a compound of the formula:

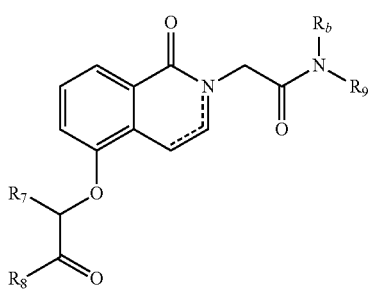

(II)

wherein:
R$_7$ and R$_b$ are each independently hydrogen, alkyl$_{(C≤6)}$, or substituted alkyl$_{(C≤6)}$;
R$_8$ is amino, hydroxy, alkoxy$_{(C≤6)}$, substituted alkoxy$_{(C≤6)}$, alkylamino$_{(C≤6)}$, substituted alkylamino$_{(C≤6)}$, dialkylamino$_{(C≤6)}$, or substituted dialkylamino$_{(C≤6)}$; and
R$_9$ is aryl$_{(C≤12)}$, heteroaryl$_{(C≤12)}$, aralkyl$_{(C≤12)}$, heteroaralkyl$_{(C≤12)}$, or a substituted version of any of these groups;

or a compound of the formula:

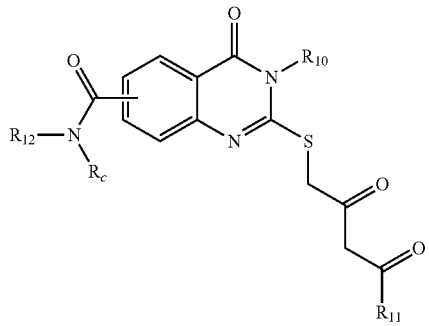

(III)

wherein:
R$_{10}$ and R$_2$ are each independently hydrogen, alkyl$_{(C≤6)}$, or substituted alkyl$_{(C≤6)}$;
R$_{12}$ is amino, hydroxy, alkoxy$_{(C≤6)}$, substituted alkoxy$_{(C≤6)}$, alkylamino$_{(C≤6)}$, substituted alkylamino$_{(C≤6)}$, dialkylamino$_{(C≤6)}$, or substituted dialkylamino$_{(C≤6)}$; and
R$_{11}$ is aryl$_{(C≤12)}$, heteroaryl$_{(C≤12)}$, aralkyl$_{(C≤12)}$, heteroaralkyl$_{(C≤12)}$, or a substituted version of any of these groups;

or a compound of the formula:

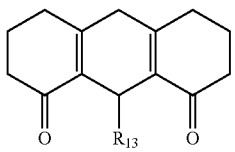

(IV)

wherein:
R$_{13}$ is aryl$_{(C≤12)}$, heteroaryl$_{(C≤12)}$, or a substituted version of either group; or a compound of the formula:

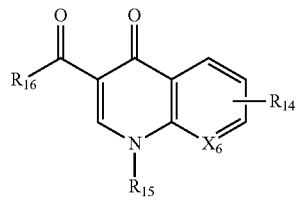

(V)

wherein:
R$_{14}$ is amino, halo, hydrogen, hydroxy, cyano, nitro, alkyl$_{(C≤6)}$, or substituted alkyl$_{C≤6)}$;
R$_{15}$ and R$_{16}$ are each independently selected from aryl$_{(C≤12)}$, heteroaryl$_{(C≤12)}$, aralkyl$_{(C≤12)}$, heteroaralkyl$_{(C≤12)}$, or a substituted version of any of these groups; and
X$_6$ is CH or N;

or a compound of the formula:

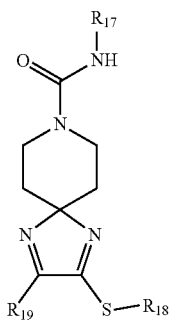

(VI)

wherein:
R$_{17}$, R$_{18}$, and R$_{19}$ are each independently selected from aryl$_{(C≤12)}$, heteroaryl$_{(C≤12)}$, aralkyl$_{(C≤12)}$, heteroaralkyl$_{(C≤12)}$, or a substituted version of any of these groups;

or a compound of the formula:

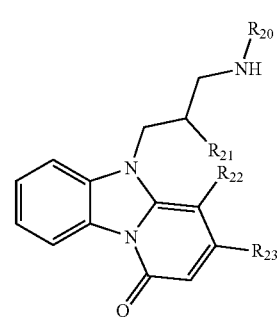

(VII)

wherein:
R$_{20}$ is aryl$_{(C≤12)}$, heteroaryl$_{(C≤12)}$, aralkyl$_{(C≤12)}$, heteroaralkyl$_{(C≤12)}$, or a substituted version of any of these groups;
R$_{21}$ and R$_{22}$ are each independently selected from amino, cyano, halo, hydroxy, hydrogen, or nitro;

$R_{23}$ is amino, halo, hydrogen, hydroxy, cyano, nitro, alkyl$_{(C≤6)}$, or substituted alkyl$_{(C≤6)}$;

or a pharmaceutically acceptable salt thereof.

In some embodiments, the cell culture comprises a cell culture medium. In some embodiments, the cell is a pluripotent stem cell. In some embodiments, the cell is an induced pluripotent stem cell (iPSC). In some embodiments, the cell is from a mammal, such as a human.

In yet other aspects, the present disclosure provides methods of treating or preventing a disease or disorder in a patient in need thereof comprising administering to the patient a compound of the formula:

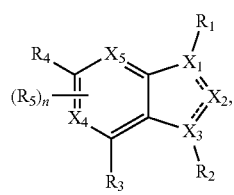
(I)

wherein:
n is 0, 1, or 2;
$R_1$ and $R_2$ are each independently absent, hydrogen, or -$L_1$-$R_a$, wherein:
$L_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted -alkanediyl$_{(C≤6)}$—S(O)$_2$—;
$R_a$ is alkyl$_{(C≤12)}$, aryl$_{(C≤12)}$, heteroaryl$_{(C≤12)}$, acyl$_{(C≤12)}$, amido$_{(C≤12)}$, or
a substituted version of any of these groups; or
a group of the formula:

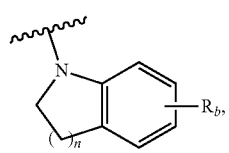

wherein:
n is 1 or 2;
$R_b$ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups;
$R_3$ is hydrogen; or
alkyl$_{(C≤12)}$, cycloalkyl$_{(C≤12)}$, heterocycloalkyl$_{(C≤12)}$, or a substituted version of any of these groups;
$R_4$ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups;
$R_5$ is, in each instance independently, amino, halo, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups; and
$X_1$, $X_2$, $X_3$, $X_4$, and $X_5$ are each independently N or CH;

or a compound of the formula:

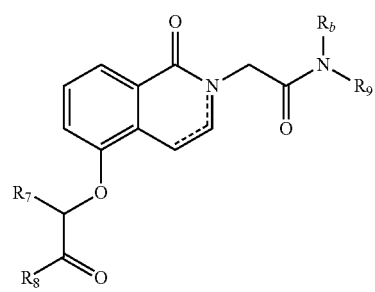
(II)

wherein:
$R_7$ and $R_b$ are each independently hydrogen, alkyl$_{(C≤6)}$, or substituted alkyl$_{(C≤6)}$;
$R_8$ is amino, hydroxy, alkoxy$_{(C≤6)}$, substituted alkoxy$_{(C≤6)}$, alkylamino$_{(C≤6)}$, substituted alkylamino$_{(C≤6)}$, dialkylamino$_{(C≤6)}$, or substituted dialkylamino$_{(C≤6)}$; and
$R_9$ is aryl$_{(C≤12)}$, heteroaryl$_{(C≤12)}$, aralkyl$_{(C≤12)}$, heteroaralkyl$_{(C≤12)}$, or a substituted version of any of these groups;

or a compound of the formula:

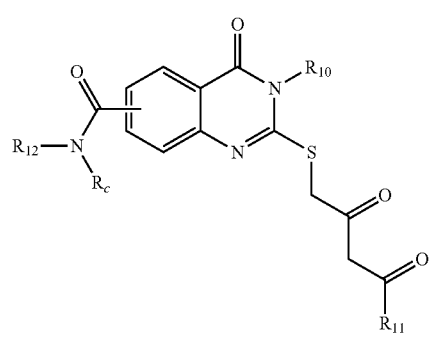
(III)

wherein:
$R_{10}$ and $R_2$ are each independently hydrogen, alkyl$_{(C≤6)}$, or substituted alkyl$_{(C≤6)}$;
$R_{12}$ is amino, hydroxy, alkoxy$_{(C≤6)}$, substituted alkoxy$_{(C≤6)}$, alkylamino$_{(C≤6)}$, substituted alkylamino$_{(C≤6)}$, dialkylamino$_{(C≤6)}$, or substituted dialkylamino$_{(C≤6)}$; and
$R_{11}$ is aryl$_{(C≤12)}$, heteroaryl$_{(C≤12)}$, aralkyl$_{(C≤12)}$, heteroaralkyl$_{(C≤12)}$, or a substituted version of any of these groups;

or a compound of the formula:

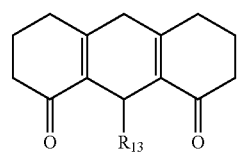
(IV)

wherein:
R$_{13}$ is aryl$_{(C≤12)}$, heteroaryl$_{(C≤12)}$, or a substituted version of either group; or a compound of the formula:

(V)

wherein:
R$_{14}$ is amino, halo, hydrogen, hydroxy, cyano, nitro, alkyl$_{(C≤6)}$, or substituted alkyl$_{C≤6)}$;
R$_{15}$ and R$_{16}$ are each independently selected from aryl$_{(C≤12)}$, heteroaryl$_{(C≤12)}$, aralkyl$_{(C≤12)}$, heteroaralkyl$_{(C≤12)}$, or a substituted version of any of these groups; and
X$_6$ is CH or N;
or a compound of the formula:

(VI)

wherein:
R$_{17}$, R$_{18}$, and R$_{19}$ are each independently selected from aryl$_{(C≤12)}$, heteroaryl$_{(C≤12)}$, aralkyl$_{(C≤12)}$, heteroaralkyl$_{(C≤12)}$, or a substituted version of any of these groups;
or a compound of the formula:

(VII)

wherein:
R$_{20}$ is aryl$_{(C≤12)}$, heteroaryl$_{(C≤12)}$, aralkyl$_{(C≤12)}$, heteroaralkyl$_{(C≤12)}$, or a substituted version of any of these groups;
R$_{21}$ and R$_{22}$ are each independently selected from amino, cyano, halo, hydroxy, hydrogen, or nitro;

R$_{23}$ is amino, halo, hydrogen, hydroxy, cyano, nitro, alkyl$_{(C≤6)}$, or substituted alkyl$_{(C≤6)}$;
or a pharmaceutically acceptable salt thereof.

In some embodiments, the patient is a mammal, such as a human. In some embodiments, the disease or disorder is associated with a misregulation of germ cell nuclear factor (GCNF). In further embodiments, the misregulation of GCNF is overexpression GCNF. In some embodiments, the disease or disorder is cancer, such as breast cancer. In some embodiments, the compound is administered as a unit dose. In some embodiments, the compound is administered once. In other embodiments, the compound is administered more than once. In some embodiments, the further comprises a second therapy. In further embodiments, the second therapy is chemotherapy, immunotherapy, or radiotherapy.

In other aspects, the present disclosure provides methods of maintaining a pluripotent stem cell comprising contacting the pluripotent stem cell with a compound of the formula:

(I)

wherein:
n is 0, 1, or 2;
R$_1$ and R$_2$ are each independently absent, hydrogen, or -L$_1$-R$_a$, wherein:
L$_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted -alkanediyl$_{(C≤6)}$—S(O)$_2$—;
R$_a$ is alkyl$_{(C≤12)}$, aryl$_{(C≤12)}$, heteroaryl$_{(C≤12)}$, acyl$_{(C≤12)}$, amido$_{(C≤12)}$, or
a substituted version of any of these groups; or
a group of the formula:

wherein:
n is 1 or 2;
R$_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;
R$_3$ is hydrogen; or
alkyl$_{(C≤12)}$, cycloalkyl$_{(C≤12)}$, heterocycloalkyl$_{(C≤12)}$, or a substituted version of any of these groups;
R$_4$ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups;
R$_5$ is, in each instance independently, amino, halo, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups; and $X_1$, $X_2$, $X_3$, $X_4$, and $X_5$ are each independently N or CH;

or a compound of the formula:

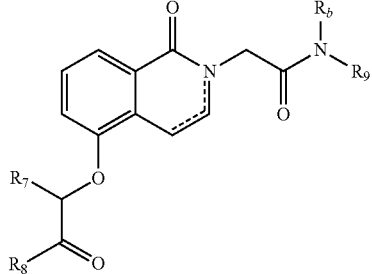

(II)

wherein:
$R_7$ and $R_b$ are each independently hydrogen, alkyl$_{(C\leq 6)}$, or substituted alkyl$_{(C\leq 6)}$;

$R_8$ is amino, hydroxy, alkoxy$_{(C\leq 6)}$, substituted alkoxy$_{(C\leq 6)}$, alkylamino$_{(C\leq 6)}$, substituted alkylamino$_{(C\leq 6)}$, dialkylamino$_{(C\leq 6)}$, or substituted dialkylamino$_{(C\leq 6)}$; and $R_9$ is aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;

or a compound of the formula:

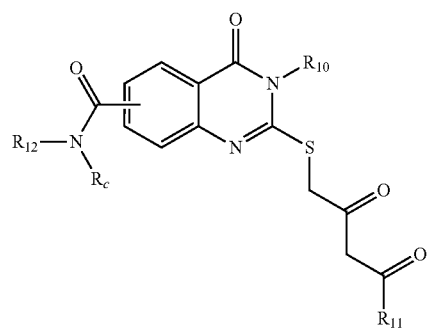

(III)

wherein:
$R_{10}$ and $R_c$ are each independently hydrogen, alkyl$_{(C\leq 6)}$, or substituted alkyl$_{(C\leq 6)}$;

$R_{12}$ is amino, hydroxy, alkoxy$_{(C\leq 6)}$, substituted alkoxy$_{(C\leq 6)}$, alkylamino$_{(C\leq 6)}$, substituted alkylamino$_{(C\leq 6)}$, dialkylamino$_{(C\leq 6)}$, or substituted dialkylamino$_{(C\leq 6)}$; and $R_{11}$ is aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;

or a compound of the formula:

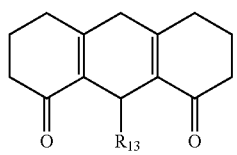

(IV)

wherein:
$R_{13}$ is aryl$_{(C\leq 12)}$, heteroaryl$_{(C\leq 12)}$, or a substituted version of either group; or a compound of the formula:

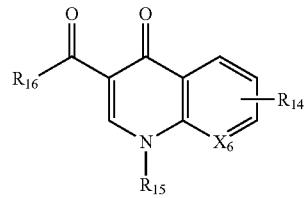

(IV)

wherein:
$R_{14}$ is amino, halo, hydrogen, hydroxy, cyano, nitro, alkyl$_{(C\leq 6)}$, or substituted alkyl$_{C\leq 6}$;

$R_{15}$ and $R_{16}$ are each independently selected from aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups; and $X_6$ is CH or N;

or a compound of the formula:

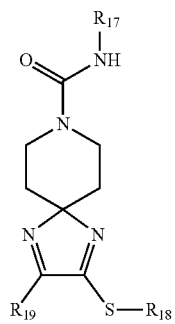

(VI)

wherein:
$R_{17}$, $R_{18}$, and $R_{19}$ are each independently selected from aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;

or a compound of the formula:

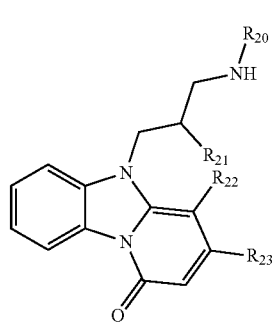

(VII)

wherein:
$R_{20}$ is aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;

$R_{21}$ and $R_{22}$ are each independently selected from amino, cyano, halo, hydroxy, hydrogen, or nitro;

$R_{23}$ is amino, halo, hydrogen, hydroxy, cyano, nitro, alkyl$_{(C\leq 6)}$, or substituted alkyl$_{(C\leq 6)}$;

or a pharmaceutically acceptable salt thereof.

In some embodiments, the pluripotent stem cell is an induced pluripotent stem cell (iPSC). In some embodiments, the pluripotent stem cell is from a mammal, such as a human. In some embodiments, the method is performed ex vivo. In other embodiments, the method is performed in vitro.

In still other aspects, the present disclosure provides methods of modulating germ cell nuclear factor (GCNF) in a cell comprising contacting the cell with a compound of the formula:

(I)

wherein:
n is 0, 1, or 2;
$R_1$ and $R_2$ are each independently absent, hydrogen, or -L$_1$-R$_a$, wherein:
  L$_1$ is a covalent bond, —C(O)—, —S(O)$_2$—, -alkanediyl$_{(C\leq 6)}$—C(O)—, substituted -alkanediyl$_{(C\leq 6)}$—C(O)—, -alkanediyl$_{(C\leq 6)}$—S(O)$_2$—, or substituted -alkanediyl$_{(C\leq 6)}$—S(O)$_2$—;
  R$_a$ is alkyl$_{(C\leq 12)}$, aryl$_{(C\leq 12)}$, heteroaryl$_{(C\leq 12)}$, acyl$_{(C\leq 12)}$, amido$_{(C\leq 12)}$, or a substituted version of any of these groups; or a group of the formula:

wherein:
  n is 1 or 2;
  R$_b$ is amino, halo, hydrogen, or hydroxy; or alkyl$_{(C\leq 12)}$, alkylamino$_{(C\leq 12)}$, dialkylamino$_{(C\leq 12)}$, alkoxy$_{(C\leq 12)}$, or a substituted version of any of these groups;
$R_3$ is hydrogen; or
  alkyl$_{(C\leq 12)}$, cycloalkyl$_{(C\leq 12)}$, heterocycloalkyl$_{(C\leq 12)}$, or a substituted version of any of these groups;
$R_4$ is amino, halo, hydrogen, or hydroxy; or
  alkyl$_{(C\leq 12)}$, alkylamino$_{(C\leq 12)}$, dialkylamino$_{(C\leq 12)}$, alkoxy$_{(C\leq 12)}$, —NH-aralkyl$_{(C\leq 12)}$, —NH-heteroaralkyl$_{(C\leq 12)}$, —O-aralkyl$_{(C\leq 12)}$, —O-heteroaralkyl$_{(C\leq 12)}$, or a substituted version of any of these groups;
$R_5$ is, in each instance independently, amino, halo, or hydroxy; or
  alkyl$_{(C\leq 12)}$, alkylamino$_{(C\leq 12)}$, dialkylamino$_{(C\leq 12)}$, alkoxy$_{(C\leq 12)}$, or a substituted version of any of these groups; and
$X_1$, $X_2$, $X_3$, $X_4$, and $X_5$ are each independently N or CH;

or a compound of the formula:

(II)

wherein:
$R_7$ and $R_b$ are each independently hydrogen, alkyl$_{(C\leq 6)}$, or substituted alkyl$_{C\leq 6}$;
$R_8$ is amino, hydroxy, alkoxy$_{(C\leq 6)}$, substituted alkoxy$_{(C\leq 6)}$, alkylamino$_{(C\leq 6)}$, substituted alkylamino$_{(C\leq 6)}$, dialkylamino$_{(C\leq 6)}$, or substituted dialkylamino$_{(C\leq 6)}$; and
$R_9$ is aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;

or a compound of the formula:

(III)

wherein:
$R_{10}$ and $R_2$ are each independently hydrogen, alkyl$_{(C\leq 6)}$, or substituted alkyl$_{(C\leq 6)}$;
$R_{12}$ is amino, hydroxy, alkoxy$_{(C\leq 6)}$, substituted alkoxy$_{(C\leq 6)}$, alkylamino$_{(C\leq 6)}$, substituted alkylamino$_{(C\leq 6)}$, dialkylamino$_{(C\leq 6)}$, or substituted dialkylamino$_{(C\leq 6)}$; and
$R_{11}$ is aryl$_{(C\leq 12)}$, heteroaryl$_{(C\leq 12)}$, aralkyl$_{(C\leq 12)}$, heteroaralkyl$_{(C\leq 12)}$, or a substituted version of any of these groups;

or a compound of the formula:

(IV)

wherein:
$R_{13}$ is aryl$_{(C\leq 12)}$, heteroaryl$_{(C\leq 12)}$, or a substituted version of either group; or a compound of the formula:

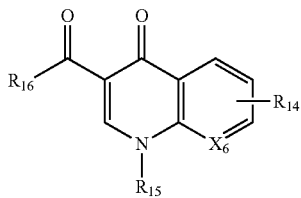

(IV)

wherein:
R$_{14}$ is amino, halo, hydrogen, hydroxy, cyano, nitro, alkyl$_{(C≤6)}$, or substituted alkyl$_{(C≤6)}$;
R$_{15}$ and R$_{16}$ are each independently selected from aryl$_{(C≤12)}$, heteroaryl$_{(C≤12)}$, aralkyl$_{(C≤12)}$, heteroaralkyl$_{(C≤12)}$, or a substituted version of any of these groups; and
X$_6$ is CH or N;
or a compound of the formula:

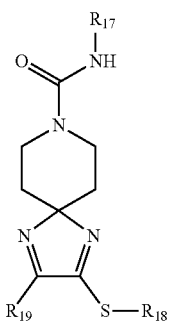

(VI)

wherein:
R$_{17}$, R$_{18}$, and R$_{19}$ are each independently selected from aryl$_{(C≤12)}$, heteroaryl$_{(C≤12)}$, aralkyl$_{(C≤12)}$, heteroaralkyl$_{(C≤12)}$, or a substituted version of any of these groups;
or a compound of the formula:

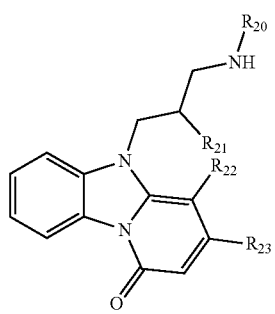

(VII)

wherein:
R$_{20}$ is aryl$_{(C≤12)}$, heteroaryl$_{(C≤12)}$, aralkyl$_{(C≤12)}$, heteroaralkyl$_{(C≤12)}$, or a substituted version of any of these groups;
R$_{21}$ and R$_{22}$ are each independently selected from amino, cyano, halo, hydroxy, hydrogen, or nitro;
R$_{23}$ is amino, halo, hydrogen, hydroxy, cyano, nitro, alkyl$_{(C≤6)}$, or substituted alkyl$_{(C≤6)}$;
or a pharmaceutically acceptable salt thereof.

In some embodiments, the cell is a pluripotent stem cell. In further embodiments, the cell is an induced pluripotent stem cell (iPSC). In some embodiments, the cell is a cancer cell, such as a breast cancer cell. In some embodiments, the cell is a mammalian cell, such as a human cell. In some embodiments, the modulating results in decreased expression of GCNF.

With respect to any aspect of the present disclosure, in some embodiments, the compound is further defined as:

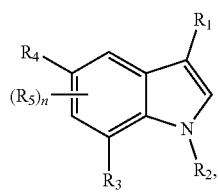

(VIII)

wherein:
n is 0, 1, or 2;
R$_1$ and R$_2$ are each independently absent, hydrogen, or -L$_1$-R$_a$, wherein:
L$_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted -alkanediyl$_{(C≤6)}$—S(O)$_2$—;
R$_a$ is alkyl$_{(C≤12)}$, aryl$_{(C≤12)}$, heteroaryl$_{(C≤12)}$, acyl$_{(C≤12)}$, amido$_{(C≤12)}$, or a substituted version of any of these groups; or
a group of the formula:

wherein:
n is 1 or 2;
R$_b$ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups;
R$_3$ is hydrogen; or
alkyl$_{(C≤12)}$, cycloalkyl$_{(C≤12)}$, heterocycloalkyl$_{(C≤12)}$, or a substituted version of any of these groups;
R$_4$ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups; and
R$_5$ is, in each instance independently, amino, halo, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups; or the compound is further defined as:

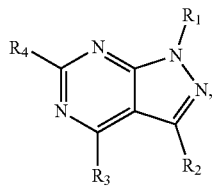
(IX)

wherein:
R₁ and R₂ are each independently absent, hydrogen, or -L₁-Rₐ, wherein:
L₁ is a covalent bond, —C(O)—, —S(O)₂—, -alkanediyl$_{(C≤6)}$—C(O)—, substituted -alkanediyl$_{(C≤6)}$—C(O)—, -alkanediyl$_{(C≤6)}$—S(O)₂—, or substituted -alkanediyl$_{(C≤6)}$—S(O)₂—;
Rₐ is alkyl$_{(C≤12)}$, aryl$_{(C≤12)}$, heteroaryl$_{(C≤12)}$, acyl$_{(C≤12)}$, amido$_{(C≤12)}$, or a substituted version of any of these groups; or
a group of the formula:

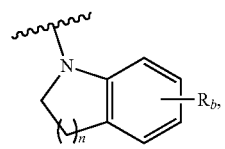

wherein:
n is 1 or 2;
R_b is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;
R₃ is hydrogen; or
alkyl$_{(C≤12)}$, cycloalkyl$_{(C≤12)}$, heterocycloalkyl$_{(C≤12)}$, or a substituted version of any of these groups; and
R₄ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups;
or a pharmaceutically acceptable salt of either of these formulae.

In some embodiments, the compound is further defined as:

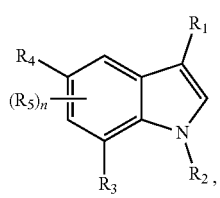
(VIII)

wherein:
n is 0, 1, or 2;
R₁ and R₂ are each independently absent, hydrogen, or -L₁-Rₐ, wherein:
L₁ is a covalent bond, —C(O)—, —S(O)₂—, -alkanediyl$_{(C≤6)}$—C(O)—, substituted -alkanediyl$_{(C≤6)}$—C(O)—, -alkanediyl$_{(C≤6)}$—S(O)₂—, or substituted -alkanediyl$_{(C≤6)}$—S(O)₂—;
Rₐ is alkyl$_{(C≤12)}$, aryl$_{(C≤12)}$, heteroaryl$_{(C≤12)}$, acyl$_{(C≤12)}$, amido$_{(C≤12)}$, or a substituted version of any of these groups; or
a group of the formula:

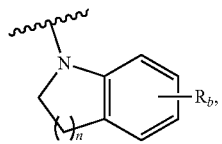

wherein:
n is 1 or 2;
R_b is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups;
R₃ is hydrogen; or
alkyl$_{(C≤12)}$, cycloalkyl$_{(C≤12)}$, heterocycloalkyl$_{(C≤12)}$, or a substituted version of any of these groups;
R₄ is amino, halo, hydrogen, or hydroxy; or
alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups; and
R₅ is, in each instance independently, amino, halo, or hydroxy; or
alkyl$_{(C≤12)}$, alkylamino$_{(C≤12)}$, dialkylamino$_{(C≤12)}$, alkoxy$_{(C≤12)}$, or a substituted version of any of these groups;
or a pharmaceutically acceptable salt thereof.

In further embodiments, the compound is further defined as:

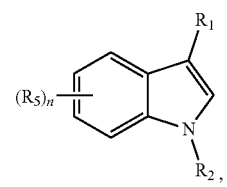
(X)

wherein:
n is 0, 1, or 2;
R₁ and R₂ are each independently absent, hydrogen, or -L₁-Rₐ, wherein:
L₁ is a covalent bond, —C(O)—, —S(O)₂—, -alkanediyl$_{(C≤6)}$—C(O)—, substituted -alkanediyl$_{(C≤6)}$—C(O)—, -alkanediyl$_{(C≤6)}$—S(O)₂—, or substituted -alkanediyl$_{(C≤6)}$—S(O)₂—;
Rₐ is alkyl$_{(C≤12)}$, aryl$_{(C≤12)}$, heteroaryl$_{(C≤12)}$, acyl$_{(C≤12)}$, amido$_{(C≤12)}$, or a substituted version of any of these groups; or
a group of the formula:

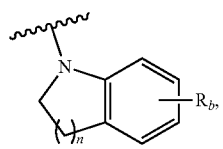

wherein:

n is 1 or 2;

$R_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups; and $R_5$ is, in each instance independently, amino, halo, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;

or a pharmaceutically acceptable salt thereof.

In still further embodiments, the compound is further defined as:

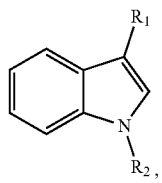

(XI)

wherein:

$R_1$ and $R_2$ are each independently absent, hydrogen, or -$L_1$-$R_a$, wherein:

$L_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted -alkanediyl$_{(C≤6)}$—S(O)$_2$—;

$R_a$ is alkyl$_{(C≤12)}$, aryl$_{(C≤12)}$, heteroaryl$_{(C≤12)}$, acyl$_{(C≤12)}$, amido$_{(C≤12)}$, or a substituted version of any of these groups; or a group of the formula:

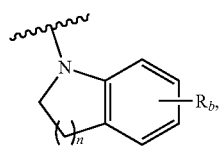

wherein:

n is 1 or 2;

$R_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;

or a pharmaceutically acceptable salt thereof.

In other embodiments, the compound is further defined as:

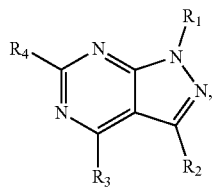

(IX)

wherein:

$R_1$ and $R_2$ are each independently absent, hydrogen, or -$L_1$-$R_a$, wherein:

$L_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted -alkanediyl$_{(C≤6)}$—S(O)$_2$—;

$R_a$ is alkyl$_{(C≤12)}$, aryl$_{(C≤12)}$, heteroaryl$_{(C≤12)}$, acyl$_{(C≤12)}$, amido$_{(C≤12)}$, or a substituted version of any of these groups; or a group of the formula:

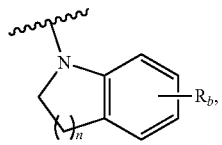

wherein:

n is 1 or 2;

$R_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;

$R_3$ is hydrogen; or alkyl$_{(C≤12)}$, cycloalkyl$_{(C≤12)}$, heterocycloalkyl$_{(C≤12)}$, or a substituted version of any of these groups; and $R_4$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups;

or a pharmaceutically acceptable salt thereof.

In further embodiments, the compound is further defined as:

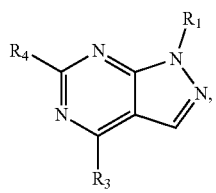

(XI)

wherein:

$R_1$ is absent, hydrogen, or -$L_1$-$R_a$, wherein:

$L_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted -alkanediyl$_{(C≤6)}$—S(O)$_2$—;

$R_a$ is alkyl$_{(C \leq 12)}$, aryl$_{(C \leq 12)}$, heteroaryl$_{(C \leq 12)}$, acyl$_{(C \leq 12)}$, amido$_{(C \leq 12)}$, or a substituted version of any of these groups; or
a group of the formula:

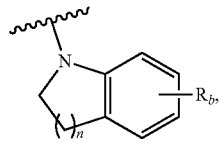

wherein:
n is 1 or 2;
$R_b$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, or a substituted version of any of these groups;
$R_3$ is hydrogen; or
alkyl$_{(C \leq 12)}$, cycloalkyl$_{(C \leq 12)}$, heterocycloalkyl$_{(C \leq 12)}$, or a substituted version of any of these groups; and
$R_4$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, —NH-aralkyl$_{(C \leq 12)}$, —NH-heteroaralkyl$_{(C \leq 12)}$, —O-aralkyl$_{(C \leq 12)}$, —O-heteroaralkyl$_{(C \leq 12)}$, or a substituted version of any of these groups;
or a pharmaceutically acceptable salt thereof.

In some embodiments, $R_1$ is -$L_1$-$R_a$. In some embodiments, $L_1$ is —S(O)$_2$—. In some embodiments, $R_a$ is aryl$_{(C \leq 12)}$ or substituted aryl$_{(C \leq 12)}$. In further embodiments, $R_a$ is aryl$_{(C \leq 12)}$, such as phenyl. In some embodiments, $R_2$ is -$L_1$-$R_a$. In some embodiments, $L_1$ is -alkanediyl$_{(C \leq 6)}$—C(O)— or substituted -alkanediyl$_{(C \leq 6)}$—C(O)—. In further embodiments, $L_1$ is -alkanediyl$_{(C \leq 6)}$—C(O)—, such as —CH$_2$C(O)—.

In some embodiments, $R_a$ is a group of the formula:

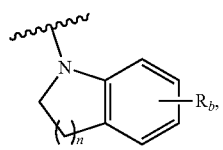

wherein:
n is 1 or 2; and
$R_b$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, or a substituted version of any of these groups.

In further embodiments, $R_a$ is a group of the formula:

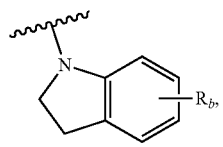

wherein:
$R_b$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, or a substituted version of any of these groups.

In still further embodiments, $R_a$ is a group of the formula:

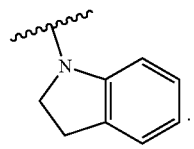 [SMILES: *N1CCc2ccccc21]

In some embodiments, $R_1$ is aryl$_{(C \leq 12)}$ or substituted aryl$_{(C \leq 12)}$. In further embodiments, $R_1$ is aryl$_{(C \leq 12)}$, such as 4-methylphenyl. In some embodiments, $R_3$ is heterocycloalkyl$_{(C \leq 12)}$ or substituted heterocycloalkyl$_{(C \leq 12)}$. In further embodiments, $R_3$ is heterocycloalkyl$_{(C \leq 12)}$, such as N-morpholinyl. In some embodiments, $R_4$ is —NH-heteroaralkyl$_{(C \leq 12)}$ or substituted —NH-heteroaralkyl$_{(C \leq 12)}$. In further embodiments, $R_4$ is —NH-heteroaralkyl$_{(C \leq 12)}$, such as —NH-furan-2-ylmethyl.

In some embodiments, the compound is further defined as:

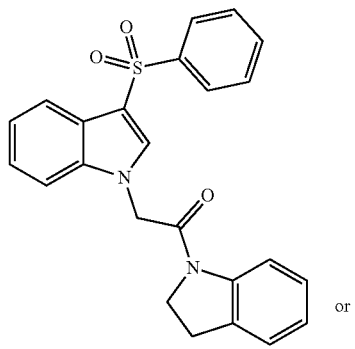

or

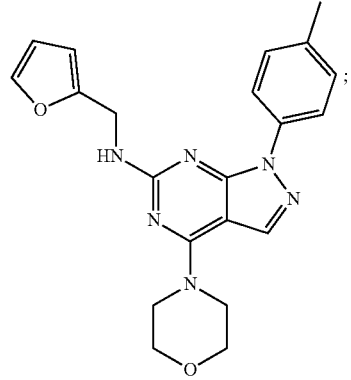

or pharmaceutically acceptable salt thereof.

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Note that simply because a particular compound is ascribed to one particular generic formula doesn't mean that it cannot also belong to another generic formula.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

(FIG. 1A) Representation of LBD in the agonist conformation with each a helix identified. (FIG. 1B) Key amino acids within the ligand binding pocket (LBP) rendered as sticks.

(FIG. 2A) Analytical size exclusion (ASE) chromatography experiments reveal that GCNF LBD elutes as a ~60 kDa homodimer based on its elution volume with respect to protein standards with known molecular weights. (FIG. 2B) ASE protein peak of GCNF LBD. (FIG. 2C) SDS-PAGE shows a single band of monomeric GCNF LBD at ~30 kDa from the pooled ASE fractions. (FIG. 2D) Electrospray ionization time-of-flight (ESI-TOF) mass spectrometry spectra of GCNF LBD.

(FIG. 3A) Differential scanning fluorimetry (DSF) of 450 nuclear-receptor biased compounds reveal that ligands 34 and 80 significantly increase the melting temperature ($T_m$) of GCNF LBD ($\Delta T_m > 2°$ C.), but not the negative control ligand 30. The $\Delta T_m$ cutoffs are denoted by gray dashed lines. Independent replicates of 30, 34 and 80 are shown. $T_m$ values of all samples are reported as average of quadruplicate measurements with error bars as SEM. (FIG. 3B) Structures of synthetic ligands 30, 34 and 80. (FIG. 3C) DSF thermograms of GCNF with DMSO or ligands. (FIG. 3D) Titration of 34 and 80 to GCNF LBD results in a concentration-dependent increase of $\Delta T_m$. (FIG. 3E) $^1$H NMR methyl peaks of GCNF LBD are unaffected when 1:1 molar equivalence of 30 is added but are substantially perturbed when 1:1 of 34 and 80 are added.

(FIG. 4A) FP titration assay of GCNF LBD results in the recruitment of select fluorescein-tagged NCoR and SMRT corepressor peptides to GCNF LBD (SEQ ID NOS: 1-4). (FIG. 4B) Titration of ligands 30, 34 and 80 does not alter the binding of NCOR ID1 to GCNF. (FIG. 4C) Titration of 34 increases the recruitment of SMRTID2 to GCNF, but not 80 and the negative control ligand 30. Data are presented as mean±SEM of triplicate measurements.

(FIG. 5A) DSF assay shows 34 and 80 specifically bind GCNF LBD as shown by increase of protein melting temperature ($T_m$), but not the LBDs of LRH-1, RXRα, COUP TFI and SF1. DSF data are reported as mean±SEM of triplicate measurements. (FIG. 5B) Luciferase transactivation assay shows that adding ligands 34 and 80 results in a concentration-dependent suppression of luciferase activity. Data are presented as mean±SEM of quadruplicate measurements.

(FIG. 9A) Differential scanning fluorimetry (DSF) assay of wild-type (WT) GCNF LBD and constructs F284A, Y336F, and F361A show that all three amino acid substitutions substantially affect the binding of 34, while only F361A significantly affect the binding of 80. $DT_m$ values are calculated as difference between $T_m$ of 5 mM protein with 20 mM ligand and $T_m$ of 1% DMSO control. Experiments are performed in 5 replicates, plotted as the average±SEM. (FIG. 9B) Ligand 80 (green) is rotated 50.7° with respect to 34 (orange) in the GCNF LBP. (c and d) MD simulations reveal F284 is pushed inwards while F361 and Y336 swing to favorable orientations (blue side chains) to accommodate the binding of ligands 34 (orange) and 80 (green).

DESCRIPTION OF THE ILLUSTRATIVE EMBODIMENTS

Figures 1A, 1B:
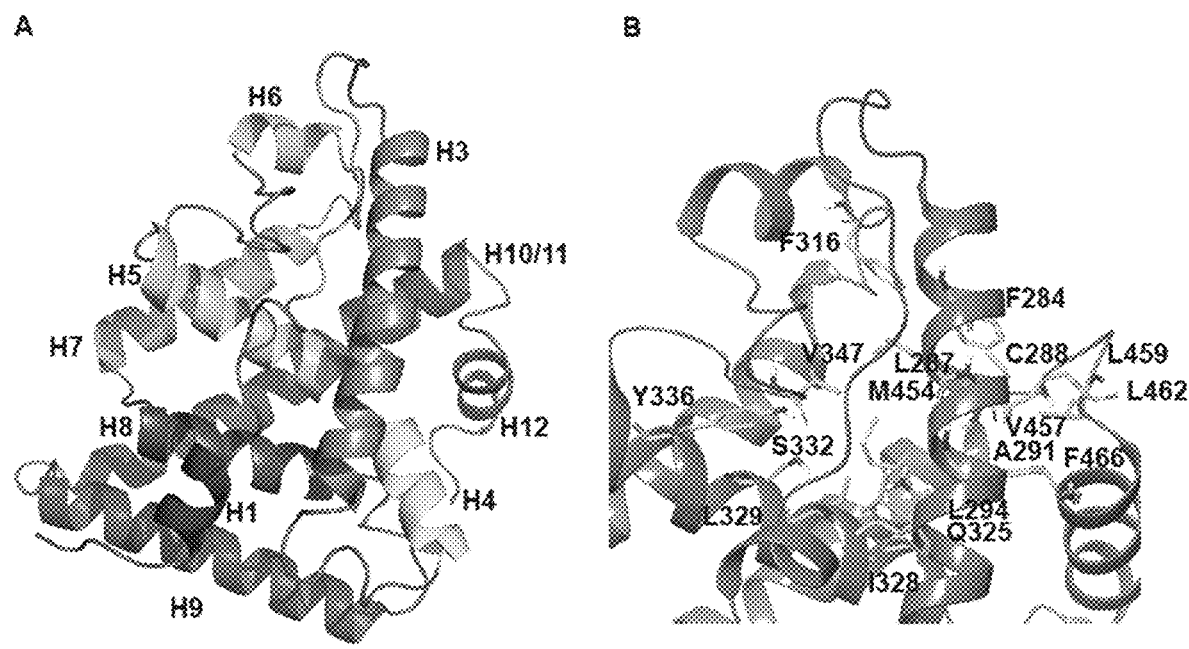
FIGS. 1A & 1B shows a homology model of GCNF ligand binding domain (LBD) and putative ligand binding pocket (LBP).

Provided herein is the examination of synthetic ligands that directly bind to GCNF LBD, which were identified via a high-throughput screening assay. This may be the first report of synthetic ligands with specific structures that directly bind GCNF LBD. Furthermore, the inventors show that these ligands occupy a putative ligand binding pocket (LBP) in GCNF LBD via molecular dynamics (MD) simulations and in silica ligand docking experiments. Amino acid residues within the LBP that are crucial to binding synthetic ligands were subsequently verified through mutagenesis experiments. In silica experiments were also corroborated by in vitro assays showing that these synthetic ligands bind specifically to GCNF, but not with other nuclear receptors that modulate Oct4 and closely related NR5 to GCNF by sequence similarity. Furthermore, the presence of these ligands significantly increases the melting temperature ($T_m$) of GCNF and perturbs $^1$H NMR methyl resonances, which are evidences of direct binding, increases the receptor's binding to a corepressor peptide derived from SMRT, and suppresses transactivation in a luciferase cotransfection assay. Furthermore, the inventors identified GCNF target genes whose expressions were significantly perturbed in the presence of the synthetic ligands. These results show that GCNF is druggable and is a possible target for future therapeutic interventions for cancer and for modulating stem cells.

I. COMPOUNDS OF THE PRESENT DISCLOSURE

In some aspects, the present disclosure provides pharmaceutical compositions, cell cultures, cell culture media, and methods comprising GCNF ligands. Non-limiting examples of GCNF ligands are shown below in Table 1.

TABLE 1

Structures of non-limiting examples of GCNF ligands, compounds 34 and 80.

| Compound ID | Structural Formula |
| --- | --- |
| 34 | 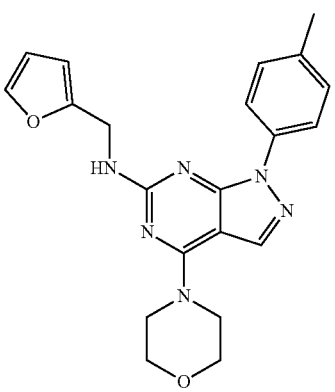 [SMILES: Cc1ccc(-n2ncc3c(N4CCOCC4)nc(NCc4ccco4)nc32)cc1] |

TABLE 1-continued
Structures of non-limiting examples of GCNF ligands, compounds 34 and 80.
| Compound ID | Structural Formula |
|---|---|
| 80 | 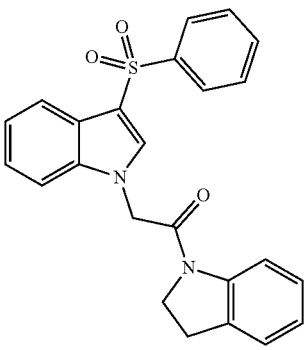 [SMILES: O=C(Cn1cc(S(=O)(=O)c2ccccc2)c2ccccc21)N1CCc2ccccc21] |
| R4 | 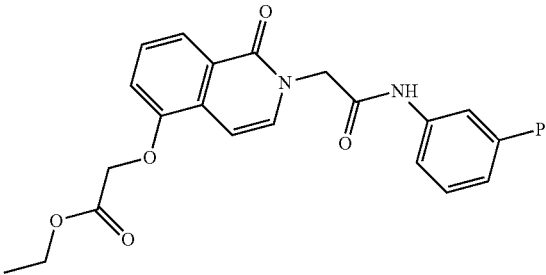 |
| R5 | 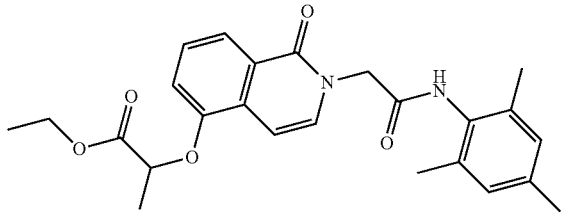 |
| R9 | 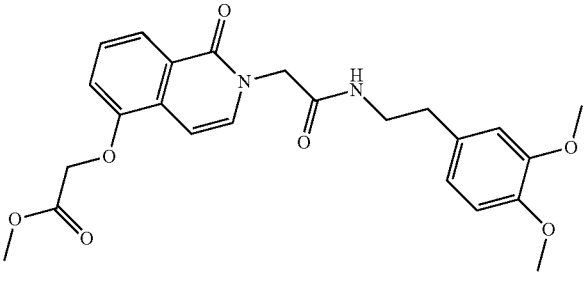 |
| R12 | 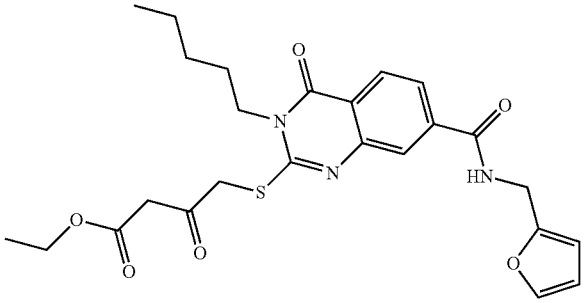 |

TABLE 1-continued

Structures of non-limiting examples of GCNF ligands, compounds 34 and 80.

| Compound ID | Structural Formula |
|---|---|
| U1 | |
| U2 | |
| U4 | |
| U7 | |

The pharmaceutical compositions and methods of the present disclosure may comprise GCNF ligands such as those disclosed herein which are shown, for example, above, in the summary of the invention section, and in the claims below and methods for their synthesis are known in the art. Synthetic methods for the preparation of these GCNF ligands can be further modified and optimized using the principles and techniques of organic chemistry as applied by a person skilled in the art. Such principles and techniques are taught, for example, in Smith, *March's Advanced Organic Chemistry: Reactions, Mechanisms, and Structure*, (2013), which is incorporated by reference herein. In addition, the synthetic methods may be further modified and optimized for preparative, pilot- or large-scale production, either batch or continuous, using the principles and techniques of process chemistry as applied by a person skilled in the art. Such principles and techniques are taught, for example, in Anderson, *Practical Process Research & Development—A Guide for Organic Chemists* (2012), which is incorporated by reference herein.

All the compounds of the present invention may in some embodiments be used for the prevention and treatment of one or more diseases or disorders discussed herein or otherwise. In some embodiments, one or more of the compounds characterized or exemplified herein as an intermediate, a metabolite, and/or prodrug, may nevertheless also be useful for the prevention and treatment of one or more diseases or disorders. As such unless explicitly stated to the contrary, all the compounds of the present invention are deemed "active compounds" and "therapeutic compounds" that are contemplated for use as active pharmaceutical ingredients (APIs). Actual suitability for human or veterinary use is typically determined using a combination of clinical trial protocols and regulatory procedures, such as those administered by the Food and Drug Administration (FDA). In the United States, the FDA is responsible for protecting the public health by assuring the safety, effectiveness, quality, and security of human and veterinary drugs, vaccines and other biological products, and medical devices.

In some embodiments, the compounds of the present invention have the advantage that they may be more efficacious than, be less toxic than, be longer acting than, be more potent than, produce fewer side effects than, be more easily absorbed than, more metabolically stable than, more lipophilic than, more hydrophilic than, and/or have a better pharmacokinetic profile (e.g., higher oral bioavailability and/or lower clearance) than, and/or have other useful pharmacological, physical, or chemical properties over, compounds known in the prior art, whether for use in the indications stated herein or otherwise.

Compounds of the present invention may contain one or more asymmetrically-substituted carbon, sulfur, or phosphorus atom and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present invention can have the S or the R configuration. In some embodiments, the present compounds may contain two or more atoms which have a defined stereochemical orientation.

Chemical formulas used to represent compounds of the present invention will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

In some embodiments, compounds of the present invention function as prodrugs or can be derivatized to function as prodrugs. Since prodrugs are known to enhance numerous desirable qualities of pharmaceuticals (e.g., solubility, bioavailability, manufacturing, etc.), the compounds employed in some methods of the invention may, if desired, be delivered in prodrug form. Thus, the invention contemplates prodrugs of compounds of the present invention as well as methods of delivering prodrugs. Prodrugs of the compounds employed in the invention may be prepared by modifying functional groups present in the compound in such a way that the modifications are cleaved, either in routine manipulation or in vivo, to the parent compound. Accordingly, prodrugs include, for example, compounds described herein in which a hydroxy, amino, or carboxy group is bonded to any group that, when the prodrug is administered to a patient, cleaves to form a hydroxy, amino, or carboxylic acid, respectively.

In some embodiments, compounds of the present invention exist in salt or non-salt form. With regard to the salt form(s), in some embodiments the particular anion or cation forming a part of any salt form of a compound provided herein is not critical, so long as the salt, as a whole, is pharmacologically acceptable. Additional examples of pharmaceutically acceptable salts and their methods of preparation and use are presented in *Handbook of Pharmaceutical Salts: Properties, and Use* (2002), which is incorporated herein by reference.

It will be appreciated that many organic compounds can form complexes with solvents in which they are reacted or from which they are precipitated or crystallized. These complexes are known as "solvates." Where the solvent is water, the complex is known as a "hydrate." It will also be appreciated that many organic compounds can exist in more than one solid form, including crystalline and amorphous forms. All solid forms of the compounds provided herein, including any solvates thereof are within the scope of the present invention.

A. Chemical Definitions

When used in the context of a chemical group: "hydrogen" means —H; "hydroxy" means —OH; "oxo" means =O; "carbonyl" means —C(=O)—; "carboxy" means —C(=O)OH (also written as —COOH or —CO$_2$H); "halo" means independently —F, —Cl, —Br or —I; "amino" means —NH$_2$; "hydroxyamino" means —NHOH; "nitro" means —NO$_2$; imino means=NH; "cyano" means —CN; "isocyanyl" means —N=C=O; "azido" means —N$_3$; in a monovalent context "phosphate" means —OP(O)(OH)$_2$ or a deprotonated form thereof; in a divalent context "phosphate" means —OP(OXOH)O— or a deprotonated form thereof; "mercapto" means —SH; and "thio" means =S; "thiocarbonyl" means —C(=S)—; "sulfonyl" means —S(O)$_2$—; and "sulfinyl" means —S(O)—.

In the context of chemical formulas, the symbol "—" means a single bond, "=" means a double bond, and "≡" means triple bond. The symbol "----" represents an optional bond, which if present is either single or double. The symbol "⟺" represents a single bond or a double bond. Thus, the formula

covers, for example,

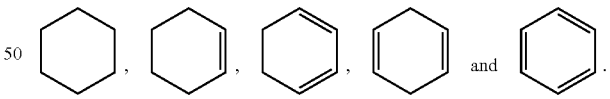

And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol "⌇", when drawn perpendicularly across a bond (e.g.,

for methyl) indicates a point of attachment of the group. It is noted that the point of attachment is typically only identified in this manner for larger groups in order to assist the reader in unambiguously identifying a point of attachment. The symbol "◀" means a single bond where the group attached to the thick end of the wedge is "out of the page." The symbol "⦀⦀⦀" means a single bond where the group attached to the thick end of the wedge is "into the page". The symbol "∿" means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom. A bold dot on a carbon atom indicates that the hydrogen attached to that carbon is oriented out of the plane of the paper.

When a variable is depicted as a "floating group" on a ring system, for example, the group "R" in the formula:

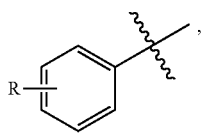

then the variable may replace any hydrogen atom attached to any of the ring atoms, including a depicted, implied, or expressly defined hydrogen, so long as a stable structure is formed. When a variable is depicted as a "floating group" on a fused ring system, as for example the group "R" in the formula:

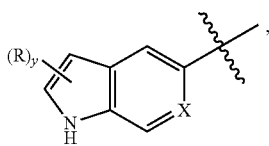

then the variable may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the R enclosed in parentheses, represents a numeric variable. Unless specified otherwise, this variable can be 0, 1, 2, or any integer greater than 2, only limited by the maximum number of replaceable hydrogen atoms of the ring or ring system.

For the chemical groups and compound classes, the number of carbon atoms in the group or class is as indicated as follows: "Cn" or "C=n" defines the exact number (n) of carbon atoms in the group/class. "C≤n" defines the maximum number (n) of carbon atoms that can be in the group/class, with the minimum number as small as possible for the group/class in question. For example, it is understood that the minimum number of carbon atoms in the groups "alkyl$_{(C≤8)}$", "alkanediyl$_{(C≤8)}$", "heteroaryl$_{(C≤8)}$", and "acyl$_{(C≤8)}$" is one, the minimum number of carbon atoms in the groups "alkeny$_{(C≤8)}$", "alkyny$_{(C≤8)}$", and "heterocycloalky$_{(C≤8)}$" is two, the minimum number of carbon atoms in the group "cycloalky$_{(C≤8)}$" is three, and the minimum number of carbon atoms in the groups "ary$_{(C≤8)}$" and "arenediy$_{(C≤8)}$" is six. "Cn-n'" defines both the minimum (n) and maximum number (n') of carbon atoms in the group. Thus, "alkyl$_{(C2-10)}$" designates those alkyl groups having from 2 to 10 carbon atoms. These carbon number indicators may precede or follow the chemical groups or class it modifies and it may or may not be enclosed in parenthesis, without signifying any change in meaning. Thus, the terms "C$_{1-4}$alkyl", "C1-4-alkyl", "alkyl$_{(C≤4)}$", and "alkyl$_{C≤4}$" are all synonymous. Except as noted below, every carbon atom is counted to determine whether the group or compound falls with the specified number of carbon atoms. For example, the group dihexylamino is an example of a dialkylamino$_{(C=8)}$ group; however, it is not an example of a dialkylamino$_{(C6)}$ group. Likewise, phenylethyl is an example of an aralkyl$_{(C=8)}$ group. When any of the chemical groups or compound classes defined herein is modified by the term "substituted", any carbon atom in the moiety replacing the hydrogen atom is not counted. Thus methoxyhexyl, which has a total of seven carbon atoms, is an example of a substituted alkyl$_{(C1-6)}$. Unless specified otherwise, any chemical group or compound class listed in a claim set without a carbon atom limit has a carbon atom limit of less than or equal to twelve.

The term "saturated" when used to modify a compound or chemical group means the compound or chemical group has no carbon-carbon double and no carbon-carbon triple bonds, except as noted below. When the term is used to modify an atom, it means that the atom is not part of any double or triple bond. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded. When the term "saturated" is used to modify a solution of a substance, it means that no more of that substance can dissolve in that solution.

The term "aliphatic" signifies that the compound or chemical group so modified is an acyclic or cyclic, but non-aromatic compound or group. In aliphatic compounds/groups, the carbon atoms can be joined together in straight chains, branched chains, or non-aromatic rings (alicyclic). Aliphatic compounds/groups can be saturated, that is joined by single carbon-carbon bonds (alkanes/alkyl), or unsaturated, with one or more carbon-carbon double bonds (alkenes/alkenyl) or with one or more carbon-carbon triple bonds (alkynes/alkynyl).

The term "aromatic" signifies that the compound or chemical group so modified has a planar unsaturated ring of atoms with 4n+2 electrons in a fully conjugated cyclic π system. An aromatic compound or chemical group may be depicted as a single resonance structure; however, depiction of one resonance structure is taken to also refer to any other resonance structure. For example:

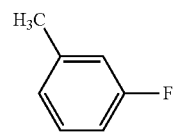

is also taken to refer to

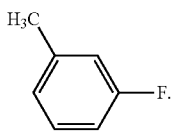

Aromatic compounds may also be depicted using a circle to represent the delocalized nature of the electrons in the fully conjugated cyclic π system, two non-limiting examples of which are shown below:

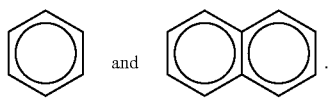

The term "alkyl" refers to a monovalent saturated aliphatic group with a carbon atom as the point of attachment, a linear or branched acyclic structure, and no atoms other than carbon and hydrogen. The groups —CH$_3$ (Me), —CH$_2$CH$_3$ (Et), —CH$_2$CH$_2$CH$_3$ (n-Pr or propyl), —CH(CH$_3$)$_2$ (i-Pr, $^i$Pr or isopropyl), —CH$_2$CH$_2$CH$_2$CH$_3$ (n-Bu), —CH(CH$_3$)CH$_2$CH$_3$ (sec-butyl), —CH$_2$CH(CH$_3$)$_2$ (isobutyl), —C(CH$_3$)$_3$ (tert-butyl, t-butyl, t-Bu or $^t$Bu), and —CH$_2$C(CH$_3$)$_3$ (neo-pentyl) are non-limiting examples of alkyl groups. The term "alkanediyl" refers to a divalent saturated aliphatic group, with one or two saturated carbon atom(s) as the point(s) of attachment, a linear or branched acyclic structure, no carbon-carbon double or triple bonds, and no atoms other than carbon and hydrogen. The groups —CH$_2$— (methylene), —CH$_2$CH$_2$—, —CH$_2$C(CH$_3$)$_2$CH$_2$—, and —CH$_2$CH$_2$CH$_2$— are non-limiting examples of alkanediyl groups. The term "alkylidene" refers to the divalent group =CRR' in which R and R' are independently hydrogen or alkyl. Non-limiting examples of alkylidene groups include: =CH$_2$, =CH(CH$_2$CH$_3$), and =C(CH$_3$)$_2$. An "alkane" refers to the class of compounds having the formula H—R, wherein R is alkyl as this term is defined above.

The term "cycloalkyl" refers to a monovalent saturated aliphatic group with a carbon atom as the point of attachment, said carbon atom forming part of one or more non-aromatic ring structures, no carbon-carbon double or triple bonds, and no atoms other than carbon and hydrogen. Non-limiting examples include: —CH(CH$_2$)$_2$ (cyclopropyl), cyclobutyl, cyclopentyl, or cyclohexyl (Cy). As used herein, the term does not preclude the presence of one or more alkyl groups (carbon number limitation permitting) attached to a carbon atom of the non-aromatic ring structure. The term "cycloalkanediyl" refers to a divalent saturated aliphatic group with two carbon atoms as points of attachment, no carbon-carbon double or triple bonds, and no atoms other than carbon and hydrogen. The group

is a non-limiting example of cycloalkanediyl group. A "cycloalkane" refers to the class of compounds having the formula H—R, wherein R is cycloalkyl as this term is defined above.

The term "alkenyl" refers to a monovalent unsaturated aliphatic group with a carbon atom as the point of attachment, a linear or branched, acyclic structure, at least one nonaromatic carbon-carbon double bond, no carbon-carbon triple bonds, and no atoms other than carbon and hydrogen. Non-limiting examples include: —CH=CH$_2$ (vinyl), —CH=CHCH$_3$, —CH=CHCH$_2$CH$_3$, —CH$_2$CH=CH$_2$ (allyl), —CH$_2$CH=CHCH$_3$, and —CH=CHCH=CH$_2$. The term "alkenediyl" refers to a divalent unsaturated aliphatic group, with two carbon atoms as points of attachment, a linear or branched acyclic structure, at least one nonaromatic carbon-carbon double bond, no carbon-carbon triple bonds, and no atoms other than carbon and hydrogen. The groups —CH=CH—, —CH=C(CH$_3$)CH$_2$—, —CH=CHCH$_2$—, and —CH$_2$CH=CHCH$_2$— are non-limiting examples of alkenediyl groups. It is noted that while the alkenediyl group is aliphatic, once connected at both ends, this group is not precluded from forming part of an aromatic structure. The terms "alkene" and "olefin" are synonymous and refer to the class of compounds having the formula H—R, wherein R is alkenyl as this term is defined above. Similarly, the terms "terminal alkene" and "α-olefin" are synonymous and refer to an alkene having just one carbon-carbon double bond, wherein that bond is part of a vinyl group at an end of the molecule.

The term "alkynyl" refers to a monovalent unsaturated aliphatic group with a carbon atom as the point of attachment, a linear or branched acyclic structure, at least one carbon-carbon triple bond, and no atoms other than carbon and hydrogen. As used herein, the term alkynyl does not preclude the presence of one or more non-aromatic carbon-carbon double bonds. The groups —C≡CH, —C≡CCH$_3$, and —CH$_2$C≡CCH$_3$ are non-limiting examples of alkynyl groups. An "alkyne" refers to the class of compounds having the formula H—R, wherein R is alkynyl.

The term "aryl" refers to a monovalent unsaturated aromatic group with an aromatic carbon atom as the point of attachment, said carbon atom forming part of a one or more aromatic ring structures, each with six ring atoms that are all carbon, and wherein the group consists of no atoms other than carbon and hydrogen. If more than one ring is present, the rings may be fused or unfused. Unfused rings are connected with a covalent bond. As used herein, the term aryl does not preclude the presence of one or more alkyl groups (carbon number limitation permitting) attached to the first aromatic ring or any additional aromatic ring present. Non-limiting examples of aryl groups include phenyl (Ph), methylphenyl, (dimethyl)phenyl, —C$_6$H$_4$CH$_2$CH$_3$ (ethylphenyl), naphthyl, and a monovalent group derived from biphenyl (e.g., 4-phenylphenyl). The term "arenediyl" refers to a divalent aromatic group with two aromatic carbon atoms as points of attachment, said carbon atoms forming part of one or more six-membered aromatic ring structures, each with six ring atoms that are all carbon, and wherein the divalent group consists of no atoms other than carbon and hydrogen. As used herein, the term arenediyl does not preclude the presence of one or more alkyl groups (carbon number limitation permitting) attached to the first aromatic ring or any additional aromatic ring present. If more than one ring is present, the rings may be fused or unfused. Unfused rings are connected with a covalent bond. Non-limiting examples of arenediyl groups include:

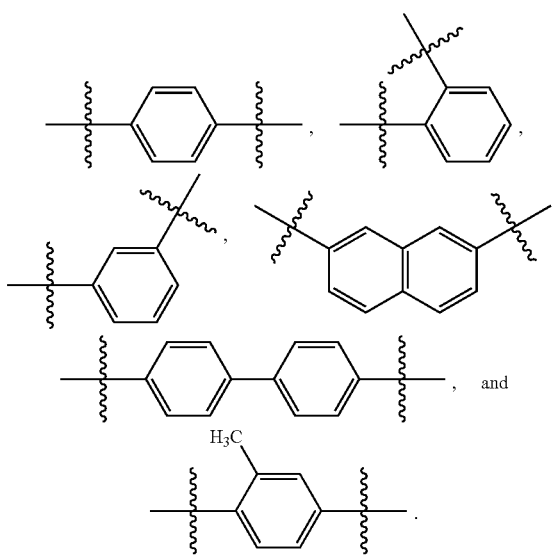

An "arene" refers to the class of compounds having the formula H—R, wherein R is aryl as that term is defined above. Benzene and toluene are non-limiting examples of arenes.

The term "aralkyl" refers to the monovalent group -alkanediyl-aryl, in which the terms alkanediyl and aryl are each used in a manner consistent with the definitions provided above. Non-limiting examples are: phenylmethyl (benzyl, Bn) and 2-phenyl-ethyl.

The term "heteroaryl" refers to a monovalent aromatic group with an aromatic carbon atom or nitrogen atom as the point of attachment, said carbon atom or nitrogen atom forming part of one or more aromatic ring structures, each with three to eight ring atoms, wherein at least one of the ring atoms of the aromatic ring structure(s) is nitrogen, oxygen or sulfur, and wherein the heteroaryl group consists of no atoms other than carbon, hydrogen, aromatic nitrogen, aromatic oxygen and aromatic sulfur. If more than one ring is present, the rings are fused; however, the term heteroaryl does not preclude the presence of one or more alkyl or aryl groups (carbon number limitation permitting) attached to one or more ring atoms. Non-limiting examples of heteroaryl groups include benzoxazolyl, benzimidazolyl, furanyl, imidazolyl (Im), indolyl, indazolyl, isoxazolyl, methylpyridinyl, oxazolyl, oxadiazolyl, phenylpyridinyl, pyridinyl (pyridyl), pyrrolyl, pyrimidinyl, pyrazinyl, quinolyl, quinazolyl, quinoxalinyl, triazinyl, tetrazolyl, thiazolyl, thienyl, and triazolyl. The term "N-heteroaryl" refers to a heteroaryl group with a nitrogen atom as the point of attachment. A "heteroarene" refers to the class of compounds having the formula H—R, wherein R is heteroaryl. Pyridine and quinoline are non-limiting examples of heteroarenes.

The term "heteroaralkyl" refers to the monovalent group -alkanediyl-heteroaryl, in which the terms alkanediyl and heteroaryl are each used in a manner consistent with the definitions provided above. Non-limiting examples are: pyridinylmethyl and 2-quinolinyl-ethyl.

The term "heterocycloalkyl" refers to a monovalent non-aromatic group with a carbon atom or nitrogen atom as the point of attachment, said carbon atom or nitrogen atom forming part of one or more non-aromatic ring structures, each with three to eight ring atoms, wherein at least one of the ring atoms of the non-aromatic ring structure(s) is nitrogen, oxygen or sulfur, and wherein the heterocycloalkyl group consists of no atoms other than carbon, hydrogen, nitrogen, oxygen and sulfur. If more than one ring is present, the rings are fused. As used herein, the term does not preclude the presence of one or more alkyl groups (carbon number limitation permitting) attached to one or more ring atoms. Also, the term does not preclude the presence of one or more double bonds in the ring or ring system, provided that the resulting group remains non-aromatic. Non-limiting examples of heterocycloalkyl groups include aziridinyl, azetidinyl, pyrrolidinyl, piperidinyl, piperazinyl, morpholinyl, thiomorpholinyl, tetrahydrofuranyl, tetrahydrothiofuranyl, tetrahydropyranyl, pyranyl, oxiranyl, and oxetanyl. The term "N-heterocycloalkyl" refers to a heterocycloalkyl group with a nitrogen atom as the point of attachment. N-pyrrolidinyl is an example of such a group.

The term "acyl" refers to the group —C(O)R, in which R is a hydrogen, alkyl, cycloalkyl, or aryl as those terms are defined above. The groups, —CHO, —C(O)CH$_3$ (acetyl, Ac), —C(O)CH$_2$CH$_3$, —C(O)CH(CH$_3$)$_2$, —C(O)CH(CH$_2$)$_2$, —C(O)C$_6$H$_5$, and —C(O)C$_6$H$_4$CH$_3$ are non-limiting examples of acyl groups. A "thioacyl" is defined in an analogous manner, except that the oxygen atom of the group —C(O)R has been replaced with a sulfur atom, —C(S)R. The term "aldehyde" corresponds to an alkyl group, as defined above, attached to a —CHO group.

The term "alkoxy" refers to the group —OR, in which R is an alkyl, as that term is defined above. Non-limiting examples include: —OCH$_3$ (methoxy), —OCH$_2$CH$_3$ (ethoxy), —OCH$_2$CH$_2$CH$_3$, —OCH(CH$_3$)$_2$ (isopropoxy), or —OC(CH$_3$)$_3$ (tert-butoxy). The terms "cycloalkoxy", "alkenyloxy", "alkynyloxy", "aryloxy", "aralkoxy", "heteroaryloxy", "heterocycloalkoxy", and "acyloxy", when used without the "substituted" modifier, refers to groups, defined as —OR, in which R is cycloalkyl, alkenyl, alkynyl, aryl, aralkyl, heteroaryl, heterocycloalkyl, and acyl, respectively. The term "alkylthio" and "acylthio" refers to the group —SR, in which R is an alkyl and acyl, respectively. The term "alcohol" corresponds to an alkane, as defined above, wherein at least one of the hydrogen atoms has been replaced with a hydroxy group. The term "ether" corresponds to an alkane, as defined above, wherein at least one of the hydrogen atoms has been replaced with an alkoxy group.

The term "alkylamino" refers to the group —NHR, in which R is an alkyl, as that term is defined above. Non-limiting examples include: —NHCH$_3$ and —NHCH$_2$CH$_3$. The term "dialkylamino" refers to the group —NRR', in which R and R' can be the same or different alkyl groups. Non-limiting examples of dialkylamino groups include: —N(CH$_3$)$_2$ and —N(CH$_3$)(CH$_2$CH$_3$). The term "amido" (acylamino), when used without the "substituted" modifier, refers to the group —NHR, in which R is acyl, as that term is defined above. A non-limiting example of an amido group is —NHC(O)CH$_3$.

When a chemical group is used with the "substituted" modifier, one or more hydrogen atom has been replaced, independently at each instance, by —OH, —F, —Cl, —Br, —I, —NH$_2$, —NO$_2$, —CO$_2$H, —CO$_2$CH$_3$, —CO$_2$CH$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$. For example, the following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N(CH$_3$)$_2$, and —CH$_2$CH$_2$Cl. The term "haloalkyl" is a subset of substituted alkyl, in which the hydrogen atom replacement is limited to halo (i.e. —F, —Cl, —Br, or —I) such that no other atoms aside from carbon, hydrogen and halogen are present. The group, —CH$_2$Cl is a non-limiting example of a haloalkyl. The term "fluoroalkyl" is a subset of substituted alkyl, in which the hydrogen atom replacement is limited to fluoro such that no other atoms aside from carbon, hydrogen and fluorine are present. The groups —CH$_2$F, —CF$_3$, and —CH$_2$CF$_3$ are non-limiting examples of fluoroalkyl groups. Non-limiting examples of substituted aralkyls are: (3-chlorophenyl)-methyl, and 2-chloro-2-phenyl-eth-1-yl. The groups, —C(O)CH$_2$CF$_3$, —CO$_2$H (carboxyl), —CO$_2$CH$_3$ (ethylcarboxyl), —CO$_2$CH$_2$CH$_3$, —C(O)NH$_2$ (carbamoyl), and —CON(CH$_3$)$_2$, are non-limiting examples of substituted acyl groups. The groups —NHC(O)OCH$_3$ and —NHC(O)NHCH$_3$ are non-limiting examples of substituted amido groups.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects or patients.

An "active ingredient" (AI) or active pharmaceutical ingredient (API) (also referred to as an active compound, active substance, active agent, pharmaceutical agent, agent, biologically active molecule, or a therapeutic compound) is the ingredient in a pharmaceutical drug that is biologically active.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result. "Effective amount," "Therapeutically effective amount" or "pharmaceutically effective amount" when used in the context of treating a patient or subject with a compound means that amount of the compound which, when administered to the patient or subject, is sufficient to effect such treatment or prevention of the disease as those terms are defined below.

An "excipient" is a pharmaceutically acceptable substance formulated along with the active ingredient(s) of a medication, pharmaceutical composition, formulation, or drug delivery system. Excipients may be used, for example, to stabilize the composition, to bulk up the composition (thus often referred to as "bulking agents," "fillers," or "diluents" when used for this purpose), or to confer a therapeutic enhancement on the active ingredient in the final dosage form, such as facilitating drug absorption, reducing viscosity, or enhancing solubility. Excipients include pharmaceutically acceptable versions of antiadherents, binders, coatings, colors, disintegrants, flavors, glidants, lubricants, preservatives, sorbents, sweeteners, and vehicles. The main excipient that serves as a medium for conveying the active ingredient is usually called the vehicle. Excipients may also be used in the manufacturing process, for example, to aid in the handling of the active substance, such as by facilitating powder flowability or non-stick properties, in addition to aiding in vitro stability such as prevention of denaturation or aggregation over the expected shelf life. The suitability of an excipient will typically vary depending on the route of administration, the dosage form, the active ingredient, as well as other factors.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

As used herein, the term "IC$_{50}$" refers to an inhibitory dose which is 50% of the maximum response obtained. This quantitative measure indicates how much of a particular drug or other substance (inhibitor) is needed to inhibit a given biological, biochemical or chemical process (or component of a process, i.e. an enzyme, cell, cell receptor or microorganism) by half.

An "isomer" of a first compound is a separate compound in which each molecule contains the same constituent atoms as the first compound, but where the configuration of those atoms in three dimensions differs.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

As generally used herein "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Pharmaceutically acceptable salts" means salts of compounds disclosed herein which are pharmaceutically acceptable, as defined above, and which possess the desired pharmacological activity. Such salts include acid addition salts formed with inorganic acids such as hydrochloric acid, hydrobromic acid, sulfuric acid, nitric acid, phosphoric acid, and the like; or with organic acids such as 1,2-ethanedisulfonic acid, 2-hydroxyethanesulfonic acid, 2-naphthalenesulfonic acid, 3-phenylpropionic acid, 4,4'-methylenebis(3-hydroxy-2-ene-1-carboxylic acid), 4-methylbicyclo[2.2.2]oct-2-ene-1-carboxylic acid, acetic acid, aliphatic mono- and dicarboxylic acids, aliphatic sulfuric acids, aromatic sulfuric acids, benzenesulfonic acid, benzoic acid, camphorsulfonic acid, carbonic acid, cinnamic acid, citric acid, cyclopentanepropionic acid, ethanesulfonic acid, fumaric acid, glucoheptonic acid, gluconic acid, glutamic acid, glycolic acid, heptanoic acid, hexanoic acid, hydroxynaphthoic acid, lactic acid, laurylsulfuric acid, maleic acid, malic acid, malonic acid, mandelic acid, methanesulfonic acid, muconic acid, o-(4-hydroxybenzoyl)benzoic acid, oxalic acid, p-chlorobenzenesulfonic acid, phenyl-substituted alkanoic acids, propionic acid, p-toluenesulfonic acid, pyruvic acid, salicylic acid, stearic acid, succinic acid, tartaric acid, tertiarybutylacetic acid, trimethylacetic acid, and the like. Pharmaceutically acceptable salts also include base addition salts which may be formed when acidic protons present are capable of reacting with inorganic or organic bases. Acceptable inorganic bases include sodium hydroxide, sodium carbonate, potassium hydroxide, aluminum hydroxide and calcium hydroxide. Acceptable organic bases include ethanolamine, diethanolamine, triethanolamine, tromethamine, N-methylglucamine and the like. It should be recognized that the particular anion or cation forming a part of any salt of this invention is not critical, so long as the salt, as a whole, is pharmacologically acceptable. Additional examples of pharmaceutically acceptable salts and their methods of preparation and use are presented in *Handbook of Pharmaceutical Salts: Properties, and Use* (P. H. Stahl & C. G. Wermuth eds., Verlag Helvetica Chimica Acta, 2002).

A "pharmaceutically acceptable carrier," "drug carrier," or simply "carrier" is a pharmaceutically acceptable substance formulated along with the active ingredient medication that is involved in carrying, delivering and/or transporting a chemical agent. Drug carriers may be used to improve the delivery and the effectiveness of drugs, including for example, controlled-release technology to modulate drug bioavailability, decrease drug metabolism, and/or reduce drug toxicity. Some drug carriers may increase the effectiveness of drug delivery to the specific target sites. Examples of carriers include: liposomes, microspheres (e.g., made of poly(lactic-co-glycolic) acid), albumin microspheres, synthetic polymers, nanofibers, protein-DNA complexes, protein conjugates, erythrocytes, virosomes, and dendrimers.

A "pharmaceutical drug" (also referred to as a pharmaceutical, pharmaceutical preparation, pharmaceutical composition, pharmaceutical formulation, pharmaceutical product, medicinal product, medicine, medication, medicament, or simply a drug, agent, or preparation) is a composition used to diagnose, cure, treat, or prevent disease, which comprises an active pharmaceutical ingredient (API) (defined above) and optionally contains one or more inactive ingredients, which are also referred to as excipients (defined above).

"Prodrug" means a compound that is convertible in vivo metabolically into an active pharmaceutical ingredient of the present invention. The prodrug itself may or may not have activity in its prodrug form. For example, a compound comprising a hydroxy group may be administered as an ester that is converted by hydrolysis in vivo to the hydroxy compound. Non-limiting examples of suitable esters that may be converted in vivo into hydroxy compounds include acetates, citrates, lactates, phosphates, tartrates, malonates, oxalates, salicylates, propionates, succinates, fumarates, maleates, methylene-bis-β-hydroxynaphthoate, gentisates, isethionates, di-p-toluoyltartrates, methanesulfonates, ethanesulfonates, benzenesulfonates, p-toluenesulfonates, cyclohexylsulfamates, quinates, and esters of amino acids. Similarly, a compound comprising an amine group may be administered as an amide that is converted by hydrolysis in vivo to the amine compound.

A "stereoisomer" or "optical isomer" is an isomer of a given compound in which the same atoms are bonded to the same other atoms, but where the configuration of those atoms in three dimensions differs. "Enantiomers" are stereoisomers of a given compound that are mirror images of each other, like left and right hands. "Diastereomers" are stereoisomers of a given compound that are not enantiomers. Chiral molecules contain a chiral center, also referred to as a stereocenter or stereogenic center, which is any point, though not necessarily an atom, in a molecule bearing groups such that an interchanging of any two groups leads to a stereoisomer. In organic compounds, the chiral center is typically a carbon, phosphorus or sulfur atom, though it is also possible for other atoms to be stereocenters in organic and inorganic compounds. A molecule can have multiple stereocenters, giving it many stereoisomers. In compounds whose stereoisomerism is due to tetrahedral stereogenic centers (e.g., tetrahedral carbon), the total number of hypothetically possible stereoisomers will not exceed $2^n$, where n is the number of tetrahedral stereocenters. Molecules with symmetry frequently have fewer than the maximum possible number of stereoisomers. A 50:50 mixture of enantiomers is referred to as a racemic mixture. Alternatively, a mixture of enantiomers can be enantiomerically enriched so that one enantiomer is present in an amount greater than 50%. Typically, enantiomers and/or diastereomers can be resolved or separated using techniques known in the art. It is contemplated that that for any stereocenter or axis of chirality for which stereochemistry has not been defined, that stereocenter or axis of chirality can be present in its R form, S form, or as a mixture of the R and S forms, including racemic and non-racemic mixtures. As used herein, the phrase "substantially free from other stereoisomers" means that the composition contains ≤15%, more preferably ≤10%, even more preferably ≤5%, or most preferably ≤1% of another stereoisomer(s).

The term "unit dose" refers to a formulation of the compound or composition such that the formulation is prepared in a manner sufficient to provide a single therapeutically effective dose of the active ingredient to a patient in a single administration. Such unit dose formulations that may be used include but are not limited to a single tablet, capsule, or other oral formulations, or a single vial with a syringeable liquid or other injectable formulations.

The above definitions supersede any conflicting definition in any reference that is incorporated by reference herein. The fact that certain terms are defined, however, should not be considered as indicative that any term that is undefined is indefinite. Rather, all terms used are believed to describe the disclosure in terms such that one of ordinary skill can appreciate the scope and practice the present disclosure.

II. THERAPIES

A. Pharmaceutical Formulations and Routes of Administration

In another aspect, for administration to a patient in need of such treatment, pharmaceutical formulations (also referred to as a pharmaceutical preparations, pharmaceutical compositions, pharmaceutical products, medicinal products, medicines, medications, or medicaments) comprise a therapeutically effective amount of a compound disclosed herein formulated with one or more excipients and/or drug carriers appropriate to the indicated route of administration. In some embodiments, the compounds disclosed herein are formulated in a manner amenable for the treatment of human and/or veterinary patients. In some embodiments, formulation comprises admixing or combining one or more of the compounds disclosed herein with one or more of the following excipients: lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia, sodium alginate, polyvinylpyrrolidone, and/or polyvinyl alcohol. In some embodiments, e.g., for oral administration, the pharmaceutical formulation may be tableted or encapsulated. In some embodiments, the compounds may be dissolved or slurried in water, polyethylene glycol, propylene glycol, ethanol, corn oil, cottonseed oil, peanut oil, sesame oil, benzyl alcohol, sodium chloride, and/or various buffers. In some embodiments, the pharmaceutical formulations may be subjected to pharmaceutical operations, such as sterilization, and/or may contain drug carriers and/or excipients such as preservatives, stabilizers, wetting agents, emulsifiers, encapsulating agents such as lipids, dendrimers, polymers, proteins such as albumin, nucleic acids, and buffers.

Pharmaceutical formulations may be administered by a variety of methods, e.g., orally or by injection (e.g. subcutaneous, intravenous, and intraperitoneal). Depending on the route of administration, the compounds disclosed herein may be coated in a material to protect the compound from the action of acids and other natural conditions which may inactivate the compound. To administer the active compound by other than parenteral administration, it may be necessary to coat the compound with, or co-administer the compound with, a material to prevent its inactivation. In some embodiments, the active compound may be administered to a patient in an appropriate carrier, for example, liposomes, or a diluent. Pharmaceutically acceptable diluents include saline and aqueous buffer solutions. Liposomes include water-in-oil-in-water CGF emulsions as well as conventional liposomes.

The compounds disclosed herein may also be administered parenterally, intraperitoneally, intraspinally, or intracerebrally. Dispersions can be prepared in glycerol, liquid polyethylene glycols, and mixtures thereof and in oils. Under ordinary conditions of storage and use, these preparations may contain a preservative to prevent the growth of microorganisms.

Pharmaceutical compositions suitable for injectable use include sterile aqueous solutions (where water soluble) or dispersions and sterile powders for the extemporaneous preparation of sterile injectable solutions or dispersion. The carrier can be a solvent or dispersion medium containing, for example, water, ethanol, polyol (such as, glycerol, propylene glycol, and liquid polyethylene glycol, and the like), suitable mixtures thereof, and vegetable oils. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, sodium chloride, or polyalcohols such as mannitol and sorbitol, in the composition. Prolonged absorption of the injectable compositions can be brought about by including in the composition an agent which delays absorption, for example, aluminum monostearate or gelatin.

The compounds disclosed herein can be administered orally, for example, with an inert diluent or an assimilable edible carrier. The compounds and other ingredients may also be enclosed in a hard or soft-shell gelatin capsule, compressed into tablets, or incorporated directly into the patient's diet. For oral therapeutic administration, the compounds disclosed herein may be incorporated with excipients and used in the form of ingestible tablets, buccal tablets, troches, capsules, elixirs, suspensions, syrups, wafers, and the like. The percentage of the therapeutic compound in the compositions and preparations may, of course, be varied. The amount of the therapeutic compound in such pharmaceutical formulations is such that a suitable dosage will be obtained.

The therapeutic compound may also be administered topically to the skin, eye, ear, or mucosal membranes. Administration of the therapeutic compound topically may include formulations of the compounds as a topical solution, lotion, cream, ointment, gel, foam, transdermal patch, or tincture. When the therapeutic compound is formulated for topical administration, the compound may be combined with one or more agents that increase the permeability of the compound through the tissue to which it is administered. In other embodiments, it is contemplated that the topical administration is administered to the eye. Such administration may be applied to the surface of the cornea, conjunctiva, or sclera. Without wishing to be bound by any theory, it is believed that administration to the surface of the eye allows the therapeutic compound to reach the posterior portion of the eye. Ophthalmic topical administration can be formulated as a solution, suspension, ointment, gel, or emulsion. Finally, topical administration may also include administration to the mucosa membranes such as the inside of the mouth. Such administration can be directly to a particular location within the mucosal membrane such as a tooth, a sore, or an ulcer. Alternatively, if local delivery to the lungs is desired the therapeutic compound may be administered by inhalation in a dry-powder or aerosol formulation.

In some embodiments, it may be advantageous to formulate parenteral compositions in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical carrier. In some embodiments, the specification for the dosage unit forms of the invention are dictated by and directly dependent on (a) the unique characteristics of the therapeutic compound and the particular therapeutic effect to be achieved, and (b) the limitations inherent in the art of compounding such a therapeutic compound for the treatment of a selected condition in a patient. In some embodiments, active compounds are administered at a therapeutically effective dosage sufficient to treat a condition associated with a condition in a patient. For example, the efficacy of a compound can be evaluated in an animal model system that may be predictive of efficacy in treating the disease in a human or another animal.

In some embodiments, the effective dose range for the therapeutic compound can be extrapolated from effective doses determined in animal studies for a variety of different animals. In some embodiments, the human equivalent dose (HED) in mg/kg can be calculated in accordance with the following formula (see, e.g., Reagan-Shaw et al., *FASEB J.*, 22(3):659-661,2008, which is incorporated herein by reference):

$$HED(mg/kg)=\text{Animal dose (mg/kg)} \times (\text{Animal } K_m/\text{Human } K_m)$$

Use of the $K_m$ factors in conversion results in HED values based on body surface area (BSA) rather than only on body mass. $K_m$ values for humans and various animals are well known. For example, the $K_m$ for an average 60 kg human (with a BSA of 1.6 m$^2$) is 37, whereas a 20 kg child (BSA 0.8 m$^2$) would have a $K_m$ of 25. $K_m$ for some relevant animal models are also well known, including: mice $K_m$ of 3 (given a weight of 0.02 kg and BSA of 0.007); hamster $K_m$ of 5 (given a weight of 0.08 kg and BSA of 0.02); rat $K_m$ of 6 (given a weight of 0.15 kg and BSA of 0.025) and monkey $K_m$ of 12 (given a weight of 3 kg and BSA of 0.24).

Precise amounts of the therapeutic composition depend on the judgment of the practitioner and are specific to each individual. Nonetheless, a calculated HED dose provides a general guide. Other factors affecting the dose include the physical and clinical state of the patient, the route of administration, the intended goal of treatment and the potency, stability and toxicity of the particular therapeutic formulation.

The actual dosage amount of a compound of the present disclosure or composition comprising a compound of the present disclosure administered to a patient may be determined by physical and physiological factors such as type of animal treated, age, sex, body weight, severity of condition, the type of disease being treated, previous or concurrent therapeutic interventions, idiopathy of the patient and on the route of administration. These factors may be determined by a skilled artisan. The practitioner responsible for administration will typically determine the concentration of active ingredient(s) in a composition and appropriate dose(s) for the individual patient. The dosage may be adjusted by the individual physician in the event of any complication.

In some embodiments, the therapeutically effective amount typically will vary from about 0.001 mg/kg to about 1000 mg/kg, from about 0.01 mg/kg to about 750 mg/kg, from about 100 mg/kg to about 500 mg/kg, from about 1 mg/kg to about 250 mg/kg, from about 10 mg/kg to about 150 mg/kg in one or more dose administrations daily, for one or several days (depending of course of the mode of administration and the factors discussed above). Other suitable dose ranges include 1 mg to 10,000 mg per day, 100 mg to 10,000 mg per day, 500 mg to 10,000 mg per day, and 500 mg to 1,000 mg per day. In some embodiments, the amount is less than 10,000 mg per day with a range of 750 mg to 9,000 mg per day.

In some embodiments, the amount of the active compound in the pharmaceutical formulation is from about 2 to about 75 weight percent. In some of these embodiments, the amount if from about 25 to about 60 weight percent.

Single or multiple doses of the agents are contemplated. Desired time intervals for delivery of multiple doses can be determined by one of ordinary skill in the art employing no more than routine experimentation. As an example, patients may be administered two doses daily at approximately 12-hour intervals. In some embodiments, the agent is administered once a day.

The agent(s) may be administered on a routine schedule. As used herein a routine schedule refers to a predetermined designated period of time. The routine schedule may encompass periods of time which are identical, or which differ in length, as long as the schedule is predetermined. For instance, the routine schedule may involve administration twice a day, every day, every two days, every three days, every four days, every five days, every six days, a weekly basis, a monthly basis or any set number of days or weeks there-between. Alternatively, the predetermined routine schedule may involve administration on a twice daily basis for the first week, followed by a daily basis for several months, etc. In other embodiments, the invention provides that the agent(s) may be taken orally and that the timing of which is or is not dependent upon food intake. Thus, for example, the agent can be taken every morning and/or every evening, regardless of when the patient has eaten or will eat.

B. Methods of Treatment

The term "subject" or "patient" as used herein refers to any individual to which the subject methods are performed. Generally the patient is human, although as will be appreciated by those in the art, the patient may be an animal. Thus other animals, including mammals such as rodents (including mice, rats, hamsters and guinea pigs), cats, dogs, rabbits, farm animals including cows, horses, goats, sheep, pigs, etc., and primates (including monkeys, chimpanzees, orangutans and gorillas) are included within the definition of patient.

"Treatment" or "treating" includes (1) inhibiting a disease in a subject or patient experiencing or displaying the pathology or symptomatology of the disease (e.g., arresting further development of the pathology and/or symptomatology), (2) ameliorating a disease in a subject or patient that is experiencing or displaying the pathology or symptomatology of the disease (e.g., reversing the pathology and/or symptomatology), and/or (3) effecting any measurable decrease in a disease or symptom thereof in a subject or patient that is experiencing or displaying the pathology or symptomatology of the disease.

"Prevention" or "preventing" includes: (1) inhibiting the onset of a disease in a subject or patient which may be at risk and/or predisposed to the disease but does not yet experience or display any or all of the pathology or symptomatology of the disease, and/or (2) slowing the onset of the pathology or symptomatology of a disease in a subject or patient which may be at risk and/or predisposed to the disease but does not yet experience or display any or all of the pathology or symptomatology of the disease.

The terms "contacted" and "exposed," when applied to a cell, are used herein to describe the process by which a therapeutic construct and a chemotherapeutic or radiotherapeutic agent are delivered to a target cell or are placed in direct juxtaposition with the target cell. To achieve cell killing, for example, both agents are delivered to a cell in a combined amount effective to kill the cell or prevent it from dividing.

While hyperproliferative diseases can be associated with any disease which causes a cell to begin to reproduce uncontrollably, the prototypical example is cancer. Psoriasis is another example. One of the key elements of cancer is that the cell's normal apoptotic cycle is interrupted and thus agents that interrupt the growth of the cells are important as therapeutic agents for treating these diseases. In some embodiments, the caffeic acid derivatives described herein may be used to decreased cell counts and as such may be used to treat a variety of cancers or other malignancies.

The methods described herein are useful in inhibiting survival or proliferation of cells (e.g., tumor cells), treating proliferative disease (e.g., cancer, psoriasis), and treating pathogenic infection. Generally, the terms "cancer" and "cancerous" refer to or describe the physiological condition in mammals that is typically characterized by unregulated cell growth. More specifically, cancers that are treated in connection with the methods provided herein include, but are not limited to, solid tumors, metastatic cancers, or non-metastatic cancers. In certain embodiments, the cancer may originate in the lung, kidney, bladder, blood, bone, bone marrow, brain, breast, colon, esophagus, duodenum, small intestine, large intestine, colon, rectum, anus, gum, head, liver, nasopharynx, neck, ovary, pancreas, prostate, skin, stomach, testis, tongue, or uterus.

The cancer may specifically be of the following histological type, though it is not limited to these: neoplasm, malignant; carcinoma; non-small cell lung cancer, renal cancer, renal cell carcinoma; clear cell renal cell carcinoma; lymphoma; blastoma; sarcoma; carcinoma, undifferentiated; meningioma; brain cancer; oropharyngeal cancer, nasopharyngeal cancer; biliary cancer; pheochromocytoma; pancreatic islet cell cancer, Li-Fraumeni tumor, thyroid cancer, parathyroid cancer; pituitary tumor; adrenal gland tumor; osteogenic sarcoma tumor, neuroendocrine tumor, breast cancer, lung cancer, head and neck cancer; prostate cancer, esophageal cancer, tracheal cancer; liver cancer, bladder cancer, stomach cancer, pancreatic cancer; ovarian cancer; uterine cancer; cervical cancer; testicular cancer; colon cancer, rectal cancer; skin cancer; giant and spindle cell carcinoma; small cell carcinoma; small cell lung cancer; papillary carcinoma; oral cancer; oropharyngeal cancer, nasopharyngeal cancer, respiratory cancer; urogenital cancer; squamous cell carcinoma; lymphoepithelial carcinoma; basal cell carcinoma; pilomatrix carcinoma; transitional cell carcinoma; papillary transitional cell carcinoma; adenocarcinoma; gastrointestinal cancer, gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma with squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extra-mammary paraganglioma, malignant; pheochromocytoma; glomangiosarcoma; malignant melanoma; amelanotic melanoma; superficial spreading melanoma; malignant melanoma in giant pigmented nevus; lentigo maligna melanoma; acral lentiginous melanoma; nodular melanoma; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; an endocrine or neuroendocrine cancer or hematopoietic cancer, pinealoma, malignant; chordoma; central or peripheral nervous system tissue cancer; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; B-cell lymphoma; malignant lymphoma; Hodgkin's disease; Hodgkin's; low grade/follicular non-Hodgkin's lymphoma; paragranuloma; malignant lymphoma, small lymphocytic; malignant lymphoma, large cell, diffuse; malignant lymphoma, follicular; mycosis fungoides; mantle cell lymphoma; Waldenstrom's macroglobulinemia; other specified non-hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaiyoblastic leukemia; myeloid sarcoma; chronic lymphocytic leukemia (CLL); acute lymphoblastic leukemia (ALL); Hairy cell leukemia; chronic myeloblastic leukemia; and hairy cell leukemia.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the invasiveness of a tumor, reduction in the growth rate of the cancer, or prevention of metastasis. Treatment of cancer may also refer to prolonging survival of a subject with cancer.

Likewise, an effective response of a patient or a patient's "responsiveness" to treatment refers to the clinical or therapeutic benefit imparted to a patient at risk for, or suffering from, a disease or disorder. Such benefit may include cellular or biological responses, a complete response, a partial response, a stable disease (without progression or relapse), or a response with a later relapse. For example, an effective response can be reduced tumor size or progression-free survival in a patient diagnosed with cancer.

Regarding neoplastic condition treatment, depending on the stage of the neoplastic condition, neoplastic condition treatment involves one or a combination of the following therapies: surgery to remove the neoplastic tissue, radiation therapy, and chemotherapy. Other therapeutic regimens may be combined with the administration of the anticancer agents, e.g., therapeutic compositions and chemotherapeutic agents. For example, the patient to be treated with such anti-cancer agents may also receive radiation therapy and/or may undergo surgery.

For the treatment of disease, the appropriate dosage of a therapeutic composition will depend on the type of disease to be treated, as defined above, the severity and course of the disease, previous therapy, the patient's clinical history and response to the agent, and the discretion of the physician. The agent may be suitably administered to the patient at one time or over a series of treatments.

In certain embodiments regarding methods of treating cancer in a patient, comprising administering to the patient a pharmaceutically effective amount of a compound of the present disclosure, the pharmaceutically effective amount is 0.1-1000 mg/kg. In certain embodiments, the pharmaceutically effective amount is administered in a single dose per day. In certain embodiments, the pharmaceutically effective amount is administered in two or more doses per day.

The compound may be administered by contacting a tumor cell during ex vivo purging, for example. The method of treatment may comprise any one or more of the following: a) inducing cytotoxicity in a tumor cell; b) killing a tumor cell; c) inducing apoptosis in a tumor cell; d) inducing differentiation in a tumor cell; or e) inhibiting growth in a tumor cell.

In some embodiments, treatment methods further comprise monitoring treatment progress. In some of these embodiments, the method includes the step of determining a level of changes in hematological parameters and/or diagnostic markers or diagnostic measurement (e.g., screen, assay) in a patient suffering from or susceptible to a disorder or symptoms thereof associated with cancer in which the patient has been administered a therapeutic amount of a compound or composition as described herein. The level of the marker determined in the method can be compared to known levels of marker in either healthy normal controls or in other afflicted patients to establish the patient's disease status. In some embodiments, a second level of the marker in the patient is determined at a time point later than the determination of the first level, and the two levels are compared to monitor the course of disease or the efficacy of the therapy. In some embodiments, a pre-treatment level of marker in the patient is determined prior to beginning treatment according to the methods described herein; this pre-treatment level of marker can then be compared to the level of marker in the patient after the treatment commences, to determine the efficacy of the treatment.

In some embodiments, the patient is a mammal, e.g., a primate, preferably a higher primate, e.g., a human (e.g., a patient having, or at risk of having, a disorder described herein). In some embodiments, the patient is in need of enhancing the patient's immune response. In certain embodiments, the patient is, or is at risk of being, immunocompromised. For example, in some embodiments, the patient is undergoing or has undergone a chemotherapeutic treatment and/or radiation therapy. Alternatively, or in combination, the patient is, or is at risk of being, immunocompromised as a result of an infection.

i. Breast Cancer

Breast cancer refers to cancers originating from breast tissue, most commonly from the inner lining of milk ducts or the lobules that supply the ducts with milk. Cancers originating from ducts are known as ductal carcinomas; those originating from lobules are known as lobular carcinomas. There are many different types of breast cancer, with different stages (spread), aggressiveness, and genetic makeup; survival varies greatly depending on those factors. Computerized models are available to predict survival. With best treatment and dependent on staging, 10-year disease-free survival varies from 98% to 10%. Treatment includes surgery, drugs (hormonal therapy and chemotherapy), and radiation.

Worldwide, breast cancer comprises 10.4% of all cancer incidence among women, making it the second most common type of non-skin cancer (after lung cancer) and the fifth most common cause of cancer death. In 2004, breast cancer caused 519,000 deaths worldwide (7% of cancer deaths; almost 1% of all deaths). Breast cancer is about 100 times more common in women than in men, although males tend to have poorer outcomes due to delays in diagnosis.

Some breast cancers require the hormones estrogen and progesterone to grow, and have receptors for those hormones. After surgery those cancers are treated with drugs that interfere with those hormones, usually tamoxifen, and with drugs that shut off the production of estrogen in the ovaries or elsewhere; this may damage the ovaries and end fertility. After surgery, low-risk, hormone-sensitive breast cancers may be treated with hormone therapy and radiation alone. Breast cancers without hormone receptors, or which have spread to the lymph nodes in the armpits, or which express certain genetic characteristics, are higher-risk, and are treated more aggressively. One standard regimen, popular in the U.S., is cyclophosphamide plus doxorubicin (Adriamycin), known as CA; these drugs damage DNA in the cancer, but also in fast-growing normal cells where they cause serious side effects. Sometimes a taxane drug, such as docetaxel, is added, and the regime is then known as CAT; taxane attacks the microtubules in cancer cells. An equivalent treatment, popular in Europe, is cyclophosphamide, methotrexate, and fluorouracil (CMF). Monoclonal antibodies, such as trastuzumab (Herceptin), are used for cancer cells that have the HER2 mutation. Radiation is usually added to the surgical bed to control cancer cells that were missed by the surgery, which usually extends survival, although radiation exposure to the heart may cause damage and heart failure in the following years.

While screening techniques (which are further discussed below) are useful in determining the possibility of cancer, a further testing is necessary to confirm whether a lump detected on screening is cancer, as opposed to a benign alternative such as a simple cyst.

In a clinical setting, breast cancer is commonly diagnosed using a "triple test" of clinical breast examination (breast examination by a trained medical practitioner), mammography, and fine needle aspiration cytology. Both mammography and clinical breast exam, also used for screening, can indicate an approximate likelihood that a lump is cancer, and may also identify any other lesions. Fine Needle Aspiration and Cytology (FNAC), which may be done in a doctor's office using local anaesthetic if required, involves attempting to extract a small portion of fluid from the lump. Clear fluid makes the lump highly unlikely to be cancerous, but bloody fluid may be sent off for inspection under a microscope for cancerous cells. Together, these three tools can be used to diagnose breast cancer with a good degree of accuracy.

Other options for biopsy include core biopsy, where a section of the breast lump is removed, and an excisional biopsy, where the entire lump is removed.

In addition, vacuum-assisted breast biopsy (VAB) may help diagnose breast cancer among patients with a mammographically detected breast in women according to a systematic review. In this study, summary estimates for vacuum assisted breast biopsy in diagnosis of breast cancer were as follows sensitivity was 98.1% with 95% CI=0.972-0.987 and specificity was 100% with 95% CI=0.997-0.999; however, underestimate rates of atypical ductal hyperplasia (ADH) and ductal carcinoma in situ (DCIS) were 20.9% with 95% CI=0.177-0.245 and 11.2% with 95% CI=0.098-0.128 respectively.

Breast cancer screening refers to testing otherwise-healthy women for breast cancer in an attempt to achieve an earlier diagnosis. The assumption is that early detection will improve outcomes. A number of screening tests have been employed including: clinical and self breast exams, mammography, genetic screening, ultrasound, and magnetic resonance imaging.

A clinical or self breast exam involves feeling the breast for lumps or other abnormalities. Research evidence does not support the effectiveness of either type of breast exam, because by the time a lump is large enough to be found it is likely to have been growing for several years and will soon be large enough to be found without an exam. Mammographic screening for breast cancer uses x-rays to examine the breast for any uncharacteristic masses or lumps. In women at high risk, such as those with a strong family history of cancer, mammography screening is recommended at an earlier age and additional testing may include genetic screening that tests for the BRCA genes and/or magnetic resonance imaging.

Breast cancer is sometimes treated first with surgery, and then with chemotherapy, radiation, or both. Treatments are given with increasing aggressiveness according to the prognosis and risk of recurrence. Stage 1 cancers (and DCIS) have an excellent prognosis and are generally treated with lumpectomy with or without chemotherapy or radiation. Although the aggressive HER2+ cancers should also be treated with the trastuzumab (Herceptin) regime. Stage 2 and 3 cancers with a progressively poorer prognosis and greater risk of recurrence are generally treated with surgery (lumpectomy or mastectomy with or without lymph node removal), radiation (sometimes) and chemotherapy (plus trastuzumab for HER2+ cancers). Stage 4, metastatic cancer, (i.e., spread to distant sites) is not curable and is managed by various combinations of all treatments from surgery, radiation, chemotherapy and targeted therapies. These treatments increase the median survival time of stage 4 breast cancer by about 6 months.

C. Combination Treatments

The methods and compositions, including combination therapies, enhance the therapeutic or protective effect, and/or increase the therapeutic effect of another anti-cancer or anti-hyperproliferative therapy. Therapeutic and prophylactic methods and compositions can be provided in a combined amount effective to achieve the desired effect, such as the killing of a cancer cell and/or the inhibition of cellular hyperproliferation. A tissue, tumor, or cell can be contacted with one or more compositions or pharmacological formulation(s) comprising one or more of the agents or by contacting the tissue, tumor, and/or cell with two or more distinct compositions or formulations. Also, it is contemplated that such a combination therapy can be used in conjunction with radiotherapy, surgical therapy, or immunotherapy.

Administration in combination can include simultaneous administration of two or more agents in the same dosage form, simultaneous administration in separate dosage forms, and separate administration. That is, the subject therapeutic composition and another therapeutic agent can be formulated together in the same dosage form and administered simultaneously. Alternatively, subject therapeutic composition and another therapeutic agent can be simultaneously administered, wherein both the agents are present in separate formulations. In another alternative, the therapeutic agent can be administered just followed by the other therapeutic agent or vice versa. In the separate administration protocol, the subject therapeutic composition and another therapeutic agent may be administered a few minutes apart, or a few hours apart, or a few days apart.

An anti-cancer first treatment may be administered before, during, after, or in various combinations relative to a second anti-cancer treatment. The administrations may be in intervals ranging from concurrently to minutes to days to weeks. In embodiments where the first treatment is provided to a patient separately from the second treatment, one would generally ensure that a significant period of time did not expire between the time of each delivery, such that the two compounds would still be able to exert an advantageously combined effect on the patient. In such instances, it is contemplated that one may provide a patient with the first therapy and the second therapy within about 12 to 24 or 72 h of each other and, more particularly, within about 6-12 h of each other. In some situations it may be desirable to extend the time period for treatment significantly where several days (2, 3, 4, 5, 6, or 7) to several weeks (1, 2, 3, 4, 5, 6, 7, or 8) lapse between respective administrations.

In certain embodiments, a course of treatment will last 1-90 days or more (this such range includes intervening days). It is contemplated that one agent may be given on any day of day 1 to day 90 (this such range includes intervening days) or any combination thereof, and another agent is given on any day of day 1 to day 90 (this such range includes intervening days) or any combination thereof. Within a single day (24-hour period), the patient may be given one or multiple administrations of the agent(s). Moreover, after a course of treatment, it is contemplated that there is a period of time at which no anti-cancer treatment is administered. This time period may last 1-7 days, and/or 1-5 weeks, and/or 1-12 months or more (this such range includes intervening days), depending on the condition of the patient, such as their prognosis, strength, health, etc. It is expected that the treatment cycles would be repeated as necessary.

Various combinations may be employed. For the example below a GCNF ligand is "A" and another anti-cancer therapy (e.g., immunotherapy) is "B":

A/B/A  B/A/B  B/B/A  A/A/B  A/B/B  B/A/A  A/B/B/B  B/A/B/B
B/B/B/A  B/B/A/B  A/A/B/B  A/B/A/B  A/B/B/A  B/B/A/A
B/A/B/A  B/A/A/B  A/A/A/B  B/A/A/A  A/B/A/A  A/A/B/A

Administration of any compound or therapy of the present invention to a patient will follow general protocols for the administration of such compounds, taking into account the toxicity, if any, of the agents. Therefore, in some embodiments there is a step of monitoring toxicity that is attributable to combination therapy.

i. Chemotherapy

A wide variety of chemotherapeutic agents may be used in accordance with the present invention. The term "chemotherapy" refers to the use of drugs to treat cancer. A "chemotherapeutic agent" is used to connote a compound or composition that is administered in the treatment of cancer. These agents or drugs are categorized by their mode of activity within a cell, for example, whether and at what stage they affect the cell cycle. Alternatively, an agent may be characterized based on its ability to directly cross-link DNA, to intercalate into DNA, or to induce chromosomal and mitotic aberrations by affecting nucleic acid synthesis.

Examples of chemotherapeutic agents include alkylating agents, such as thiotepa and cyclosphosphamide; alkyl sulfonates, such as busulfan, improsulfan, and piposulfan; aziridines, such as benzodopa, caiboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlomaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammaII and calicheamicin omegaII); dynemicin, including dynemicin A; bisphosphonates, such as clodronate; an esperamicin; as well as neocarzinostatin chromophore and related chromoprotein enediyne antibiotic chromophores, aclacinomysins, actinomycin, authramycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dromostanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylomithine (DFMO); retinoids, such as retinoic acid; capecitabine; carboplatin, procarbazine, plicomycin, gemcitabien, navelbine, famesyl-protein transferase inhibitors, transplatinum, and pharmaceutically acceptable salts, acids, or derivatives of any of the above.

ii. Radiotherapy

Other factors that cause DNA damage and have been used extensively include what are commonly known as y-rays, X-rays, and/or the directed delivery of radioisotopes to tumor cells. Other forms of DNA damaging factors are also contemplated, such as microwaves, proton beam irradiation (U.S. Pat. Nos. 5,760,395 and 4,870,287), and UV-irradiation. It is most likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

iii. Immunotherapy

The skilled artisan will understand that additional immunotherapies may be used in combination or in conjunction with methods of the invention. In the context of cancer treatment, immunotherapeutics, generally, rely on the use of immune effector cells and molecules to target and destroy cancer cells. Rituximab (Rituxan®) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve merely as a targeting agent. Alternatively, the effector may be a lymphocyte carrying a surface molecule that interacts, either directly or indirectly, with a tumor cell target. Various effector cells include cytotoxic T cells and NK cells.

In one aspect of immunotherapy, the tumor cell must bear some marker that is amenable to targeting, i.e., is not present on the majority of other cells. Many tumor markers exist and any of these may be suitable for targeting in the context of the present invention. Common tumor markers include CD20, carcinoembryonic antigen, tyrosinase (p97), gp68, TAG-72, HMFG, Sialyl Lewis Antigen, MucA, MucB, PLAP, laminin receptor, erb B, and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand.

Examples of immunotherapies currently under investigation or in use are immune adjuvants, e.g., *Mycobacterium bovis, Plasmodium falciparum*, dinitrochlorobenzene, and aromatic compounds (U.S. Pat. Nos. 5,801,005 and 5,739,169; Hui and Hashimoto, Infection Immun., 66(11):5329-5336, 1998; Christodoulides et al., Microbiology, 144(Pt 11):3027-3037, 1998); cytokine therapy, e.g., interferons, IL-1, GM-CSF, and TNF (Bukowski et al., Clinical Cancer Res., 4(10):2337-2347, 1998; Davidson et al., J. Immunother., 21(5):389-398, 1998; Hellstrand et al., Acta Oncologica, 37(4):347-353,1998); gene therapy, e.g., TNF, IL-1, IL-2, and p53 (Qin et al., Proc. Natl. Acad. Sci. USA, 95(24): 14411-14416, 1998; Austin-Ward and Villaseca, Revista *Medica* de Chile, 126(7):838-845,1998; U.S. Pat. Nos. 5,830,880 and 5,846,945); and monoclonal antibodies, e.g., anti-CD20, anti-ganglioside GM2, and anti-p185 (Hanibuchi et al., Int. J. Cancer, 78(4):480-485,1998; U.S. Pat. No. 5,824,311). It is contemplated that one or more anti-cancer therapies may be employed with the antibody therapies described herein.

In some embodiment, the immune therapy could be adoptive immunotherapy, which involves the transfer of autologous antigen-specific T cells generated ex vivo. The T cells used for adoptive immunotherapy can be generated either by expansion of antigen-specific T cells or redirection of T cells through genetic engineering. Isolation and transfer of tumor specific T cells has been shown to be successful in treating melanoma. Novel specificities in T cells have been successfully generated through the genetic transfer of transgenic T cell receptors or chimeric antigen receptors (CARs). CAR5 are synthetic receptors consisting of a targeting moiety that is associated with one or more signaling domains in a single fusion molecule. In general, the binding moiety of a CAR consists of an antigen-binding domain of a single-chain antibody (scFv), comprising the light and variable fragments of a monoclonal antibody joined by a flexible linker. Binding moieties based on receptor or ligand domains have also been used successfully. The signaling domains for first generation CAR5 are derived from the cytoplasmic region of the CD3zeta or the Fc receptor gamma chains. CAR5 have successfully allowed T cells to be redirected against antigens expressed at the surface of tumor cells from various malignancies including lymphomas and solid tumors.

In one embodiment, the present application provides for a combination therapy for the treatment of cancer wherein the combination therapy comprises adoptive T cell therapy and a checkpoint inhibitor. In one aspect, the adoptive T cell therapy comprises autologous and/or allogenic T-cells. In another aspect, the autologous and/or allogenic T-cells are targeted against tumor antigens.

Immune checkpoints either turn up a signal (e.g., costimulatory molecules) or turn down a signal. Inhibitory immune checkpoints that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), programmed death-ligand 1 (PD-L1), T-cell immunoglobulin domain and mucin domain 3 (TIM-3), and V-domain Ig suppressor of T cell activation (VISTA). In particular, the immune checkpoint inhibitors target the PD-1 axis and/or CTLA-4.

The immune checkpoint inhibitors may be drugs, such as small molecules, recombinant forms of ligand or receptors, or antibodies, such as human antibodies (e.g., International Patent Publication WO2015/016718; Pardoll, Nat Rev Cancer, 12(4): 252-264, 2012; both incorporated herein by reference). Known inhibitors of the immune checkpoint proteins or analogs thereof may be used, in particular chimerized, humanized, or human forms of antibodies may be used. As the skilled person will know, alternative and/or equivalent names may be in use for certain antibodies mentioned in the present disclosure. Such alternative and/or equivalent names are interchangeable in the context of the present disclosure. For example, it is known that lambrolizumab is also known under the alternative and equivalent names MK-3475 and pembrolizumab.

In some embodiments, a PD-1 binding antagonist is a molecule that inhibits the binding of PD-1 to its ligand binding partners. In a specific aspect, the PD-1 ligand binding partners are PD-L1 and/or PD-L2. In another embodiment, a PD-L1 binding antagonist is a molecule that inhibits the binding of PD-L1 to its binding partners. In a specific aspect, PD-L1 binding partners are PD-1 and/or B7-1. In another embodiment, a PD-L2 binding antagonist is a molecule that inhibits the binding of PD-L2 to its binding partners. In a specific aspect, a PD-L2 binding partner is PD-1. The antagonist may be an antibody, an antigen binding fragment thereof, an immunoadhesin, a fusion protein, or an oligopeptide. Exemplary antibodies are described in U.S. Pat. Nos. 8,735,553, 8,354,509, and 8,008,449, all of which are incorporated herein by reference. Other PD-1 axis antagonists for use in the methods provided herein are known in the art, such as described in U.S. Patent Application Publication Nos. 2014/0294898, 2014/022021, and 2011/0008369, all of which are incorporated herein by reference.

In some embodiments, a PD-1 binding antagonist is an anti-PD-1 antibody (e.g., a human antibody, a humanized antibody, or a chimeric antibody). In some embodiments, the anti-PD-1 antibody is selected from the group consisting of Nivolumab (also known as MDX-1106-04, MDX-1106, MK-347, ONO-4538, BMS-936558, and OPDIVO®; described in WO2006/121168), Pembrolizumab (also known as MK-3475, Merck 3475, lambrolizumab, KEYTRUDA®, and SCH-900475; WO2009/114335), Pidilizumab (also known as CT-011, hBAT or hBAT-1; WO2009/101611), Cemiplimab (also known as LIBTAYO®, REGN-2810, REGN2810, SAR-439684, SAR439684), Tislelizumab (also known as BGB-A317, hu317-1/IgG4mt2; U.S. Pat. No. 8,735,553), Spartalizumab (also known as PDR001, PDR-001, NPV-PDR001, NPVPDR001; U.S. Pat. No. 9,683,048), PF-06801591, AK105, BCD-100, BI-754091, HLX10, JS001, LZM009, MEDI 0680, MGA012, Sym021, TSR-042, MGD013, AK104 (bispecific with anti-CTLA4), and XmAb20717 (bispecific with anti-CTLA4).

In some embodiments, the PD-1 binding antagonist is an immunoadhesin (e.g., an immunoadhesin comprising an extracellular or PD-1 binding portion of PD-L1 or PD-L2 fused to a constant region (e.g., an Fc region of an immunoglobulin sequence)). For example, AMP-224 (also known as B7-DCIg) is a PD-L2-Fc fusion soluble receptor described in WO2010/027827 and WO2011/066342.

In some embodiment, a PD-L1 binding antagonist is an anti-PD-L1 antibody (e.g., a human antibody, a humanized antibody, or a chimeric antibody). In some embodiments, the anti-PD-L1 antibody is selected from the group consisting of Atezolizumab (also known as Tencentriq, MPDL3280A; described in U.S. Pat. No. 8,217,149), Avelumab (also known as BAVENCIO®, MSB-0010718C, MSB0010718C), Durvalumab (also known as IMFINZI®, MEDI-4736, MEDI4736; described in WO2011/066389), FS118, BCD-135, BGB-A333, CBT502 (also known as TQB2450), CK-301, CS1001 (also known as WBP3155), FAZ053, KN035, MDX-1105, MSB2311, SHR-1316, M7824, LY3415244, CA-170, and CX-072.

Another immune checkpoint protein that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA-4 is similar to the T-cell co-stimulatory protein, CD28, and both molecules bind to CD80 and CD86, also called B7-1 and B7-2 respectively, on antigen-presenting cells. CTLA-4 transmits an inhibitory signal to T cells, whereas CD28 transmits a stimulatory signal. Intracellular CTLA-4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide. Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in U.S. Pat. No. 8,119,129; PCT Publn. Nos. WO 01/14424, WO 98/42752, WO 00/37504 (CP675, 206, also known as tremelimumab; formerly ticilimumab); U.S. Pat. No. 6,207,156; Hurwitz et al. (1998) Proc Natl Acad Sci USA, 95(17): 10067-10071; Camacho et al. (2004) J Clin Oncology, 22(145): Abstract No. 2505 (antibody CP-675206); and Mokyr et al. (1998) Cancer Res, 58:5301-5304 can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in International Patent Application No. WO2001/014424, WO2000/037504, and U.S. Pat. No. 8,017,114; all incorporated herein by reference.

An exemplary anti-CTLA-4 antibody is ipilimumab (also known as 10D1, MDX-010, MDX-101, MDX-CTLA4, and YERVOY®) or antigen binding fragments and variants thereof (see, e.g., WO 01/14424). In other embodiments, the antibody comprises the heavy and light chain CDR5 or VR5 of ipilimumab. Accordingly, in one embodiment, the antibody comprises the CDR1, CDR2, and CDR3 domains of the VH region of ipilimumab, and the CDR1, CDR2, and CDR3 domains of the VL region of ipilimumab. In another embodiment, the antibody competes for binding with and/or binds to the same epitope on CTLA-4 as the above-mentioned antibodies. In another embodiment, the antibody has an at least about 90% variable region amino acid sequence identity with the above-mentioned antibodies (e.g., at least about 90%, 95%, or 99% variable region identity with ipilimumab).

In some embodiment, a CTLA-4 binding antagonist is an anti-CTLA-4 antibody (e.g., a human antibody, a humanized antibody, or a chimeric antibody). In some embodiments, the anti-CTLA-4 antibody is selected from the group consisting of ipilimumab (also known as 10D1, MDX-010, MDX-101, MDX-CTLA4, and YERVOY®; described in WO 01/14424), Tremelimumab (also known as CP-675,206, CP-675, ticilimumab; described in WO 00/37504), BMS-986218, AK104 (bispecific with anti-PD-1), and XmAb20717 (bispecific with anti-PD-1).

Other molecules for modulating CTLA-4 include CTLA-4 ligands and receptors such as described in U.S. Pat. Nos. 5,844,905, 5,885,796 and International Patent Application Nos. WO1995001994 and WO1998042752; all incorporated herein by reference, and immunoadhesins such as described in U.S. Pat. No. 8,329,867, incorporated herein by reference.

Another immune checkpoint protein that can be targeted in the methods provided herein is lymphocyte-activation gene 3 (LAG-3), also known as CD223. The complete protein sequence of human LAG-3 has the Genbank accession number NP-002277. LAG-3 is found on the surface of activated T cells, natural killer cells, B cells, and plasmacytoid dendritic cells. LAG-3 acts as an "off" switch when bound to MHC class II on the surface of antigen-presenting cells. Inhibition of LAG-3 both activates effector T cells and inhibitor regulatory T cells. In some embodiments, the immune checkpoint inhibitor is an anti-LAG-3 antibody (e.g., a human antibody, a humanized antibody, or a chimeric antibody), an antigen binding fragment thereof, an immunoadhesin, a fusion protein, or oligopeptide. Anti-human-LAG-3 antibodies (or VH and/or VL domains derived therefrom) suitable for use in the present methods can be generated using methods well known in the art. Alternatively, art recognized anti-LAG-3 antibodies can be used. An exemplary anti-LAG-3 antibody is relatlimab (also known as BMS-986016) or antigen binding fragments and variants thereof (see, e.g., WO 2015/116539). Other exemplary anti-LAG-3 antibodies include TSR-033 (see, e.g., WO 2018/201096), MK-4280, and REGN3767. MGD013 is an anti-LAG-3/PD-1 bispecific antibody described in WO 2017/019846. FS118 is an anti-LAG-3/PD-L1 bispecific antibody described in WO 2017/220569.

Another immune checkpoint protein that can be targeted in the methods provided herein is V-domain Ig suppressor of T cell activation (VISTA), also known as C10orf54. The complete protein sequence of human VISTA has the Genbank accession number NP_071436. VISTA is found on white blood cells and inhibits T cell effector function. In some embodiments, the immune checkpoint inhibitor is an anti-VISTA3 antibody (e.g., a human antibody, a humanized antibody, or a chimeric antibody), an antigen binding fragment thereof, an immunoadhesin, a fusion protein, or oligopeptide. Anti-human-VISTA antibodies (or VH and/or VL domains derived therefrom) suitable for use in the present methods can be generated using methods well known in the art.

Alternatively, art recognized anti-VISTA antibodies can be used. An exemplary anti-VISTA antibody is JNJ-61610588 (also known as onvatilimab) (see, e.g., WO 2015/097536, WO 2016/207717, WO 2017/137830, WO 2017/175058). VISTA can also be inhibited with the small molecule CA-170, which selectively targets both PD-L1 and VISTA (see, e.g., WO 2015/033299, WO 2015/033301).

Another immune checkpoint protein that can be targeted in the methods provided herein is CD38. The complete protein sequence of human CD38 has Genbank accession number NP_001766. In some embodiments, the immune checkpoint inhibitor is an anti-CD38 antibody (e.g., a human antibody, a humanized antibody, or a chimeric antibody), an antigen binding fragment thereof, an immunoadhesin, a fusion protein, or oligopeptide. Anti-human-CD38 antibodies (or VH and/or VL domains derived therefrom) suitable for use in the present methods can be generated using methods well known in the art. Alternatively, art recognized anti-CD38 antibodies can be used. An exemplary anti-CD38 antibody is daratumumab (see, e.g., U.S. Pat. No. 7,829, 673).

Another immune checkpoint protein that can be targeted in the methods provided herein is T cell immunoreceptor with Ig and ITIM domains (TIGIT). The complete protein sequence of human TIGIT has Genbank accession number NP_776160. In some embodiments, the immune checkpoint inhibitor is an anti-TIGIT antibody (e.g., a human antibody, a humanized antibody, or a chimeric antibody), an antigen binding fragment thereof, an immunoadhesin, a fusion protein, or oligopeptide. Anti-human-TIGIT antibodies (or VH and/or VL domains derived therefrom) suitable for use in the present methods can be generated using methods well known in the art. Alternatively, art recognized anti-TIGIT antibodies can be used. An exemplary anti-TIGIT antibody is MK-7684 (see, e.g., WO 2017/030823, WO 2016/028656).

Co-stimulatory molecules are ligands that interact with receptors on the surface of the immune cells, e.g., CD28, 4-1BB, OX40 (also known as CD134), ICOS, and GITR. As an example, the complete protein sequence of human OX40 has Genbank accession number NP_003318. In some embodiments, the immunomodulatory agent is an anti-OX40 antibody (e.g., a human antibody, a humanized antibody, or a chimeric antibody), an antigen binding fragment thereof, an immunoadhesin, a fusion protein, or oligopeptide. Anti-human-OX40 antibodies (or VH and/or VL domains derived therefrom) suitable for use in the present methods can be generated using methods well known in the art. Alternatively, art recognized anti-OX40 antibodies can be used. An exemplary anti-OX40 antibody is PF-04518600 (see, e.g., WO 2017/130076). ATOR-1015 is a bispecific antibody targeting CTLA4 and OX40 (see, e.g., WO 2017/182672, WO 2018/091740, WO 2018/202649, WO 2018/002339).

Another co-stimulatory molecule that can be targeted in the methods provided herein is ICOS, also known as CD278. The complete protein sequence of human ICOS has Genbank accession number NP_036224. In some embodiments, the immune checkpoint inhibitor is an anti-ICOS antibody (e.g., a human antibody, a humanized antibody, or a chimeric antibody), an antigen binding fragment thereof, an immunoadhesin, a fusion protein, or oligopeptide. Anti-human-ICOS antibodies (or VH and/or VL domains derived therefrom) suitable for use in the present methods can be generated using methods well known in the art. Alternatively, art recognized anti-ICOS antibodies can be used. Exemplary anti-ICOS antibodies include JTX-2011 (see, e.g., WO 2016/154177, WO 2018/187191) and GSK3359609 (see, e.g., WO 2016/059602).

Yet another co-stimulatory molecule that can be targeted in the methods provided herein is glucocorticoid-induced tumour necrosis factor receptor-related protein (GITR), also known as TNFRSF18 and AITR. The complete protein sequence of human GITR has Genbank accession number NP_004186. In some embodiments, the immunomodulatory agent is an anti-GITR antibody (e.g., a human antibody, a humanized antibody, or a chimeric antibody), an antigen binding fragment thereof, an immunoadhesin, a fusion protein, or oligopeptide. Anti-human-GITR antibodies (or VH and/or VL domains derived therefrom) suitable for use in the present methods can be generated using methods well known in the art. Alternatively, art recognized anti-GITR antibodies can be used. An exemplary anti-GITR antibody is TRX518 (see, e.g., WO 2006/105021).

Other immune inhibitory molecules that can be targeted for immunomodulation include STAT3 and indoleamine 2,3-dioxygenase (IDO). By way of example, the complete protein sequence of human IDO has Genbank accession number NP_002155. In some embodiments, the immunomodulatory agent is a small molecule IDO inhibitor. Exemplary small molecules include BMS-986205, epacadostat (INCB24360), and navoximod (GDC-0919).

iv. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present invention, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

iv. Other Agents

It is contemplated that other agents may be used in combination with certain aspects of the present invention to improve the therapeutic efficacy of treatment. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present invention to improve the anti-hyperproliferative efficacy of the treatments. Inhibitors of cell adhesion are contemplated to improve the efficacy of the present invention. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present invention to improve the treatment efficacy.

D. Detection

A wide variety of assay formats are contemplated for detecting protein products, including immunohistochemistry, enzyme linked immunosorbent assay (ELISA), radio-immunoassay (RIA), immunoradiometric assay, fluoroimmunoassay, chemiluminescent assay, bioluminescent assay, dot blotting, FACS analyses, and Western blot to mention a few. The steps of various useful immunodetection methods have been described in the scientific literature. In general, the immunobinding methods include obtaining a sample of the cancer, and contacting the sample with an antibody specific for the protein to be detected, as the case may be, under conditions effective to allow the formation of immunocomplexes. In general, the detection of immunocomplex formation is well known in the art and may be achieved through the application of numerous approaches. These methods are generally based upon the detection of a label or marker, such as any of those radioactive, fluorescent, biological and enzymatic tags. Of course, one may find additional advantages through the use of a secondary binding ligand such as a second antibody and/or a biotin/avidin ligand binding arrangement, as is known in the art.

The antibody employed in the detection may itself be linked to a detectable label, wherein one would then simply detect this label, thereby allowing the amount of the primary immune complexes in the composition to be determined. Alternatively, the first antibody that becomes bound within the primary immune complexes may be detected by means of a second binding ligand that has binding affinity for the antibody. In these cases, the second binding ligand may be linked to a detectable label. The second binding ligand is itself often an antibody, which may thus be termed a "secondary" antibody. The primary immune complexes are contacted with the labeled, secondary binding ligand, or antibody, under effective conditions and for a period of time sufficient to allow the formation of secondary immune complexes. The secondary immune complexes are then generally washed to remove any non-specifically bound labeled secondary antibodies or ligands, and the remaining label in the secondary immune complexes is then detected.

With regard to detecting expression of mRNA products, or a corresponding cDNA, mRNA is first extracted from the cancer cells. The extracted mRNA may be amplified prior to detection. Alternatively, the extracted mRNA may be reverse transcribed to cDNA prior to amplification of the cDNA. Any nucleic acid amplification assay which can be utilized, including but not limited to the polymerase chain reaction (RT-PCR), branched DNA signal amplification, ligase chain reaction, isothermal nucleic acid sequence based amplification (NASBA), Q-beta replication, transcription-based amplification, amplifiable RNA reporters, boomerang DNA amplification, strand displacement activation, cycling probe technology, and other self-sustained sequence replication assays, as well as variations on these including methods for nucleic acid enrichment such as by using restriction digestion with polymerase chain reaction and the use of nested primers. Similarly, any method capable of detecting an amplified nucleic acid product, including but not limited to agarose gel electrophoresis, fluorescence-based detection methods, real-time PCR, ELISA detection methods, electro-chemiluminescence, high performance liquid chromatography, reverse dot blot methods, and nucleic acid sequencing methods, may be used.

As used herein, the term "sample" refers to any sample suitable for the detection methods provided by the present invention. The sample may be any sample that includes material suitable for detection or isolation. Sources of samples include blood, pleural fluid, peritoneal fluid, urine, saliva, malignant ascites, broncho-alveolar lavage fluid, synovial fluid, and bronchial washes. In one aspect, the sample is a blood sample, including, for example, whole blood or any fraction or component thereof. A blood sample suitable for use with the present invention may be extracted from any source known that includes blood cells or components thereof, such as venous, arterial, peripheral, tissue, cord, and the like. For example, a sample may be obtained and processed using well-known and routine clinical methods (e.g., procedures for drawing and processing whole blood). In one aspect, an exemplary sample may be peripheral blood drawn from a subject with cancer. In some aspects, the biological sample comprises a plurality of cells. In certain aspects, the biological sample comprises fresh or frozen tissue. In specific aspects, the biological sample comprises formalin fixed, paraffin embedded tissue. In some aspects, the biological sample is a tissue biopsy, fine needle aspirate, blood, serum, plasma, cerebral spinal fluid, urine, stool, saliva, circulating tumor cells, exosomes, or aspirates and bodily secretions, such as sweat. In some aspects, the biological sample contains cell-free DNA.

D. Maintenance of Pluripotency

Pluripotent stem cells are characterized by the ability to renew themselves through mitotic cell division and the ability to differentiate into a diverse range of specialized cell types. The two broad types of mammalian stem cells are: embryonic stem cells that are found in blastocysts, and adult stem cells that are found in adult tissues. In a developing embryo, stem cells can differentiate into all of the specialized embryonic tissues. In adult organisms, stem cells and progenitor cells act as a repair system for the body, replenishing specialized cells, and also maintain the normal turnover of regenerative organs, such as blood, skin or intestinal tissues.

In some embodiments, the present disclose provides compounds useful for the maintaining the pluripotency of stem cells. The present disclosure provides cell cultures and cell culture media comprising the compounds of the present disclosure. In some embodiments, the pluripotent stem cells to be maintained are human embryonic stem cells (ESCs) or induced pluripotent stem cells (iPSCs) which are capable of long-term proliferation in vitro, while retaining the potential to differentiate into all cell types of the body i. Embryonic Stem Cells In some embodiments, the pluripotent stem cells are embryonic stem cells (ESCs). ES cells are derived from the inner cell mass of blastocysts and have a high in vitro differentiating capability. ES cells can be isolated by removing the outer trophectoderm layer of a developing embryo, then culturing the inner mass cells on a feeder layer of non-growing cells. The replated cells can continue to proliferate and produce new colonies of ES cells which can be removed, dissociated, replated again and allowed to grow. This process of "subculturing" undifferentiated ES cells can be repeated a number of times to produce cell lines containing undifferentiated ES cells (U.S. Pat. Nos. 5,843,780; 6,200,806; 7,029,913). ES cells have the potential to proliferate while maintaining their pluripotency. For example, ES cells are useful in research on cells and on genes which control cell differentiation. The pluripotency of ES cells combined with genetic manipulation and selection can be used for gene analysis studies in vivo via the generation of transgenic, chimeric, and knockout mice.

Methods for producing mouse ES cells are well known. In one method, a preimplantation blastocyst from the 129 strain of mice is treated with mouse antiserum to remove the trophoectoderm, and the inner cell mass is cultured on a feeder cell layer of chemically inactivated mouse embryonic fibroblasts in medium containing fetal calf serum. Colonies of undifferentiated ES cells that develop are subcultured on mouse embryonic fibroblast feeder layers in the presence of fetal calf serum to produce populations of ES cells. In some methods, mouse ES cells can be grown in the absence of a feeder layer by adding the cytokine leukemia inhibitory factor (LIF) to serum-containing culture medium (Smith, 2000). In other methods, mouse ES cells can be grown in serum-free medium in the presence of bone morphogenetic protein and LIF (Ying et al., 2003).

Human ES cells can be produced or derived from a zygote or blastocyst-staged mammalian embryo produced by the fusion of a sperm and egg cell, nuclear transfer, pathogenesis, or the reprogramming of chromatin and subsequent incorporation of the reprogrammed chromatin into a plasma membrane to produce an embryonic cell by previously described methods (Thomson and Marshall, 1998; Reubinoff et al., 2000). In one method, human blastocysts are exposed to anti-human serum, and trophectoderm cells are lysed and removed from the inner cell mass which is cultured on a feeder layer of mouse embryonic fibroblasts. Further, clumps of cells derived from the inner cell mass are chemically or mechanically dissociated, replated, and colonies with undifferentiated morphology are selected by micropipette, dissociated, and replated. In some methods, human ES cells can be grown without serum by culturing the ES cells on a feeder layer of fibroblasts in the presence of basic fibroblast growth factor (Amit et al., 2000). In other methods, human ES cells can be grown without a feeder cell layer by culturing the cells on a protein matrix such as MATRIGEL™ or laminin in the presence of "conditioned" medium containing basic fibroblast growth factor (Xu et al., 2001).

ES cells can also be derived from other organisms including rhesus monkey and marmoset by previously described methods (Thomson, and Marshall, 1998; Thomson et al., 1995; Thomson and Odorico, 2000; U.S. Pat. No. 5,843, 780), as well as from established mouse and human cell lines. For example, established human ES cell lines include MAOI, MA09, ACT-4, HI, H7, H9, H13, H14 and ACT30. As a further example, mouse ES cell lines that have been established include the CGR8 cell line established from the inner cell mass of the mouse strain 129 embryos, and cultures of CGR8 cells can be grown in the presence of LIF without feeder layers.

ES stem cells can be detected by protein markers including transcription factor Oct4, alkaline phosphatase (AP), stage-specific embryonic antigen SSEA-1, stage-specific embryonic antigen SSEA-3, stage-specific embryonic antigen SSEA-4, transcription factor NANOG, tumor rejection antigen 1-60 (TRA-1-60), tumor rejection antigen 1-81 (TRA-1-81), SOX2, or REX 1.

ii. Induced Pluripotent Stem Cells

In other aspects, the pluripotent stem cells are induced pluripotent stem (iPS) cells, commonly abbreviated iPS cells or iPSCs. The induction of pluripotency was originally achieved in 2006 using mouse cells (Yamanaka et al. 2006) and in 2007 using human cells (Yu et al. 2007; Takahashi et al. 2007) by reprogramming of somatic cells via the introduction of transcription factors that are linked to pluripotency. The use of iPSCs circumvents most of the ethical and practical problems associated with large-scale clinical use of ES cells, and patients with iPSC-derived autologous transplants may not require lifelong immunosuppressive treatments to prevent graft rejection.

With the exception of germ cells, any cell can be used as a starting point for iPSCs. For example, cell types could be keratinocytes, fibroblasts, hematopoietic cells, mesenchymal cells, liver cells, or stomach cells. T cells may also be used as a source of somatic cells for reprogramming (U.S. Pat. No. 8,741,648). There is no limitation on the degree of cell differentiation or the age of an animal from which cells are collected; even undifferentiated progenitor cells (including somatic stem cells) and finally differentiated mature cells can be used as sources of somatic cells in the methods disclosed herein.

Somatic cells can be reprogrammed to produce induced pluripotent stem cells (iPSCs) using methods known to one of skill in the art. One of skill in the art can readily produce induced pluripotent stem cells, see for example, Published U.S. Patent Application No. 20090246875, Published U.S. Patent Application No. 2010/0210014; Published U.S. Patent Application No. 20120276636; U.S. Pat. Nos. 8,058,065; 8,129,187; 8,268,620; PCT Publication NO. WO 2007/069666 A1, and U.S. Pat. No. 8,268,620, which are incorporated herein by reference. Generally, nuclear reprogramming factors are used to produce pluripotent stem cells from a somatic cell. In some embodiments, at least three, or at least four, of Klf4, c-Myc, Oct3/4, Sox2, Nanog, and Lin28 are utilized. In other embodiments, Oct3/4, Sox2, c-Myc and Klf4 are utilized.

Mouse and human cDNA sequences of these nuclear reprogramming substances are available with reference to the NCBI accession numbers mentioned in WO 2007/069666 and U.S. Pat. No. 8,183,038, which are incorporated herein by reference. Methods for introducing one or more reprogramming substances, or nucleic acids encoding these reprogramming substances, are known in the art, and disclosed for example, in U.S. Pat. Nos. 8,268,620, 8,691,574, 8,741,648, 8,546,140, in published U.S. Pat. Nos. 8,900,871 and 8,071,369, which both are incorporated herein by reference.

Once derived, iPSCs can be cultured in a medium sufficient to maintain pluripotency, e.g. the cell culture media of the present disclosure.

IV. EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—Germ Cell Nuclear Factor (GCNF) Ligands

A. Results and Discussion

GCNF Homology Model revealed a Potential Ligand Binding Pocket (LBP). To date, no natural or synthetic ligands were identified to directly bind GCNF to modulate its activity and there is no available crystal structure for the ligand binding domain (LBD) of this nuclear receptor. To determine whether GCNF has a druggable LBP, a homology model of GCNF LBD was created. The ligand binding domain of GCNF was modeled using Phyre2 (Kelley et al., 2015) in intensive mode using best template hits, which were selected based on calculations to maximize confidence, percentage of amino acid identity and alignment coverage. In terms of sequence identity (SI), GCNF is closest to the Estrogen-related Receptor α (ERR α; NR3B1), Retinoid X Receptor a (RXRα; NR2B1), and COUP Transcription Factor II (COUP TF II, NR2F2), at >30% SI, which were used among the best templates to generate the homology model (FIG. 1A). A minimum of 30% SI to a known structure is required to obtain a homology model of sufficient accuracy (Xiang et al., 2006). The homology model (99% modeled at >90% confidence) was submitted to the 3DLigandSite (Wass et al., 2010) server to predict potential binding sites. The most probable binding pocket is composed of 17 hydrophobic residues and is depicted in FIG. 1B. An identical LBP was also predicted via SiteMap in Schrödinger Maestro (Halgren et al., 2009).

Figures 2A, 2B, 2C, 2D:
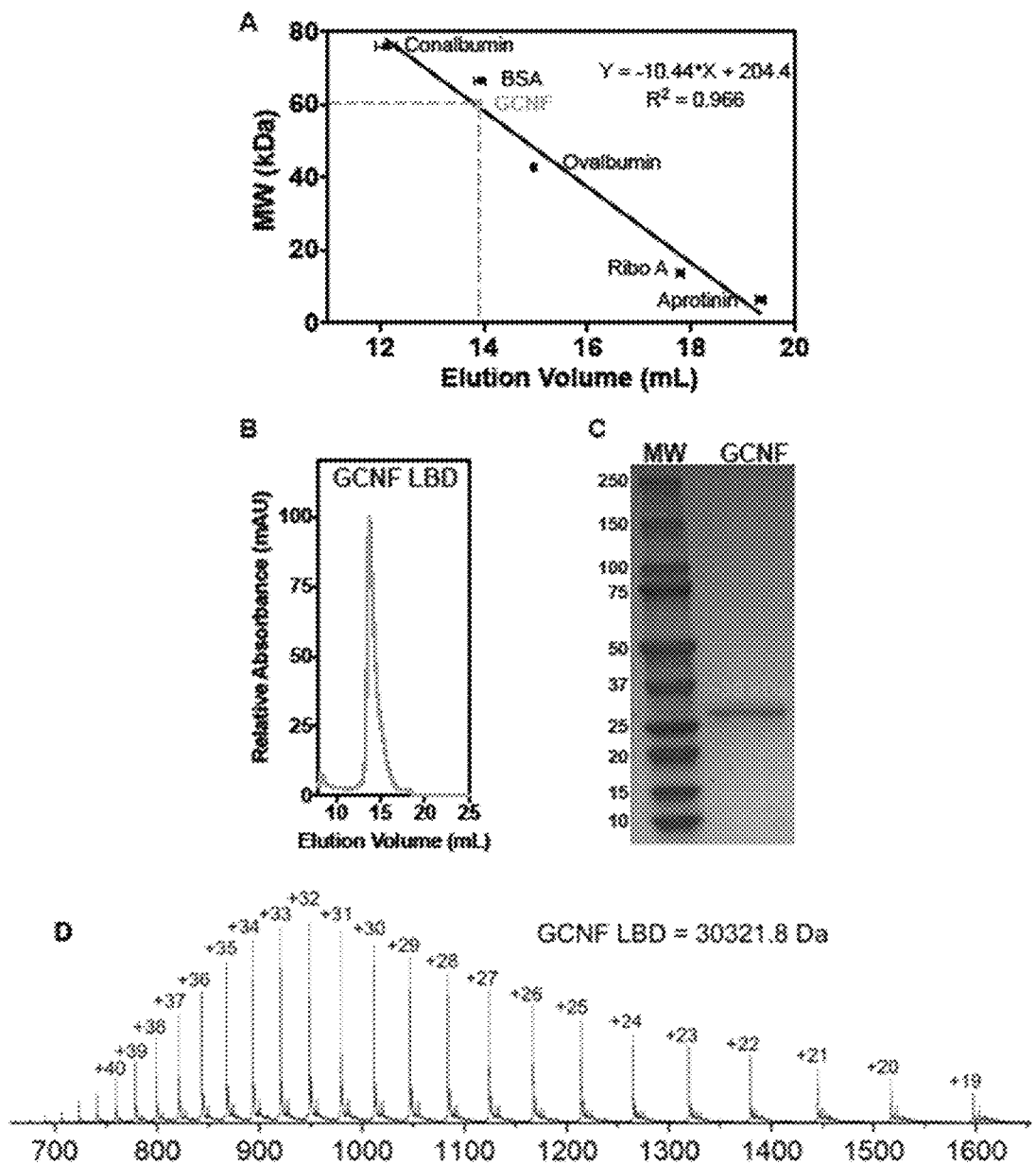
FIGS. 2A-2D show characterization of recombinant GCNF LBD.

Identification of Synthetic Ligands that Directly bind GCNF. The ligand binding domain (LBD) of human GCNF was purified through a Ni NTA column as a 263-amino acid hexahistidine-tagged construct (30.4 kDa) and was subsequently loaded onto a size exclusion column. Analytical size exclusion (ASE) experiments revealed that the purified protein is a ~60 kDa homodimer, based on GCNF LBD elution volume relative to other protein standards with known molecular weights (FIGS. 2A & 2B) and the single band at ~30 kDa on the SDS-PAGE gel of pooled ASE fractions of GCNF LBD (FIG. 2C). The observed homodimeric form of GCNF LBD is consistent with earlier characterizations of this receptor (Greschik et al., 1999). The protein was also characterized by electrospray ionization time-of-flight mass spectrometry (ESI-TOF-MS) (FIG. 2D). The GCNF LBD molecular weight (30321.3 Da) from ESI-TOF-MS agrees well with the monomeric theoretical mass of 30321.8 Da.

Figures 3A, 3B, 3C, 3D, 3E:
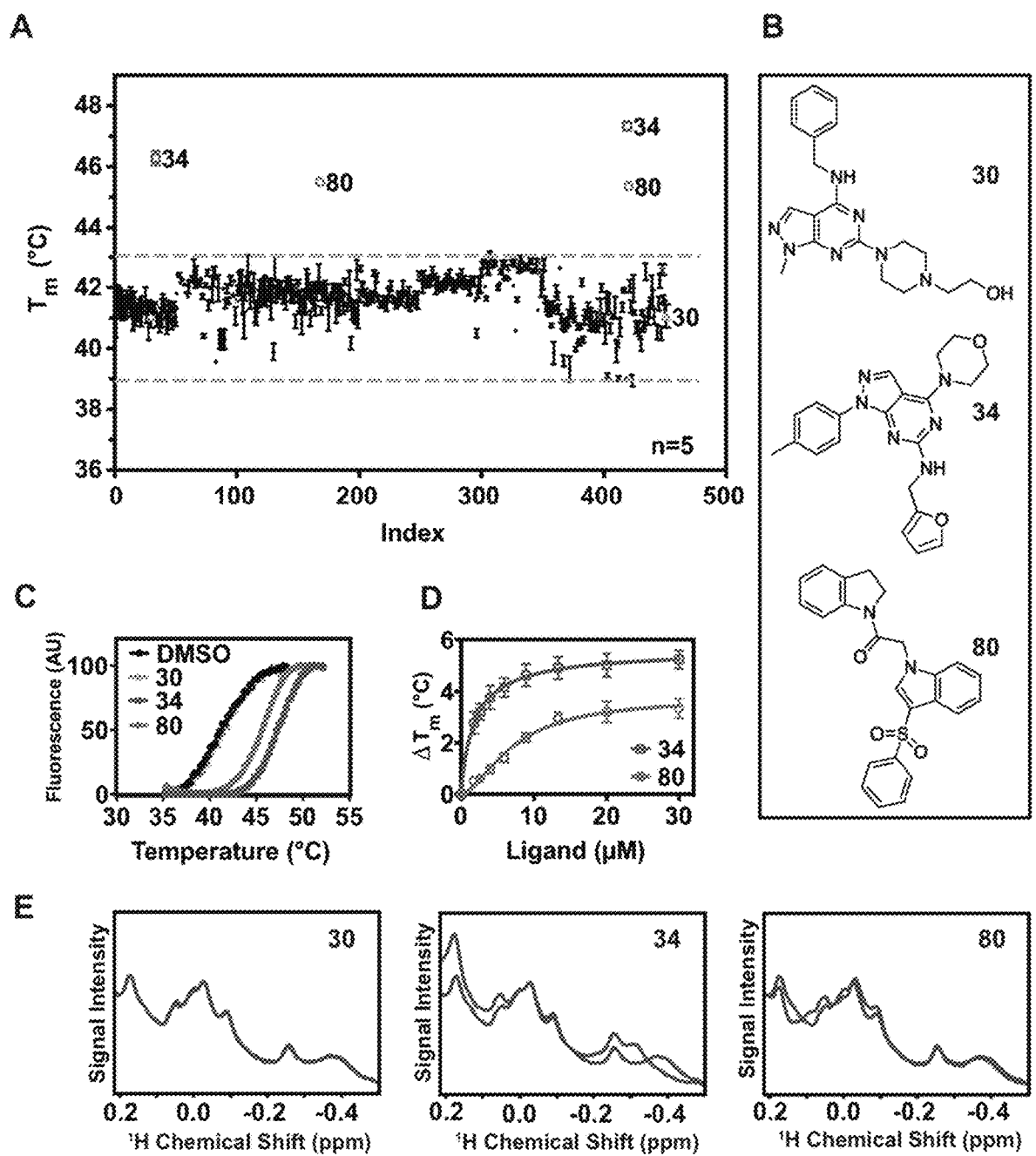
FIGS. 3A-3E show GCNF directly binds synthetic ligands 34 and 80 identified in DSF screening.

A high-throughput differential scanning fluorimetry (DSF) screening was performed using 450 compounds selected from a nuclear receptor modulator library of compounds from Life Chemicals which were previously selected based on their ability to bind nuclear receptors, particularly REV-ERB (FIG. 3A; Solt et al., 2012). Briefly, this approach measures ligand concentration-dependent increase in protein melting temperature ($T_m$) as a result of a more compact protein-ligand complex (Niesen et al., 2007). DSF screening showed that adding 20 µM of ligands 34 and 80 (FIG. 3B; Table 2, whose IUPAC names are N-[(furan-2-yl)methyl]-1-(4-methylphenyl)-4-(morpholin-4-yl)-1H-pyrazolo[3,4-d] pyrimi-din-6-amine and 2-[3-(benzenesulfonyl)-1H-in-dol-1-yl]-1-(2,3-dihydro-1H-indol-1-yl)ethan-1-one, respectively, significantly increased the melting temperature of GCNF LBD (41.9±0.6° C.) by up to 5.2° C. for ligand 34 and 3.3° C. for ligand 80 in a dose-dependent manner (FIGS. 3C & 3D). These $\Delta T_m$ values are higher than the statistically significant $\Delta T_m$ cutoff of 2° C. Ligand 30 was used as negative control in all of the assays because in spite of its structural similarity to 34, it does not bind GCNF.

TABLE 2

IUPAC and molecular weight data for 34 and 80.

| Compound ID | IUPAC Name | Molecular Weight (Da) |
|---|---|---|
| 34 | N-[(furan-2-yl)methyl]-1-(4-methylphenyl)-4-(morpholin-4-yl)-1H-pyrazolo[3,4-d]pyrimidin-6-amine | 390.44 |
| 80 | 2-[3-(benzenesulfonyl)-1H-indol-1-yl]-1-(2,3-dihydro-1H-indol-1-yl)ethan-1-one | 416.49 |

To further prove the direct binding of 34 and 80 to GCNF LBD, solution $^1$H NMR spectroscopy of GCNF was performed with and without 1.05:1 molar equivalence of these ligands with respect to protein, as well as the negative control ligand 30. In the NMR spectra, the perturbation of side-chain methyl groups from hydrophobic residues (i.e., Leu, Ile and/or Val) was monitored, represented by seven shielded resonances at 0.17 ppm, 0.048 ppm, 0.002 ppm, -0.025 ppm, -0.090 ppm, -0.25 ppm and -0.37 ppm of the spectra (FIG. 3E) with respect to DMSO-$d_6$ control, which are likely located near or within the LBP. Solution NMR peak lineshape analysis provides details on the dynamic processes including conformational changes and binding events (Kleckner et al., 2011). Protein methyl side-chain peak perturbation analysis is a convenient approach to monitor ligand binding as these resonances are in shielded, less chaotic regions of the $^1$H NMR spectra that circumvents overlap with buffer and ligand peaks. $^1$H NMR shows that 5 of 7 shielded methyl resonances of GCNF were perturbed by adding 1.05:1 molar equivalence of 34 except the peaks at 0.002 ppm and -0.025 ppm. Meanwhile, ligand 80 also substantially perturbs 5 out of 7 methyl peaks, except the two most shielded resonances at -0.25 ppm and -0.37 ppm. The differences in the perturbation patterns of 34 and 80 suggest that these two ligands occupy the LBP at different binding orientations. Adding ligand 30 did not significantly perturb any of the shielded side chain methyl resonances.

Figures 4A, 4B, 4C:
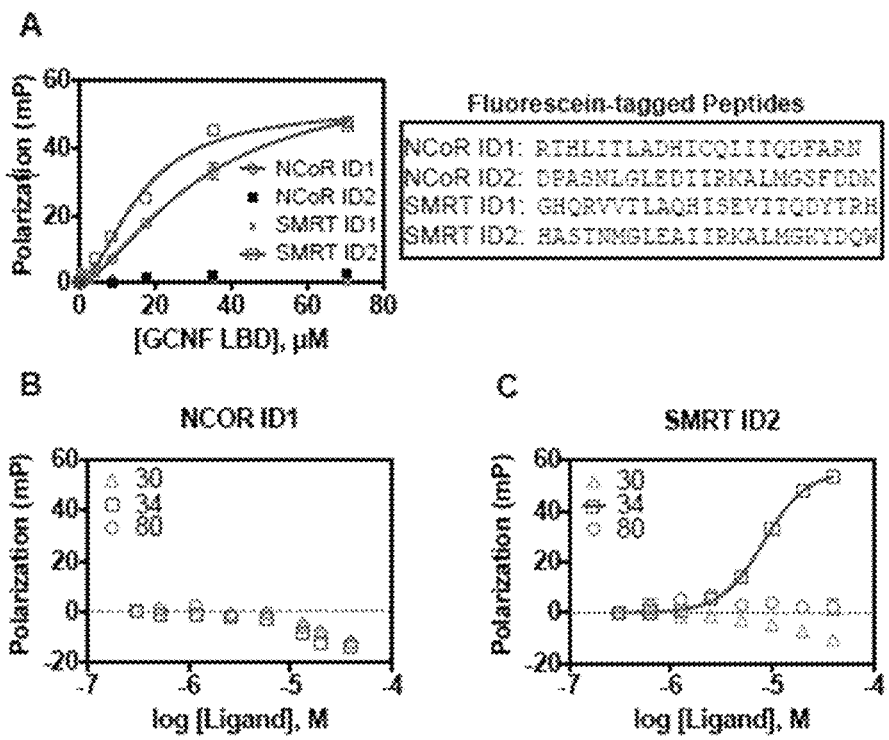
FIGS. 4A-4C show fluorescence polarization (FP) assay results, which show recruitment of corepressor peptide to GCNF is affected by synthetic ligand binding to the receptor LBP.

Ligand Binding to GCNF Affects Corepressor Recruitment. The ability of NR5 to repress target genes are mediated by interactions with cognate corepressor proteins. GCNF protein binds directly to DR0 sites or direct repeats of AGGTCA with no spacing between half sites in the promoters of both the Oct4 and Nanog genes and is thought to repress target genes via interactions with corepressors SMRT and NCoR (Furhmann et al., 2001; Gu et al., 2005; Yan et al., 2000). To determine whether ligand binding can affect the interaction between GCNF and its associated corepressor proteins SMRT and NCoR, a fluorescence polarization assay was performed to monitor the ability of ligands to affect corepressor peptide recruitment to the GCNF LBD. Since GCNF LBD was predicted to interact with transcriptional corepressors NCoR and SMRT via its N-terminal portion (Furhmann et al., 2001; Yan et al., 1997; Yan et al., 2000), an FP assay was initially performed consisting of different fluorescein-tagged peptides derived from these corepressors. The FP assay showed that corepressor peptide recruitment to GCNF LBD is sequence-specific and that GCNF robustly recruits NCOR ID1 ($K_d$=32±5 µM) and SMRT ID2 ($K_d$=16±2 µM) (FIG. 4A). Adding ligands 34 and 80 did not substantially alter the recruitment of NCoR ID1 (FIG. 4B). Meanwhile, titrating 34, but not ligand 80, increased the recruitment of SMRT ID2, the tighter binding corepressor peptide (FIG. 4C). Ligand 30 titration has no effect on the recruitment of both NCoR ID1 and SMRT ID2. These results reveal that even though the binding of both 34 and 80 led to a more compact GCNF LBD structure that increased the protein $T_m$, the binding of 34 is capable of increasing peptide corepressor recruitment whereas 80 is binding at an orientation that does not lead to positioning of the corepressor binding surface that is favorable for increased corepressor peptide recruitment. Furthermore, in spite of GCNF having the ability to conscript both SMRT ID2 and NCOR ID1 peptides, the binding of 34 to GCNF putative LBP specifically alters only the recruitment of SMRT ID2, showing that the conformational change resulting from ligand binding confers corepressor preference.

Figures 5A, 5B:
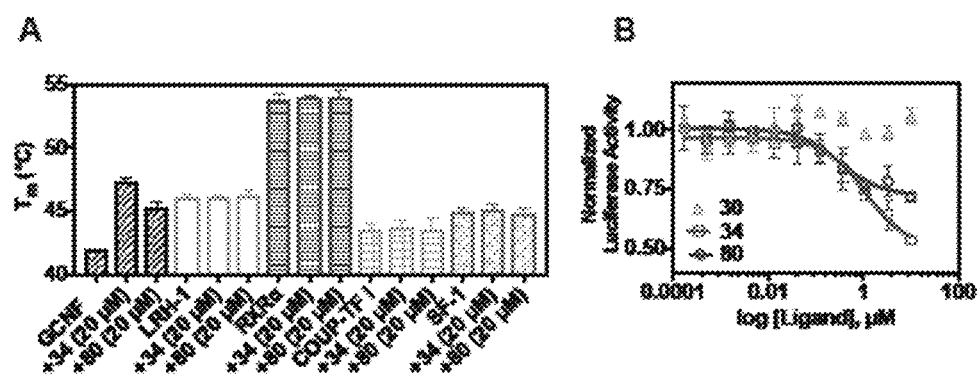
FIGS. 5A & 5B show differential scanning fluorimetry (DSF) specificity assay and luciferase transactivation assay results.

Ligands Specifically Bind GCNF and Affects Transactivation as Agonists. A DSF assay was performed wherein ligands 34 and 80 were added to the LBD of GCNF and nuclear receptors LRH-1, RXRα, COUP-TFI and SF-1, which were selected based on sequence similarity to GCNF, and in the case of LRH-1 and SF-1, their ability to regulate Oct4—a transcription factor recognized as the gatekeeper that prevents embryonic stem cell differentiation. DSF assay revealed that ligands 34 and 80 specifically bind only to GCNF as the $T_m$ did not significantly change for LRH-1, RXRα, COUP-TF I and SF-1 in the presence of 34 and 80 (FIG. 5A).

In order to validate the putative GCNF ligands, a cell-based cotransfection reporter assay was employed that uses a chimeric receptor where the LBD of human GCNF is fused with the DNA-binding domain (DBD) of the yeast transcription factor GAL4 and a GAL4-responsive luciferase reporter into HEK293 cells (Bramlett et al., 2003; Thomas et al., 2003). Luciferase reporter assays are utilized to measure NR-dependent transcription, or transactivation, in cells. In general, ligands 34 and 80 displayed concentration-dependent suppression of GCNF transactivation in HEK293 cells with half maximal inhibitory concentrations ($IC_{50}$) of 1100 nM and 317 nM, respectively (FIG. 5B). Since GCNF is a known transcriptional repressor (Cooney et al., 1998), ligands 34 and 80 are both agonists as they increase the repressive activity of the receptor.

Figures 6A, 6B, 6C, 6D, 6E, 6F, 6G, 6H, 6I, 6J:
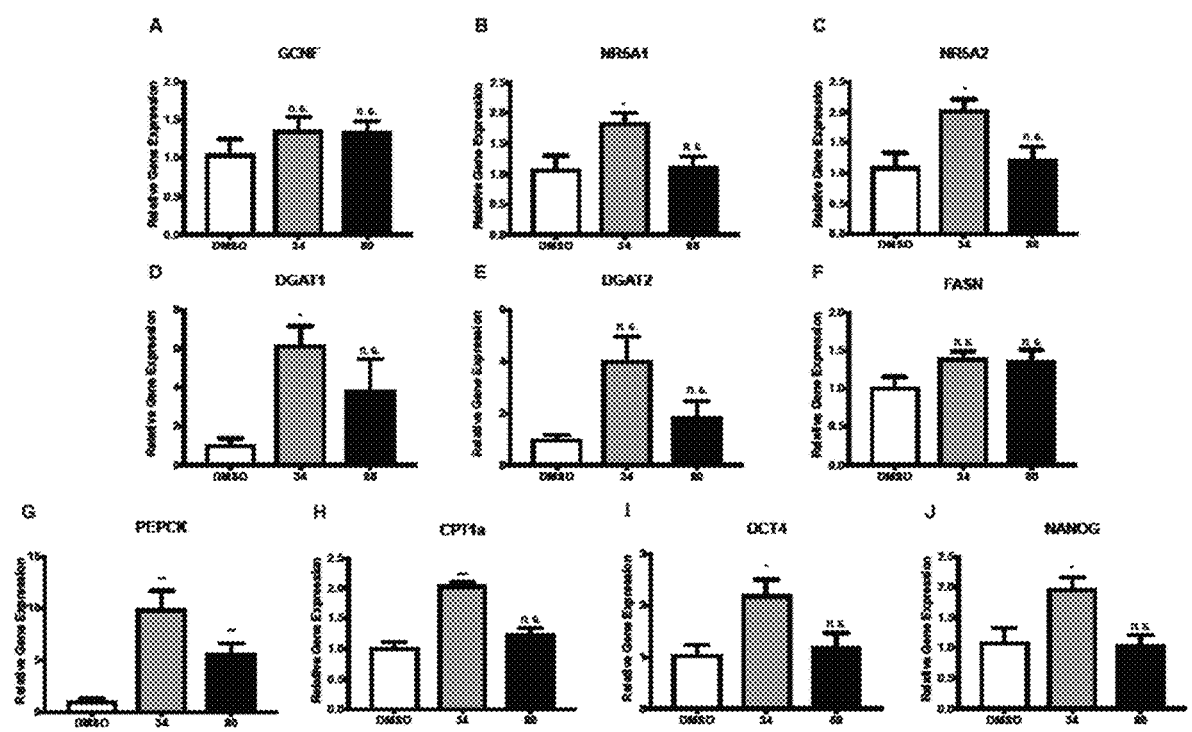
FIGS. 6A-6J show qPCR analysis of GCNF target gene expression in response to 34 and 80 in BeWo choriocarcinoma cells (n=4). Gene expression after adding 20 μM of 34 (dark gray) and 80 (black) is compared to respective DMSO controls (white). Genes observed in the qPCR assay are the nuclear receptor (NR) genes GCNF, NR5A1 (SF-1) and NR5A2 (LRH-1) (FIGS. 6A-6C), lipogenic genes (FIGS. 6D-6F), PEPCK (FIG. 6G), CPT1a (FIG. 6H) and pluripotency factors Oct4 (FIG. 6I) and Nanog (FIG. 6J). Data are presented as mean±SEM, and analyzed using one-way ANOVA with Tukey post-hoc comparison. For P values, ns: P>0.05, not significant; *: P≤0.05; : P≤0.01; *: P≤0.001.

Ligand Binding to GCNF Affects Target Gene Expression. The effect of ligands 34 and 80 binding to endogenous GCNF on the expression of target genes in BeWo human choriocarcinoma cells was investigated (ATCC CCL-98). BeWo cells abundantly express GCNF endogenously (Mehta et al., 2002); thus, this cell line is likely sensitive to ligand-induced changes in GCNF target gene expression. GCNF gene expression was not affected by both 34 and 80 (FIG. 6A). Meanwhile, adding ligand 34, but not 80, significantly promoted the expression of NR5A1 (SF-1) and NR5A2 (LRH-1) (FIGS. 6B & 6C), both of which regulate the expression of the pluripotency factor, Oct4. Since GCNF has been recently shown to have an active role in lipid metabolism (Wang et al., 2019), lipogenic gene expressions were also examined via qPCR and it was observed that adding 34, but not 80, significantly promoted the expression of diglyceride acyltransferase-1 (DGAT1) (FIG. 6D). However, both 34 and 80 have no significant effect on diglyceride acyltransferase-2 (DGAT2) and fatty acid synthase (FASN) expression (FIGS. 6E & 6F). Moreover, it was observed that the expression of phosphoenolpyruvate carboxykinase (PEPCK), a rate-limiting enzyme of gluconeogenesis, was upregulated in the presence of both 34 and 80 (FIG. 6G). Carnitine palmitoyltransferase 1a (CPT1a), the rate-limiting enzyme in fatty acid oxidation (Schlaepfer and Joshi, 2020), was also significantly increased after adding 34, while 80 has no effect (FIG. 6H). Collectively, the effect of 34 treatment of BeWo cells partially mimicked the result of knocking down GCNF in HepG2 cells (Wang et al., 2019), which caused the upregulation of PEPCK, CPT1a and select lipogenic genes. Since ligand 34 is shown to directly bind GCNF in vitro, the results corroborate previous finding that GCNF has the ability to regulate lipid metabolism.

Considering that GCNF can induce the repression of pluripotent genes, the effect of 34 and 80 on crucial pluripotency factors, Oct4 and Nanog, was assessed. Adding 34, but not 80, significantly promoted the expression of both Oct4 and Nanog (FIGS. 6I & 6J), suggesting this ligand could be favorable to maintaining pluripotency. This is not surprising as 34 also upregulates NR5A1 (SF1) and NR5A2 (LRH-1) (FIGS. 6B & 6C), both of which promotes Oct4 expression (Gu et al., 2005; Yang et al., 2007). Without wishing to be bound by any particular theory, it may be that the combined upregulating effect of NR5A1 and NR5A2 is greater than the repressive effect of GCNF on Oct4 in BeWo cells. In addition, the higher expression of Nanog could be attributed to the increased expression of Oct4, which forms a complex with β-catenin that drives Nanog expression (Takao et al., 2007).

Ligands Bind to GCNF LBP in Molecular Dynamics Simulations. The GCNF LBD homology model derived through Phyre2 was immersed in a truncated octahedron box of TIP3P (Jorgensen et al., 1983) water molecules extended to 10 Å from the protein atoms. Counterions were added to neutralize the structure and KCl (K+ and Cl− ions) was added to 50 mM (Joung et al., 2009). The protonated states of the protein were generated at pH 7.4. The resulting structure was subjected to accelerated molecular dynamics (MD) for 1.5 μs. The entire trajectory captured an open conformation of the LBP based on the volume of the putative LBP, which was then extracted and employed in Glide SP ligand docking of 34 and 80 in Schrödinger Maestro. Glide SP docking of 34 and 80 to the GCNF model afforded GlideScores of -10.0 and -9.4, respectively, indicative of good binding. GlideScore is an empirical scoring function that approximates the ligand binding free energy, which includes force field (electrostatic, van der Waals) contributions and terms rewarding or penalizing interactions known to influence ligand binding. For Glide SP, scores of -10 or lower usually represent excellent binding. For LBPs with predominantly hydrophobic interactions, scores of -8 or -9 are good (Friesner et al., 2004; Friesner et al., 2006).

The docked structures of ligands 34 and 80 in GCNF LBD revealed a binding pocket composed of residues from helix H3 (F284, L287, C288, L294 and A291), H4/H5 hinge (Q325), H5 (1328, L329, S332, Y336), H5/H6 hinge (V347), H6/H7 hinge (F361), H10/11 (V457, L459, M454, L462) and hinge close to H12 (F466) (FIG. 7). Refer to FIG. 1 for the rest of helix designations.

Figures 7A, 7B, 7C, 7D:
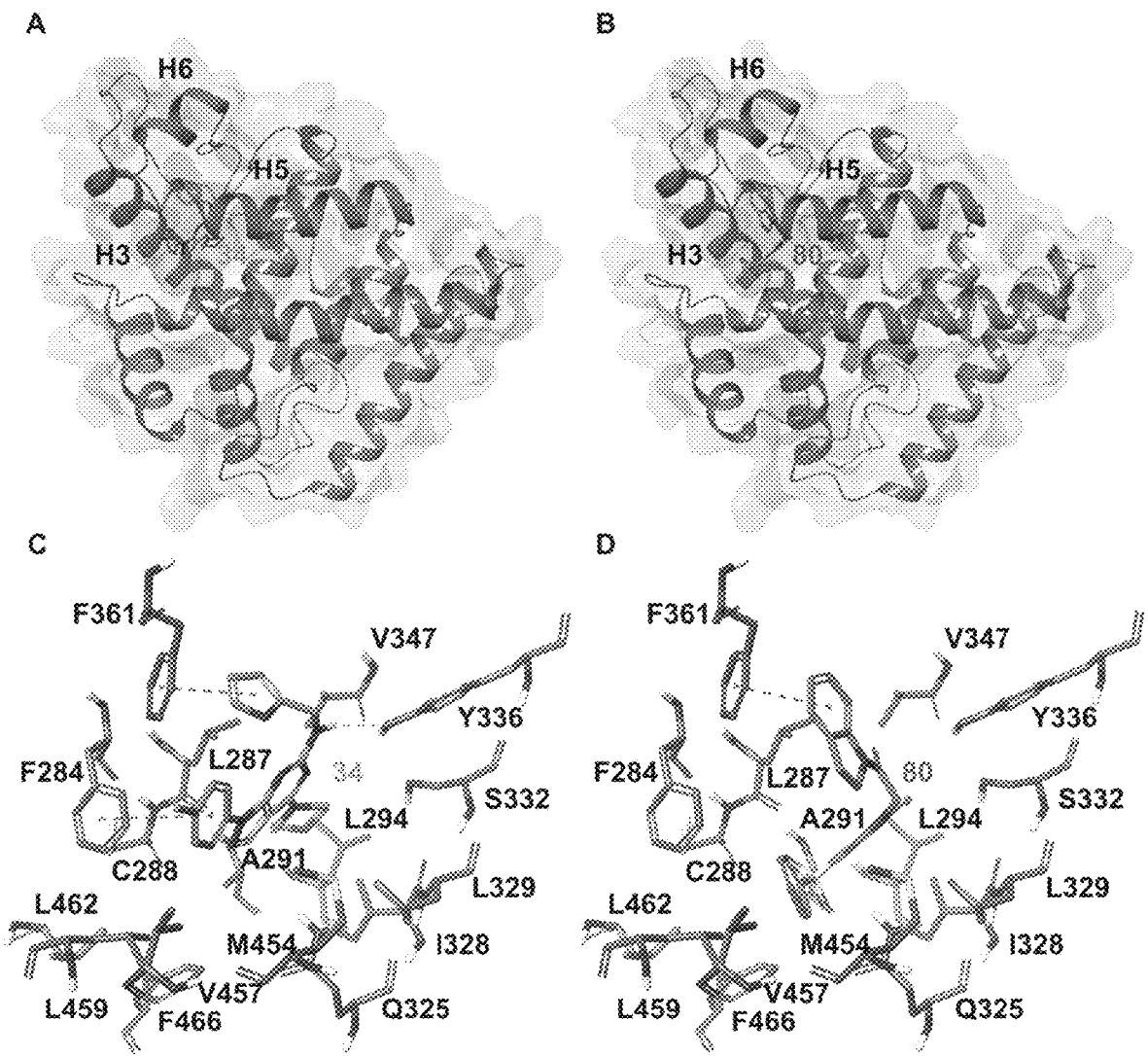
FIGS. 7A-7D show accelerated molecular dynamics (aMD) simulations and subsequent in silico ligand docking revealed synthetic ligands 34 and 80 binding the putative ligand binding pocket. Ligands 34 and 80 occupy the LBP subtended by helices H3, H5 and H6 (FIGS. 7A & 7B). Ligand 34 binds via crucial π-π stacking interactions with F284 (H3) and F361 (hinge between H6 and H7) and an H-bond with the hydroxyl group on Y336 (H5) (FIG. 7C), while 80 only has one π-π stacking interaction with F361 (FIG. 7D).

Ligand 34 has three crucial interactions within the LBP, two n-n stacking interactions with F284 and F361 and an H-bond interaction with Y336 (FIG. 7C). Specifically, the methylphenyl ring in 34 makes a JI-TI contact with the phenyl ring of F284. Another 71-71 stacking interaction is contributed by the furan ring in 34 with F361 phenyl group. Finally, the amino group bridging the pyrimidine and furan rings serves as an H-bond donor to the phenol oxygen of Y336. Meanwhile, ligand 80 has a single n-n contact between its indole-like ring and the phenyl side chain of F361 (FIG. 7D).

Figure 8A:
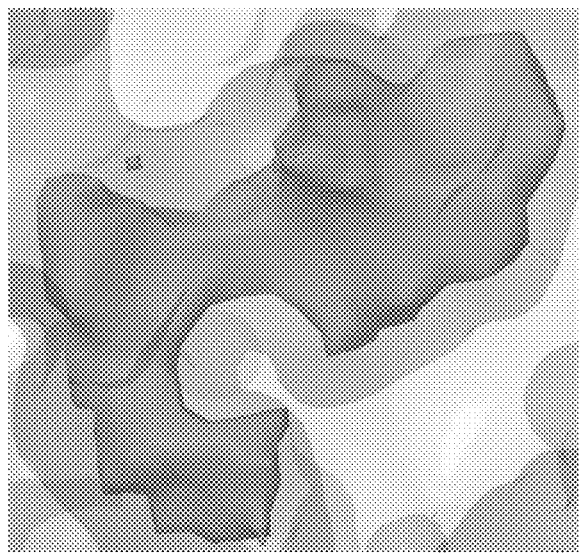
FIGS. 8A-8D show the ligand binding pocket (LBP) of GCNF has the ability to expand in aMD simulations to accommodate ligands. The LBP changed its shape and expanded from 552 Å$^3$ (FIG. 8A) to 668 Å$^3$ (FIG. 8B) in aMD simulations. The expanded LBP can accommodate both 34 (FIG. 8C) and 80 (FIG. 8D).
Figure 8B:
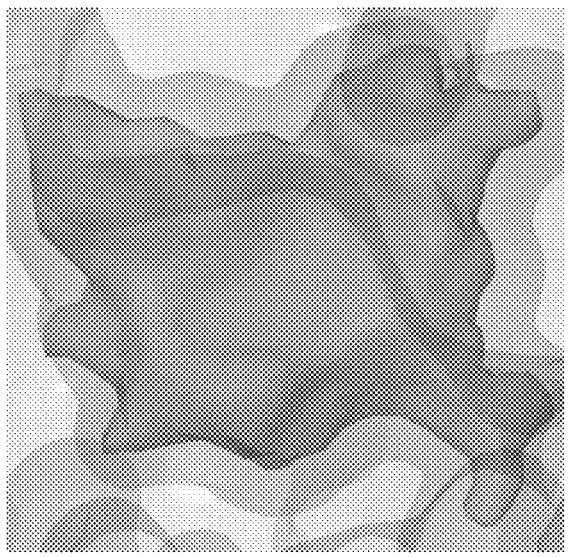
Figure 8C:
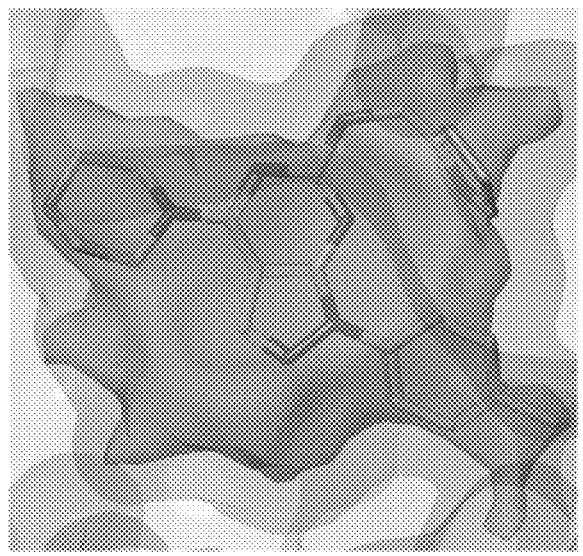
Figure 8D:
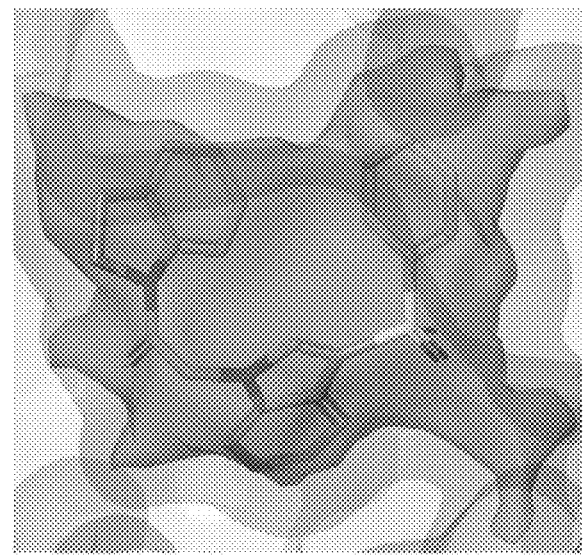

It was also examined how the LBP structure changes throughout the course of the MD simulation. The LBP changed its shape and expanded from 352 Å$^3$ to 668 Å$^3$ in the 1.5-μs accelerated MD simulation (FIGS. 8A & 8B), which is enough space to accommodate both ligands 34 and 80 (FIGS. 8C & 8D).

Figures 9A, 9B, 9C, 9D:
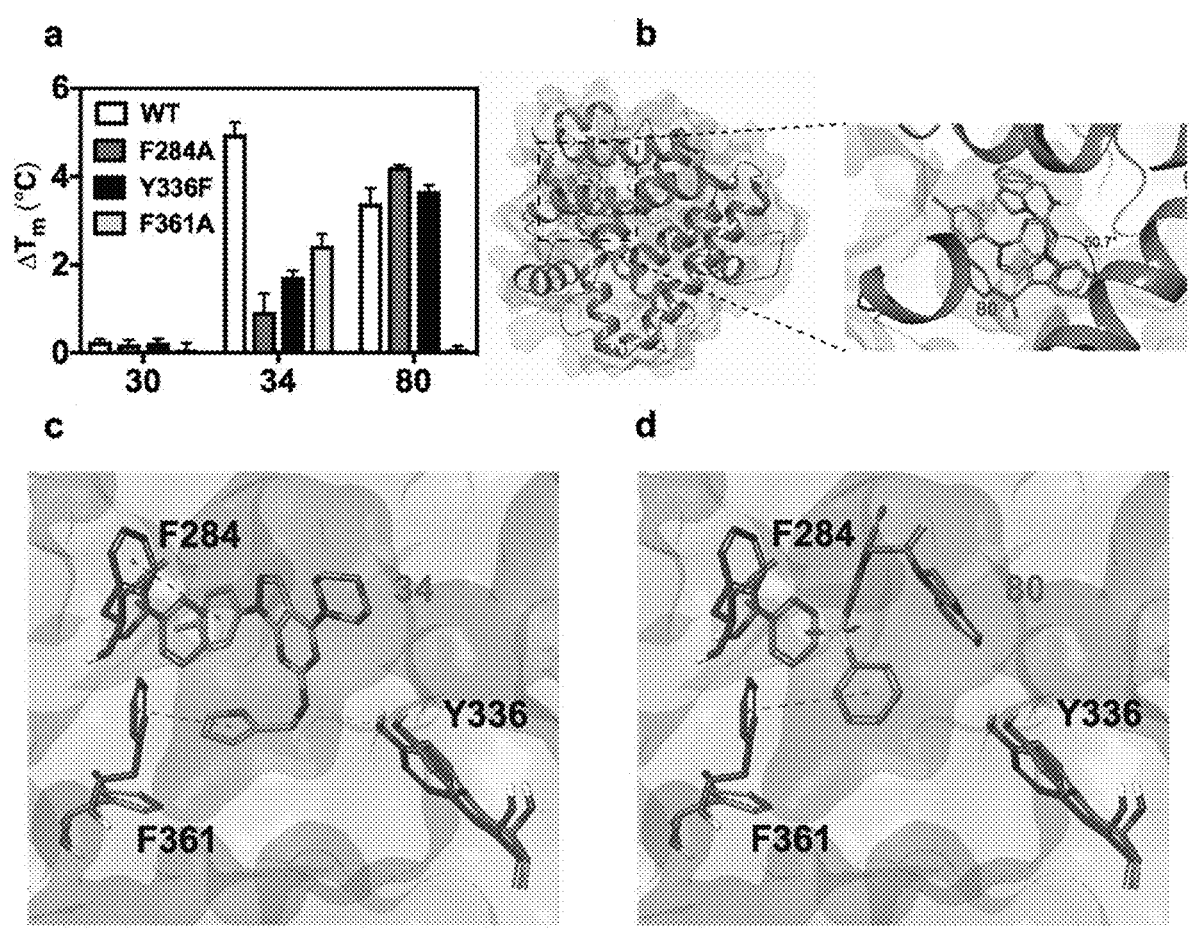
FIGS. 9A-9D show amino acid residues of GCNF ligand binding pocket (LBP) crucial to binding 34 and 80 are verified by mutagenesis experiments and molecular dynamics (MD) simulations.

Mutation Studies Confirm the Ligand Binding Modes from aMD Simulations. To confirm the binding modes predicted in accelerated molecular dynamics (aMD) simulations, amino acid residues that were predicted to mediate GCNF binding to ligands 34 and 80 were mutated, specifically F284 and F361. Both mutations F284A and F361A substantially decreased the $\Delta T_m$ compared to WT after adding 20 μM of 34 with respect to DMSO controls in DSF experiments (FIG. 9A). This can be interpreted as a marked decrease in the fractional occupancy of 34 in the mutants compared to WT at equimolar concentrations of ligand, indicative of weaker binding. Furthermore, the $\Delta T_m$ values suggest that the mutation F284A has a greater impact than F361 on decreasing the interaction with 34. This indicates that the methylphenyl group 71-71 contact with F284 has greater contribution to the overall binding than the furan ring TI-TI stacking interaction with F361 (FIG. 9C). It was also attempted to create a Y336A construct, but the protein has a tendency to precipitate out of solution.

In contrast, F284A has no substantial effect on decreasing the $\Delta T_m$ associated with adding 80, but F361A completely abrogated the interaction as the $T_m$ did not change even after adding the ligand (FIG. 9A). These results are consistent with in silico ligand docking results, where 80 is rotated 50.7° with respect to the central purine ring of ligand 34 in the LBP (FIG. 9B). Consequently, F284 does not contribute a π-π stacking interaction with 80. Moreover, the DSF results suggest that F361, which contribute a π-π contact with an indole-like ring in 80 may be crucial for stabilizing the ligand in the LBP (FIG. 9D).

Furthermore, the aMD results also demonstrate how the LBP accommodated ligands 34 and 80 with interactions favorable for binding. As shown in FIGS. 9C & 9D, F284, F361 and Y336 have two alternate conformations where F284 phenyl ring readjusts to a conformation favorable for π-π stacking interaction instead of clashing with the methylphenyl ring of 34. Residues F361 and Y336 similarly swing to favorable conformations that facilitate π-π stacking and H-bonding with 34, respectively.

Discussion Using a homology model of GCNF LBD, accelerated molecular dynamics (aMD) simulations were performed to capture a conformation of the protein that has a binding pocket that is spacious enough to accommodate ligands. In the aMD simulations, it was observed that the LBP expanded from 552 $Å^3$ to 668 $Å^3$. In silico ligand docking was performed on the aMD conformation with a more spacious LBP and found that ligands 34 and 80 identified in a high-throughput differential scanning fluorimetry (DSF) (FIGS. 3A-3D) screening fit the LBP, where 34 make crucial π-π stacking interactions with F284 and F361 phenyl rings and an H-bond with Y336 via the hydroxyl oxygen of the tyrosine side chain (FIG. 7C). Meanwhile, ligand 80 binds with one stacking interaction with F361 (FIG. 7D). Another evidence of direct binding of these ligands to GCNF LBD was shown by solution *H NMR, where the perturbation of shielded side chain methyl groups from hydrophobic methyl groups (i.e., Leu, Ile and Val) as a result of adding 34 and 80 (FIG. 3E) was monitored. Here, it was observed that adding ligand 34 resulted in a disparate perturbation pattern of the methyl region relative to 80, suggesting that these ligands bind the LBP at different geometries. This is supported by an overlay of ligands 34 and 80 in the LBP from in silico ligand docking, showing that 80 is rotated 50.7° with respect to 34 in the pocket (FIG. 9B).

Figure 11:
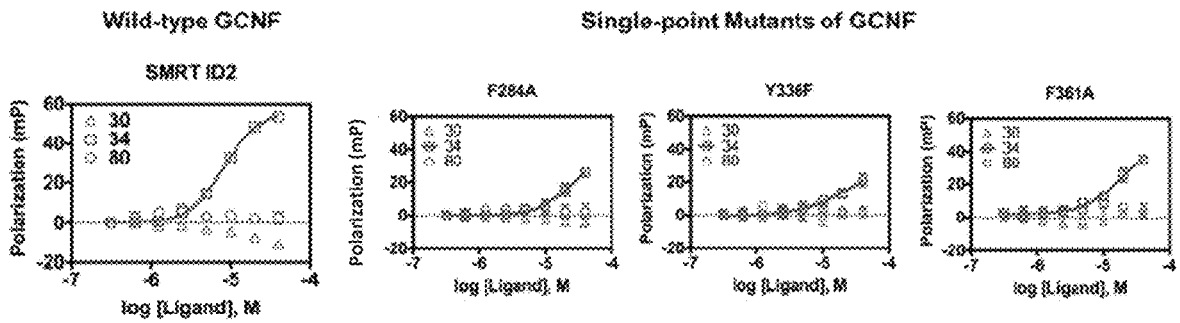
FIG. 11 shows amino acid residues of GCNF ligand binding pocket (LBP) crucial to binding 34 and 80 are verified by mutagenesis experiments followed by fluorescence polarization assay. SMRT-ID2 peptide is robustly recruited by wild-type GCNF as a function of ligand 34 concentration. Titrating ligands 30 and 80 has no effect on SMRTID2 recruitment. Incorporating single point mutations F284A, Y336F and F361A substantially weakened corepressor peptide recruitment as shown by the significant decrease in polarization and ligand 34 EC50 (inflection point) shifting to the right. Similar to wild-type, ligands 30 and 80 does not affect recruitment of SMRT ID2 peptide.
Figure 12:
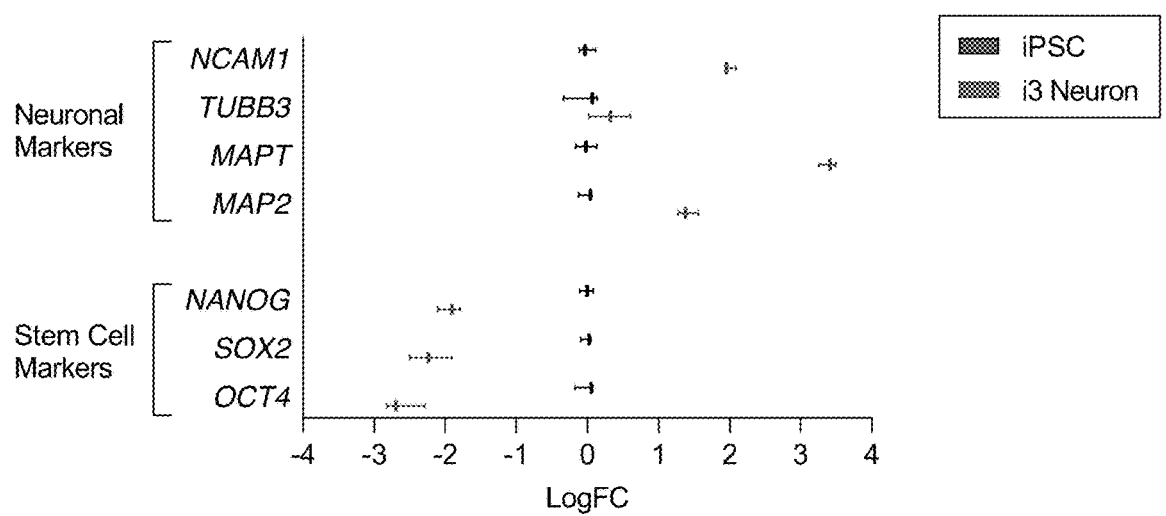
FIG. 12 shows the qPCR results showing altered expression of neuronal and stem cell markers after iPSCs differentiate into i3 neurons.

To corroborate the MD simulations and ligand docking, mutagenesis experiments and a subsequent DSF assay of the mutants were performed (FIG. 9A). Here, constructs F284A, Y336F, and F361A were made and showed that both singular mutations decrease the binding of 34, but the former has more impact on binding. Meanwhile, F284A has no effect on the binding on 80, but F361A abrogated the interaction. These results support the results of the ligand docking, which shows that F361, but not F284, forms a crucial π-π stacking interaction with 80, while both interactions are present with 34 (FIGS. 9C & 9D). It is also important to note that the binding of 34 increased the recruitment of the corepressor peptide SMRTID2 in a fluorescence polarization (FP) assay, but not ligand 80 (FIG. 4C), which also supports their different binding orientations in the pocket. Furthermore, the ability of 34 to alter the recruitment of a corepressor is consistent with results of the luciferase cotransfection assay revealing that 34 is an agonist of GCNF as a transcriptional repressor. Another agonist, ligand 80 also decreases GCNF transactivation in the same assay albeit to a lesser degree but does not recruit SMRT or NCoR peptides in FP experiments, suggesting that another unidentified corepressor protein could assist GCNF to suppress target genes. The FP assays are consistent with previous reports that SMRT and NCoR are corepressors of GCNF (Fuhrmann et al., 2001; Yan et al., 1997), but it is now shown for the first time that these corepressors employ only one of the two corepressor interaction boxes to bind GCNF, which is box 1 for NCoR and box 2 for SMRT. Similarly, the mutations show changes in polarization assay. See, FIG. 11, Identifying GCNF ligands is important to determine GCNF-dependent regulatory pathways. Most of the investigations on GCNF have been restricted to mouse studies (Chung et al., 2001; Akamatsu et al., 2009; Chung et al., 2006), GCNF overexpression (Wang et al., 2016) or siRNA knockdown (Wang et al., 2019) approaches and structural studies on the DNA binding domain (Weikum et al., 2016). These studies reveal the crucial roles of GCNF in embryonic cell differentiation, neurogenesis, reproduction and embryonic development. However, new ligands that directly bind and modulate the function of GCNF will facilitate understanding how modulation of GCNF activity could alter the expression of key target genes and to monitor the effects of GCNF activity alterations in various cellular systems and animal models with normal endogenous expression of GCNF. Furthermore, evidence of druggability of GCNF will open the possibility of developing future therapeutics and studies targeting GCNF. Because of its role in embryonic neurogenesis (Sattler et al., 2004), GCNF can be targeted with reporter ligands to understand how cognitive disorders emerge without altering the endogenous expression of GCNF (i.e., knockdown or knockout GCNF mutants).

It has also been shown that GCNF has the ability to regulate lipid metabolism. It is shown here that ligand 34 treatment results in the increased expression of the lipogenic gene DGAT1 as well as CPT1a in BeWo choriocarcinoma cells. Also, treatment of both ligands 34 and 80 increased the expression of PEPCK. These results are consistent with the results of a study showing NR6A1 as a potential lipid metabolic regulator in HepG2 cells (Wang et al. 2019). Lipid metabolism dysregulation has been considered a crucial metabolic hallmark of cancer cells, particularly enhanced lipid metabolism to meet the abnormal metabolic requirement of these cells. Thus, the ability of ligands 34 and 80 to alter the expression level of genes responsible in lipid metabolism highlights the possibility of future drug development for cancer by targeting GCNF.

Figure 10:
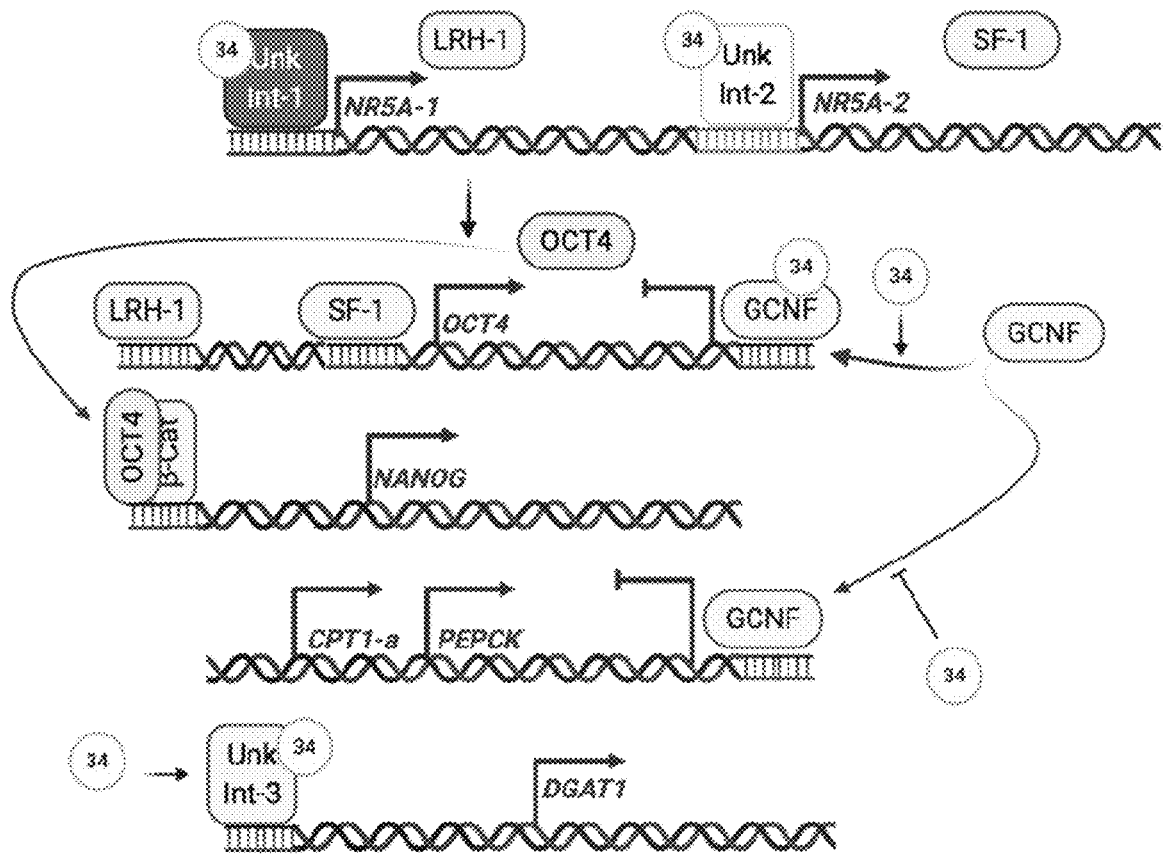
FIG. 10 shows a pathway map showing the effect of ligand 34 on GCNF target genes. Ligand 34 binds to unknown intermediates (Unk Int-1 and Unk Int-2), which promote the expression of nuclear receptors LRH-1 and SF-1, both of which promote Oct4 expression. When GCNF binds 34, the agonist increases the repressive function of GCNF on Oct4. Oct4 heterodimerizes with β-catenin, which promotes the expression of Nanog. Ligand 34 also decreases the repressive function of GCNF on CPT1a and PEPCK either directly or via an unknown intermediate, resulting in increased expression of these targets. Ligand 34 is possibly binding directly to an unknown intermediate (Unk-Int-3) or affects the activating effects of that intermediate via ligand 34 binding to GCNF resulting in the increased expression of DGAT1.

The ligand specificity assay shows that ligands 34 and 80 specifically bind GCNF, but not other nuclear receptors that modulate Oct4 expression, namely SF-1 (NR5A1) and LRH-1 (NR5A2) (FIG. 5A). Since GCNF is known as a transcriptional repressor of Oct4, and agonists 34 and 80 both repress GCNF transactivation in a luciferase reporter assay (FIG. 5B), it appears that the increase in Oct4 expression in BeWo cells (FIG. 6) is the result of the combined effects of 34-dependent increase in the expression of Oct4 promoters SF-1 and LRH-1 and the ligand 34-dependent repressive effect of GCNF on Oct4. The Oct4 promoting effects of SF-1 and LRH-1 are likely greater than the repressive ability of GCNF resulting in the increased Oct4 expression. Furthermore, the increase in Nanog expression is likely a consequence of the increase in Oct4 expression, which forms a complex with β-catenin to bind the promoter of Nanog and increase its expression (FIG. 10).

Ligand 34 possibly binds to unknown intermediates (Unk Int-1 and Unk Int-2), which promote the expression of nuclear receptors LRH-1 and SF-1, both of which promote Oct4 expression. Presence of 34 also decreases the repressive function of GCNF on CPT1a and PEPCK either directly or via an unknown intermediate, resulting in increased expression of these targets. Ligand 34 is possibly binding directly to an unknown intermediate (Unk-Int-3) or affects the activating effects of that intermediate mediated by GCNF-34 complex, resulting in the increased expression of DGAT1.

In aggregate, the results of this study highlight the discovery of first ligands with specific structures that directly bind GCNF that act as agonists of transcriptional repression, alter the receptor interaction with corepressors (i.e., ligand 34), and modulate the expression of GCNF target genes in BeWo choriocarcinoma cells. Since this is the first study to show specific structures of ligands that directly bind and modulate GCNF function, future studies can be performed to optimize these ligands for specificity so as to eliminate off-tangent effects in cells. In particular, there is a need to identify GCNF ligands that will suppress the expression of lipogenic genes through GCNF, which have potential applications in cancer therapeutics. Nevertheless, this study demonstrates that GCNF is druggable and the target genes of GCNF can be modulated through small molecule ligands. Ligand analogs of 34 and 80 can be developed to manipulate pluripotency in embryonic stem cells and to develop new cancer treatments targeting GCNF.

B. iPSC Cell Differentiation to Neurons qPCR using iPSC samples and differentiated neurons samples to make sure the primers worked. These primers include:
  Housekeeping genes for normalization: CYCLO, 36B4, GAPDH
  Stem cell markers: OCT4, SOX2, NANOG, REX1
  Neuronal markers: MAP2, MAPT, TUBB3, NCAM1

Figure 13:
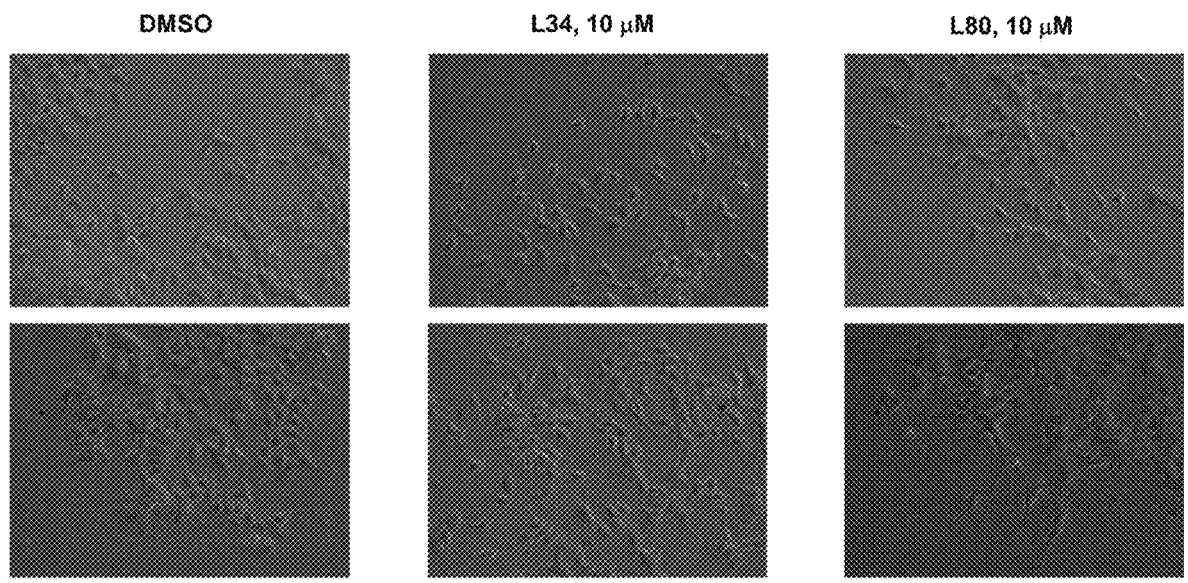
FIG. 13 shows microscope images of i3 neurons differentiated from induced pluripotent stem cells (iPSCs) with or without ligand 34 or 80 treatment (10 mM) show increased neurite outgrowth and more extensive branching. Area of cell bodies remain unchanged after ligand treatment.
Figures 14A, 14B, 14C:
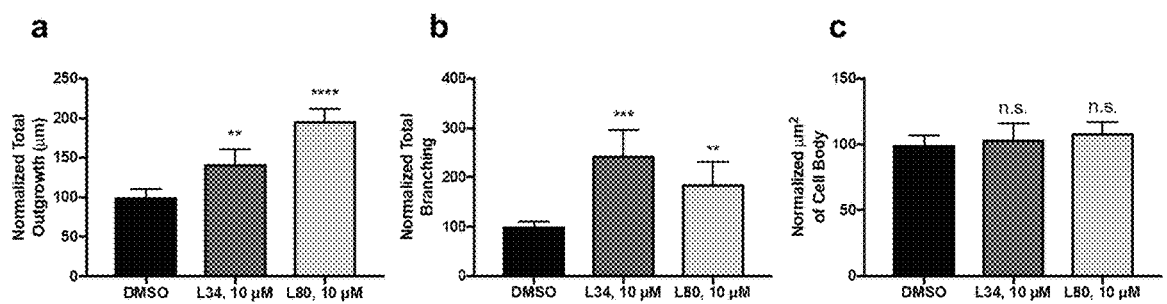
FIGS. 14A-14C show neurons differentiated from induced pluripotent stem cells (iPSCs) with ligand 34 or 80 treatment, showed significant increase of neurite outgrowth (FIG. 14A) and more extensive branching (FIG. 14B). Area of cell bodies remain unchanged after ligand treatment (FIG. 14C). Note that, *: P<0.05; : P<0.01; *: P<0.001; ****: P<0.0001
Figures 15A, 15B:
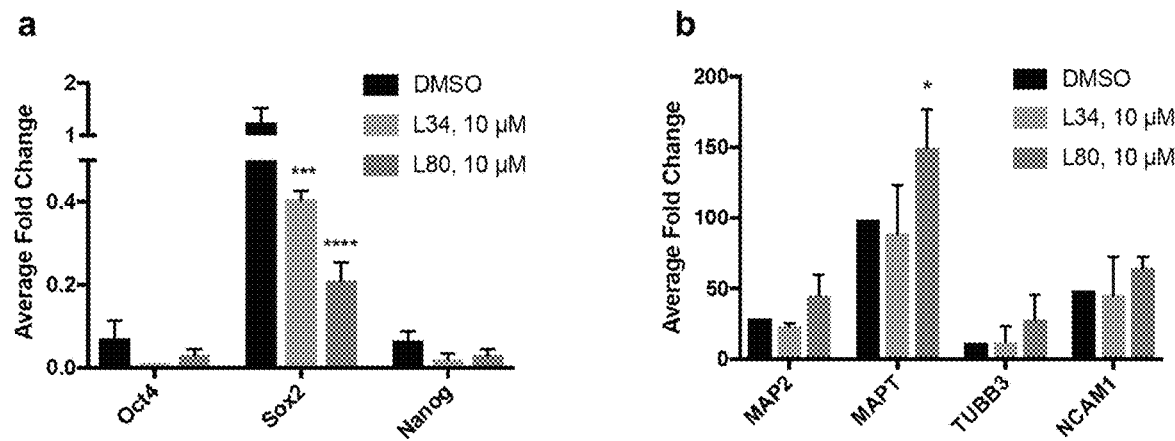
FIGS. 15A & 15B show qPCR revealed that upon ligand treatment, the expression of pluripotency marker Sox2 is substantially decreased by both ligand 34 and 80. Meanwhile, neuronal marker MAPT is substantially increased by ligand 80. Note that, *: P<0.05; : P<0.01; *: P<0.001; ****: P<0.0001

Treatment of induced pluripotent stem cells (iPSCs) before and during doxycycline-induced differentiation of iPSCs to i3 neurons resulted in marked increase in neurite outgrowth and branching while maintaining neuronal cell body area. This increased differentiation is shown in the microscope images of i3 neurons (FIG. 13). Increases in the amount of neuronal outgrowth and branching are seen in FIGS. 14A & FIG. 14B, while no further increase in cell body area was seen after ligand treatment. The relevant expression of certain neuronal and pluripotency markers was analyzed and after treatment with the ligands substantially decreased Sox2 expression was observed while neuronal marker MAPT was increased with treatment of ligand 80.

Neurite outgrowth is a process wherein new projections grow on developing neurons. During development, neurite outgrowth results in the formation of complex neuronal architecture that forms the functional nervous system and brain (Tosney et al., 1985).

Being able to control neurite outgrowth via ligand treatment that targets GCNF, such as ligands 34 and 80, can shed light on mechanisms underlying certain neurodegenerative diseases, such as Alzheimer's and Parkinson's disease (Millecamp et al., 2013).

D. Molecular Modeling

Figure 16A:
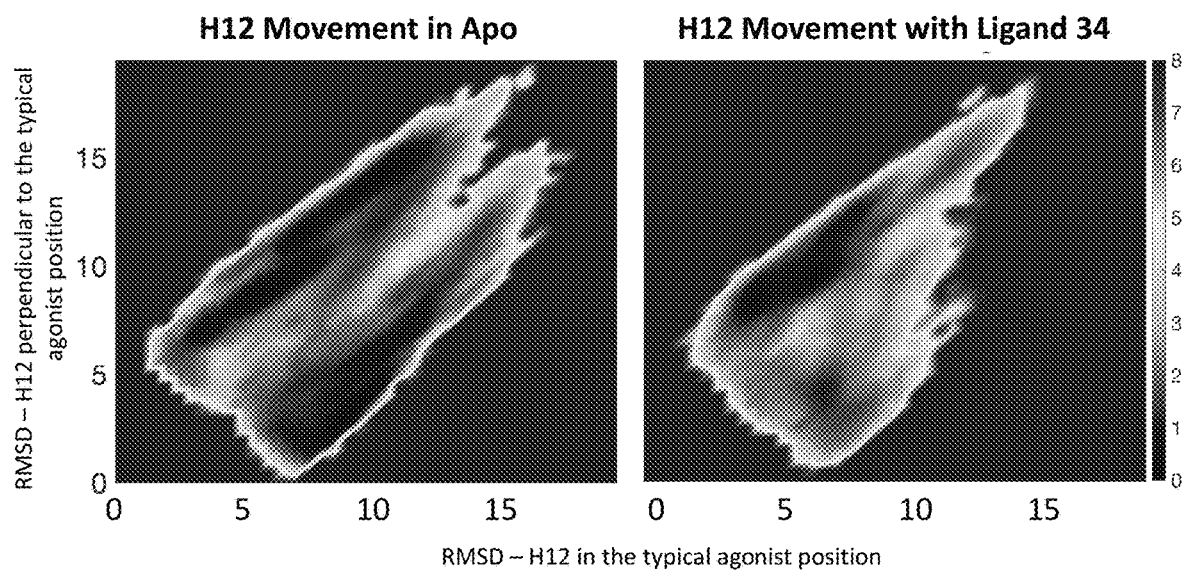
FIGS. 16A & 16B show accelerated MD simulations reveal that ligand 34 binding to GCNF LBD results in a transition from an inactive to active conformation of the C-terminal helix (Helix 12). Potential energy landscapes from the combined simulations of apo and ligand 34-bound GCNF (FIG. 16A). The energy landscapes show that Helix 12 movement is restricted by ligand 34 binding. The corresponding low-energy structures of ligand 34-bound (orange) and apo (gray) GCNF LBD clearly shows the positioning of Helix 12 (FIG. 16B).
Figure 16B:
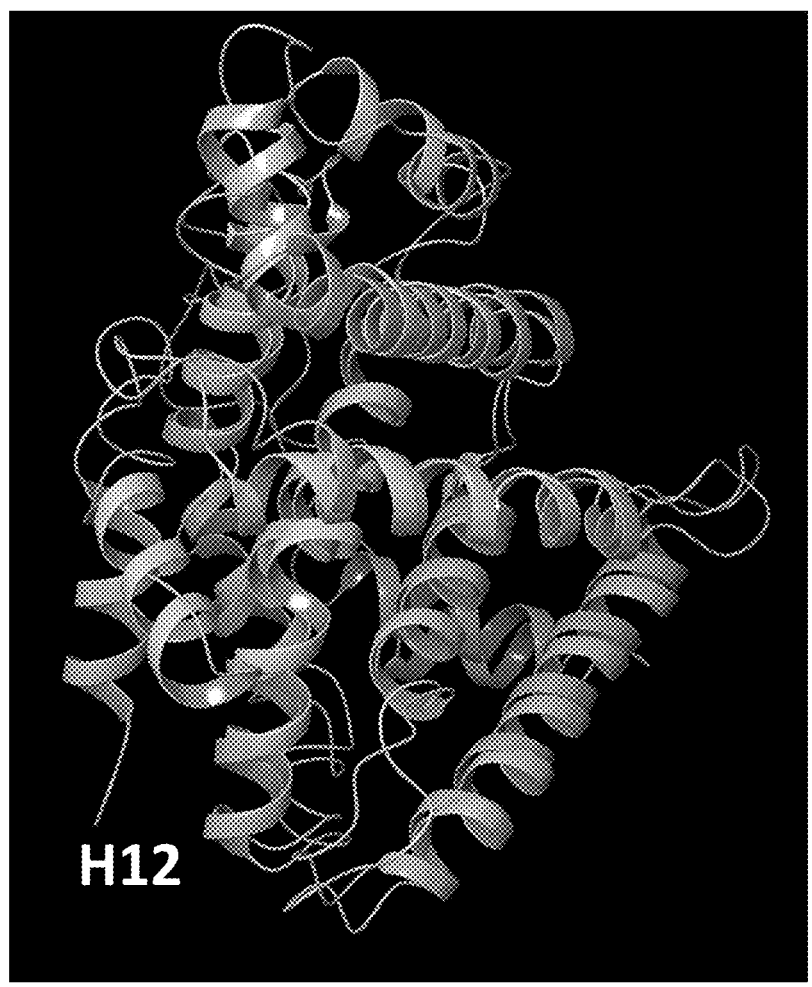

The GCNF structure between apo and ligand 34-bound docked models were compared using extensive accelerated MD simulations in six independent 1.5 μs independent simulations for each system. We calculated potential energy landscapes for apo and ligand-bound GCNF from the combined simulations. The landscapes indicate that ligand 34 restricts the conformation of the C-terminal helix (Helix 12) of GCNF (FIG. 16A). Helix 12 conformation and dynamics are critical for coregulator binding to other nuclear receptors.[1] Based on the energy landscapes, we clustered all simulation frames within 0.7 kcal mol$^{-1}$ of the lowest energy structure for both apo and ligand 34 bound receptor. Ligand 34 is found in several different binding modes in these low energy structures. The binding mode in the largest cluster indicates that the ligand sterically blocks Helix 12 from a conformation conducive to coactivator binding, thereby making the recruitment of corepressors, including SMRT and NCOR, more favorable (FIG. 16B).

E. Further Ligand Development

Additional ligand screening were performed to identify ligands that directly bind to GCNF ligand binding domain (LBD). Here, nuclear receptor-specific libraries from Life Chemicals and additional ligands curated by a collaborator, which are known to target REV-ERB and ROR nuclear receptors were employed. Because of the structural and sequence similarity of these receptors to GCNF, it is believed that the size, volume and shape of their binding pockets are similar to GCNF.

In silico ligand docking via Schrodinger Maestro Glide using the homology model was used to help discover the initial ligand hits, 34 and 80. This procedure helped prioritize ligands for in vitro screening using a high-throughput differential scanning fluorimetry (DSF) assay.

From these libraries, 8 ligands that bind directly to GCNF and increase the melting temperature of the protein by 1-2° C. were discovered. All of the identified compounds substantially increased $T_m$ ($DT_m>0.5$; $P\leq0.05$) and significantly increased recruitment of SMRT ID2 ($P\leq0.05$). In particular, the change in $T_m$ for $R_4$ was 1.2° C., $R_5$ was 1.6° C., $R_9$ was 0.8° C., $R_{12}$ was 0.8° C., U1 was 0.9° C., U2 was 2.3° C., U4 was 1.2° C., and U7 was 1.0° C.

Figure 17:
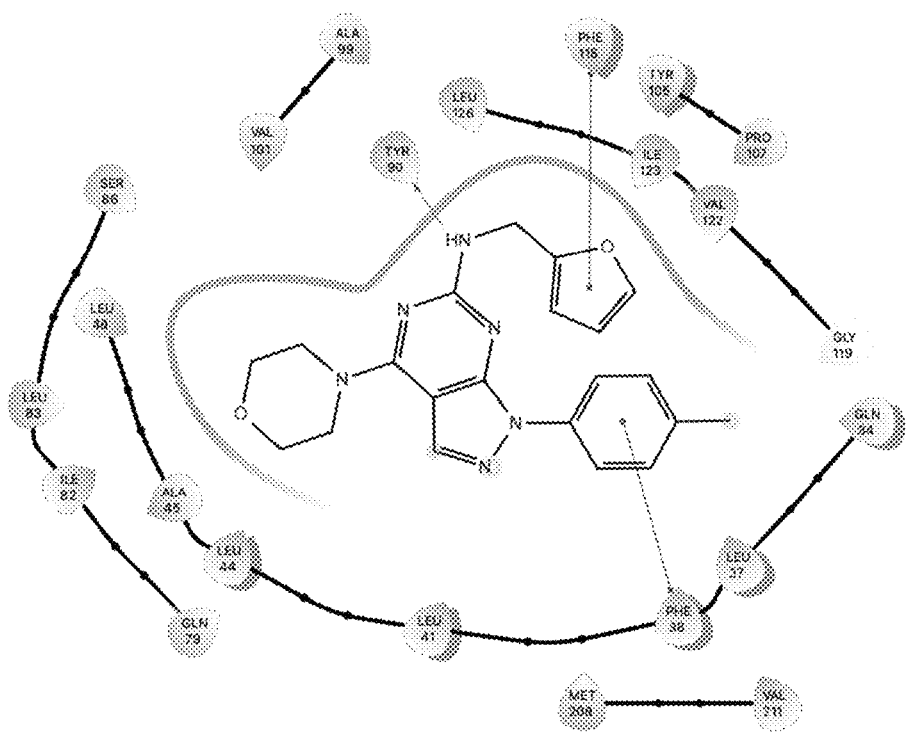
FIG. 17 shows 2D interaction diagram of ligand 34 in the GCNF ligand binding pocket (LBP).

After the identification of these additional ligands, further development of new ligands was undertaken based upon the binding of ligand 34 to the GCNF ligand binding pocket as shown in FIG. 17. Based upon the binding to the ligand binding pocket, additional ligands were proposed based upon the binding pocket. The proposed ligand analog is shown below:

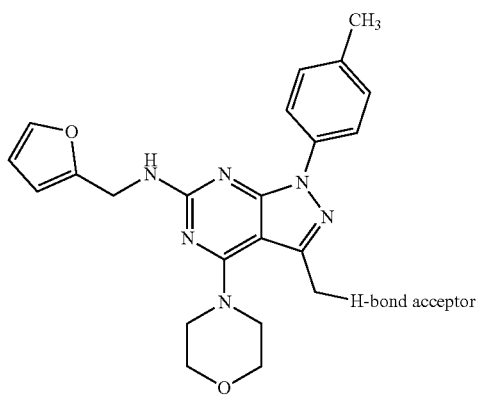

Based upon this binding site interactions, the following ligands were proposed:
These proposed ligands all showed in silica screening with good GlideScores. These compounds may be synthesized using the following protocol.
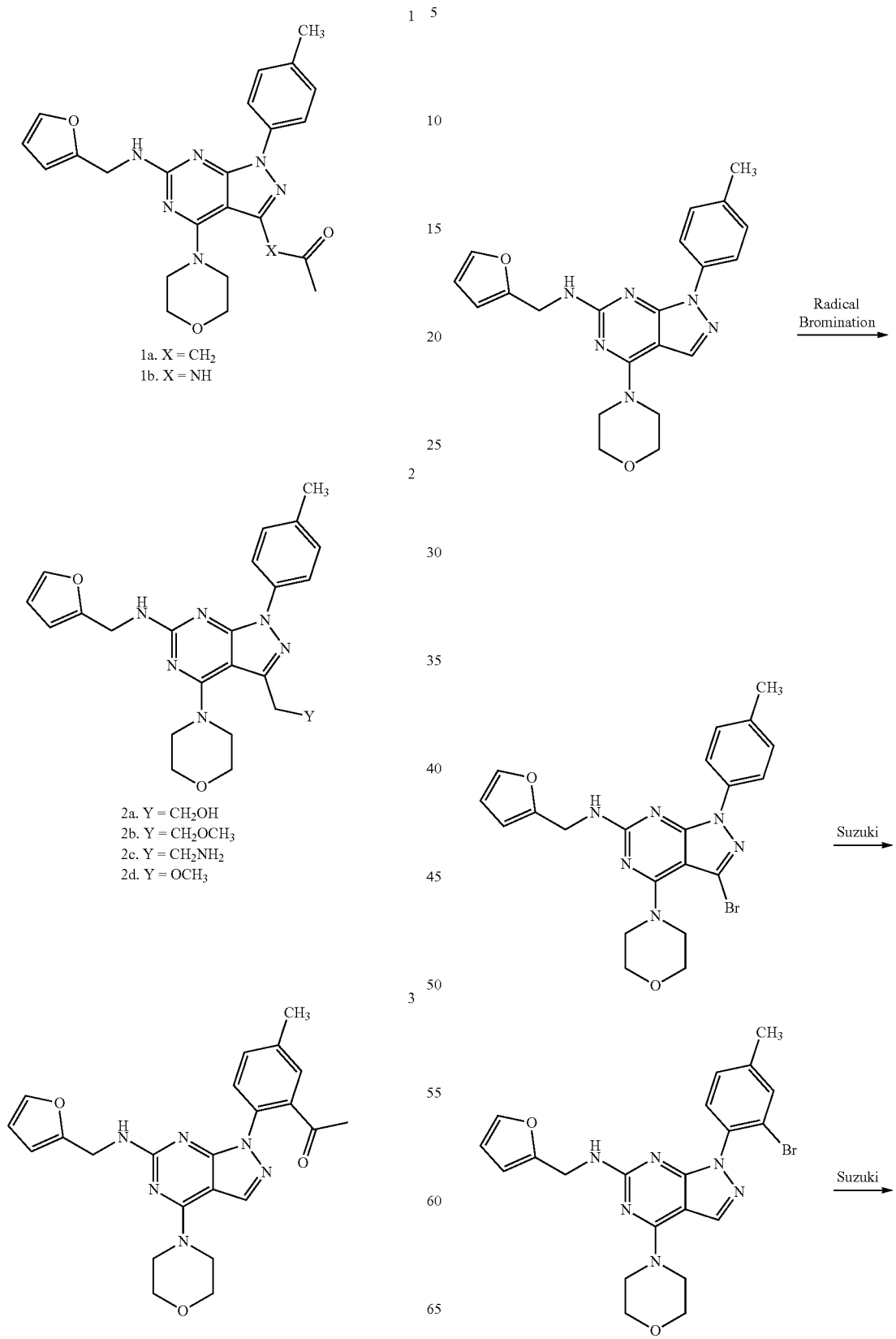

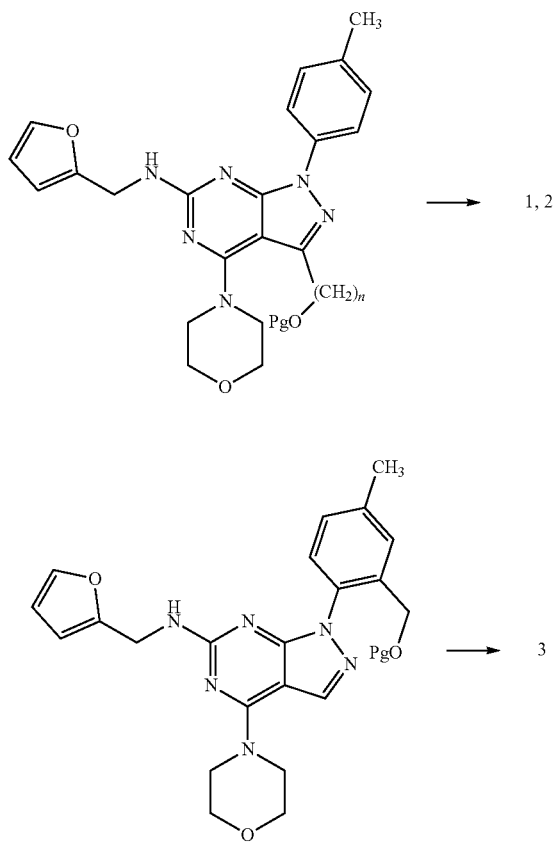

C. Methods

Protein Expression and Purification. Human GCNF (NR6A1) LBD (residues 248-480) and mutants F284A/F361A, human LRH-1 (NR5A2) LBD (residues 291-541), human RXRα LBD (residues 223-462), human COUP-TF I LBD (residues 184-410) and human SF-1 LBD (residues 219-461) were subcloned in pET45b(+) plasmid (Novagen) were expressed in E. coli BL(21) DE3 cells in terrific broth with 0.1 mg/mL ampicillin as 3C protease-cleavable hexa-histidine-tagged fusion proteins. The bacterial culture was grown at 37° C. to an optical density of 0.8 to 1.0 at 600 nm. Protein expression was induced by adding 1 mM IPTG and was allowed to proceed for 14 h at 22° C. Cells were harvested, lysed, filtered and applied to a Ni NT A affinity column (HisTrap HP, GE Healthcare Life Sciences); proteins in wash buffer (50 mM Tris, pH 8.0, 500 mM NaCl, 20 mM imidazole, 5 mM TCEP) were eluted against a 500 mM imidazole gradient and subsequently purified by size exclusion chromatography (HiLoad 16/60 Supeidex 75 pg, GE Healthcare Life Sciences). The final buffer contains 50 mM HEPES (pH 7.5), 50 mM KCl.5 mM TCEP, and 0.5 mM EDTA.

DSF Assay. GCNF LBD (5 μM) were mixed with 1× Sypro orange (Invitrogen) in DSF buffer (50 mM HEPES, 50 mM KCl, 5 mM TCEP, 0.5 mM EDTA, pH 7.5). Test compounds was added at 1:1 molar equivalence as protein or replaced with DMSO control. Ten microliters (10 μL)×5 replicates for each sample were plated on 384-well PCR microplate. No protein control and no ligand references were also run simultaneously in 5 replicates on the same plate. A total of 450 compounds (Life Chemicals) previously selected from a nuclear-receptor-biased library targeting REV-ERB were analyzed. Thermal stability was assessed on a Quantstudio 6 instrument (Biosystems) by ramping the temperature from 25° C. to 95° C. at 0.05° C./s and protein melt shifts were subsequently quantified by Boltzmann-derived melting temperature ($T_m$) using the Protein Thermal Shift (ThermoFisher) software. Positive hits were identified when a thermal shift ($\Delta T_m$) of at least 2° C. was observed.

For the DSF ligand titration assay, ligands 30, 34 and 80 were titrated against 5 μM GCNF LBD with a ligand concentration series of 30, 20, 13, 9, 6, 4, 2.6, 1.7 and 0 μM from a 20 mM DMSO stock solution. DSF assay and analysis was then performed as described above. All DSF data were reported as mean±SEM.

Solution NMR spectroscopy. One hundred micromolar (100 μM) of GCNF LBD with 10% $D_2O$ were mixed with either 0.5% DMSO-$d_6$ or 1.05:1 molar equivalence of ligand and transferred to a Shigemi tube. $^1H$ NMR data were acquired at 298 K on a 700 MHz Bruker Avance II HDTM NMR instrument equipped with a QCI cryoprobe. For each spectrum, 1024 transients were collected into 32,000 data points, with a spectral width of 16.7 kHz. Data were analyzed using Topspin 3.5 pl 7.

FP Assay. Fluorescence polarization (FP) assays were performed in triplicate on a 384-well Corning 3820 black opaque plate using a Biotek Synergy Neo2 HTS multimode microplate reader at excitation and emission wavelengths of 485 nm and 538 nm, respectively. Data were analyzed and plotted using GraphPad Prism as mean±SEM.

For the corepressor peptide FP binding assay, 70.0, 35.0, 17.5, 8.8, 4.4, 2.2, 1.1, 0.55, 0.27, 0.14, and 0 μM of GCNF LBD was mixed with 500 nM N-terminus fluorescein-tagged corepressor peptides NCoR ID1 (RTHLITLA-DHICQIITQDFARN (SEQ ID NO: 1)), NCoR ID2 (DPASNLGLEDIIRKALMGSFDDK (SEQ ID NO: 2)), SMRT ID1 (GHQRVVTLAQHISEVITQDYTRH (SEQ ID NO: 3)), or SMRT ID2 (HASTNMGLEAHRKALMG-KYDQW (SEQ ID NO: 4)) (ThermoFisher Scientific) in assay buffer containing 50 mM HEPES (pH 7.5), 50 mM KCl, 5 mM TCEP, 0.5 mM EDTA and 0.005% Tween20. The relative polarization was plotted against the GCNF LBD concentration and fitted via nonlinear regression (one site specific binding with Hill slope) to extract $K_D$.

For the FP ligand titration assay, the aforementioned N-terminus fluorescein-tagged corepressor peptides were diluted to 500 nM from a 100 μM DMSO stock in the presence of 20 μM GCNF LBD and ligand concentration points 30, 20, 13, 9, 6, 4, 2.6, 1.7 and 0 μM in assay buffer containing 50 mM HEPES (pH 7.5), 50 mM KCl, 5 mM TCEP, 0.5 mM EDTA and 0.005% Tween20. The relative polarization was plotted against log of ligand concentration (μM) and the half maximal effective concentration ($EC_{50}$) values were derived via sigmoidal fit.

Cell Culture, Cotransfection Assays, and QPCR Analysis. Cotransfection assays were performed in HEK293 cells as previously described (Griffett et al., 2013; Wu et al., 2003; Savkur et al., 2003). Briefly, for dose-response cotransfection assays, a chimeric Gal4-DBD human GCNF-LBD in the pBIND vector was cotransfected with pGL4.35[luc2P/

9XGAL4UAS/Hygro] vector (Promega). All cotransfections were normalized to *renilla* (pGL4.73; Dual-Glo luciferase reagent; Promega) and subsequently DMSO for analysis.

BeWo cells were cultured in DMEM-F12 medium (Gibco) with 10% FBS (Gembio) and plated at 75,000 cells per well in 12-well plates (Corning). 24-hours after plating, cells were treated with either DMSO, ligand 34 or ligand 80 (20 µM) at 4 wells/group. RNA was isolated 24-hours after drug treatment and cDNA was synthesized for the QPCR assays using Bio-Rad iScript cDNA synthesis kit per manufacturer's protocol. Expression was analyzed by QPCR using a custom array plate (Bio-Rad PrimePCR) per manufacturer's protocol; n=4 was used for cell-based assays and plotted as mean±SEM.

Electrospray Ionization Time-of-Flight Mass Spectrometry. Samples of His-tagged GCNF LBD were concentrated to 50 µM in 20 mM HEPES (pH 7.5), 10 mM KCl buffer and submitted to the Washington University Biomedical Mass Spectrometry Resource for electrospray ionization (ESI) time-of-flight (TOF) mass spectrometry analysis to determine average molecular weight. Samples were diluted in deionized water and introduced by direct injection using 1:1 methanol water with 0.5% acetic acid. Formic acid was also added to favor protonation over salt adducts.

Homology Modeling. The amino acid sequence of GCNF LBD was submitted to the Phyre2 portal for protein modeling (Kelley et al., 2015) in intensive mode. The best templates were selected based on calculations to maximize confidence, percentage of amino acid identity and alignment coverage. The homology model (99% modeled at >90% confidence) was submitted to the 3DLigandSite (Wass et al., 2010) server to predict potential binding sites.

Accelerated molecular dynamics (aMD) simulation and Ligand Docking. In this study, a dual boosting approach was performed in which two separate boost potentials are added to both dihedral and the total potential energy surfaces. A short cMD simulation of 100 ns was carried out to calculate the boost parameters, E and a, using the following equations:

$$E_{total} = V_{total\_avg} + 0 \cdot 16 \times N_{atoms}, \alpha_{total} = 0 \cdot 16 \times N_{atoms}$$

$$E_{dihed} = V_{dihed\_avg} + 4 \times N_{residues}, \alpha_{dihedral} = 4 \times N_{residues}/5$$

Where $V_{total\_avg}$ and $V_{dihed\_avg}$ are the average total potential and average dihedral energies and $N_{atoms}$ and $N_{residues}$ are the number of atoms and residues in the system (Hamelberg et al., 2004). aMD simulations were performed for 1.5 µs with time step of 3 fs and saved every 30 ps. Both cMD and aMD production runs were carried out using the Amber 16 molecular modeling package (Case et al., 2005). To build the simulation the PDB file of structures were submitted to h++ server (http://biophysics.cs.vt.edu/H++) with 50 mM salt to generate the protonated states of protein at pH 7.4 (Anandakrishnan et al., 2012). The resulting PDB file was modified using pdb4amber in AmberTools14 to use with tleap (Roe and Cheatham, 2013). To obtain the final solvated system the structure was immersed in a truncated octahedron box of TIP3P (Jorgensen et al., 1983) water molecules extended to 10 Å from the protein atoms. Counterions were added to neutralize the structure and KCl (K+ and Cl− ions) was added to 50 mM (Joung and Cheatham, 2009). The resulting system was prepared for simulation with a series of minimization steps as follows. First, force constant restraints of 5 kcal mol$^{-1}$ Å$^{-2}$ was applied to the protein heavy atoms through 2000 steps of steepest descent energy minimization. Second, 15 ps MD simulation was performed using the SHAKE algorithm and NVT ensemble. Then the system was minimized (steepest descent) for two more rounds of 2000 steps using the 2 and 0.1 kcal/mol Å$^2$ spring constant restraints. Then three simulations of 5 ps, 10 ps and 10 ps with 1, 0.5 and 0.5 kcal/mol Å$^2$ force constant restraints on heavy atoms were performed. Finally, the systems were equilibrated using an NPT run for 200 ps without restraints. Hydrogen atoms were constrained with the SHAKE algorithm and hydrogen mass repartitioning were used to allow a time step of 4 fs for cMD run (Hopkins et al., 2015).

Production MD runs of constant pressure replicates were performed from randomized initial velocities. The pressure was regulated with a pressure relaxation time (taup) of 2 ps using a Monte Carlo barostat. Temperature was maintained at 310K using Langevin dynamics with a collision frequency (gamma_ln) of 3 ps$^{-1}$. Electrostatic interactions were calculated using particle mesh Ewald with an 8.0 Å cutoff. The simulation results were analyzed using cpptraj program in the AmberTools 14 Toolbox (Roe and Cheatham, 2013).

The GCNF LBD model extracted from MD simulation was preprocessed in Schrodinger Maestro, the ligand binding site was predicted via SiteMap and subsequent ligand docking was performed using Glide. Ligands were created in 2D Sketcher and prepared in LigPrep. The fully processed predicted GCNF structure was then included in the workspace along with the ligand. Compounds was then moved to the approximate GCNF binding site in preparation for receptor grid generation. To identify the ligand, the receptor grid was set around an atom within the ligand. The size of the receptor grid was increased to include the ligand and the entire binding site of the predicted GCNF structure. Receptor-based Virtual Screening and Ligand Docking were subsequently utilized in Glide SP.

Quantification and Statistical Analysis. All data fitting and statistical analyses were performed using GraphPad Prism software version 8.0. Reported values, exact n values and statistical significance are indicated in Figure legends or within the Methods text. For cell-based experiments, statistical analysis was performed via one-way ANOVA with Tukey post hoc comparison and statistical significance was defined as *: P≤0.05; : P≤0.01; *: P≤0.001. Any P>0.05 was considered not significant (n.s.)

iPSC Differentiation to Neurons. For growing neurons from iPSC cells, the method described by Femandopulle were employed (Femandopulle et al., 2018). Briefly, cells were treated with doxycycline to turn on expression of Neurogenin-2 (NGN2), which irreversibly sets these cells on the path of neuronal differentiation. The cells were treated with doxycycline for 3 days (changing media every day), and then re-plate the cells onto new plates coated with PLO. For each time point, 21 samples were prepared (DMSO and ligands 34 and 80 at different concentrations, in triplicate).

An overview of the experiment timeline is shown as well:
Day 0: Plate iPSC on matrigel-coated 12-well plates
Day 2: Treat cells −/+ ligands in iPSC media
Day 3: Refeed cells induction media +Doxycycline −/+ ligands to start neuronal differentiation (Day 0 of differentiation)

Day 4: Refeed cells induction media +Doxycycline −/+ ligands (Day 1 of differentiation)

Day 5: Refeed cells induction media +Doxycycline −/+ ligands (Day 2 of differentiation)

Day 6: Take pictures; Refeed cells neuronal media −/+ ligands (Day 3 of differentiation)

Day 7: Collect cells for RNA/qPCR (Day 4 of differentiation)

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

V. REFERENCES

The following references, to the extent that they provide exemplary procedural or other details supplementary to those set forth herein, are specifically incorporated herein by reference:

Anderson, *Practical Process Research & Development—A Guide for Organic Chemists*, 2$^{nd}$ ed., Academic Press, New York, 2012.

*Handbook of Pharmaceutical Salts: Properties. and Use*, Stahl and Wermuth Eds., Verlag Helvetica Chimica Acta, 2002.

Reagan-Shaw et al., *FASEB J.* 22(3):659-661, 2008.

Smith, *March's Advanced Organic Chemistry: Reactions, Mechanisms, and Structure*. 7$^{th}$ Ed., Wiley, 2013.

WO 2007/095495

Agoulnik et al., *FEBS Lett*, 424(1-2):73-78, 1998.

Akamatsu et al., *J Neuroscu* 29(7):2113-2124, 2009.

Anandakrishnan et al., *Nucleic Acids Res*, 40(Web Server issue):W537-541, 2012.

Bamea et al., *J Biol Chem*, 275(9):6608-6619, 2000.

Bramlett et al., *J Pharmacol Exp Ther*, 307(1):291-296, 2003.

Buijsman et al., *Med Chem Res*, 13(3-4):210-215, 2004.

Case et al., *J Comput Chem.* 26(16): 1668-1688, 2005.

Chen et al., *Mol Endocrinol.* 8(10): 1434-1444, 1994.

Chung et al., *Dev Biol.* 293(1): 13-24, 2006.

Chung et al., *Mol Cell Biol.* 21(2):663-77, 2001.

Cooney et al., *Biochem Biophys Res Commun.* 245(1):94-100, 1998.

dc Vera, *ACS Pharmacology and Translational Science.* 1(2): 134-137, 2018.

Fernandopulle et al., *Current Protocols in Cell Biology.* 79:e51, 2018.

Friesner et al., *J Med Chem.* 47(7): 1739-1749, 2004.

Friesner et al., *J Med Chem.* 49(21):6177-6196, 2006.

Fuhrmann et al., *Dev Cell*, 1(3):377-387, 2001.

Greschik et al., *Mol Cell Biol.* 19(1):690-703, 2009.

Griffett et al., *ACS Chem Biol*, 8(3):559-567, 2013.

Gu et al., *Mol Cell Biol*, 25(19):8507-8519, 2005.

Gu et al., *Mol Cell Biol*, 25(9):3492-3505, 2005.

Gurtan et al., *Genes Dev,* 27(8):941-954, 2013.

Halgren, *J Chem Inf Model*, 49(2):377-389, 2009.

Hamelberg et al., *J Chem Phys*, 120(24): 11919-11929, 2004.

Hirose et al., *Gene,* 163(2):239-242, 1995.

Hopkins et al., *J Chem Theory Comput*, 11(4): 1864-1874, 2015.

Joigensen et al., *J. Chem. Phys.*, 79:926-935, 1983.

Joung and Cheatham, *J Phys Chem B*, 113(40): 13279-13290, 2009.

Kapelle et al., *Biochim Biophys Acta*, 1352(1): 13-17, 1997.

Kelley et al., *Nat Protoc*, 10(6):845-858, 2015.

Kleckner et al., *Biochim Biophys Acta*, 1814(8):942-968, 2011.

Krill et al., *Mol Endocrinol*, 27(5):754-768, 2013.

Lan et al., *J Biol Chem*, 277(52):50660-50667, 2002.

Laudet and Gronemeyer, *The nuclear receptors factsbook.* Academic Press: London, 2002.

Mehta et al., *Placenta*, 23(4):281-287, 2002.

Millecamps & Julien, *Nat. Rev. Neurosci.*, 14(3):161-176, 2013.

Mullen et al., *PPAR Res*, 2007:61563, 2007.

Niesen et al., *Nat Protoc*, 2(9):2212-2221, 2007.

Paranjpe and Veenstra, *Biochim Biophys Acta*, 1849(6):626-636, 2015.

Roe et al., *J Chem Theory Comput*, 9(7):3084-3095, 2013.

Sattler et al., *Mol Endocrinol*, 18(11):2714-2726, 2004.

Savkur et al., *Mol Genet Metab*, 80(1-2):216-226, 2003.

Schlaepfer and Joshi, *Endocrinology*, 161(2), 2020.

Solt et al., *Nature*, 485(7396):62-68, 2012.

Susens et al., *Dev Neurosci*, 19(5):410-420, 1997.

Takao et al., *Biochem Biophys Res Commun*, 353(3):699-705, 2007.

Tosney & Landmesser, *Developmental Biology*, 109(1): 193-214, 1985.

Thomas et al., *J Biol Chem*, 278(4):2403-2410, 2003.

Wang and Cooney, *Semin Cell Dev Biol*, 24(10-12):679-686, 2013.

Wang et al., *Cell Commun Signal*, 17(1):77, 2019.

Wang et al., *Cell Communication and Signaling*, 17(77): 1-12, 2019.

Wang et al., *J Biol Chem*, 291(16):8644-8452, 2016.

Wang et al., *Stem Cells*, 31(12):2659-2666, 2013.

Wass et al., *Nucleic Acids Res*, 38 (Web Server issue):W469-473, 2010.

Weikum et al., *J Mol Biol*, 428(24 Pt B):4981-4992, 2016.

Weikum and Ortlund, *Protein Science*, 27(11): 1876-1892, 2018.

Wu et al., *Journal of Biological Chemistry*, 278(10):8637-8644, 2003.

Xiang, *Curr Protein Pept Sci*, 7(3):217-227, 2006.

Yan et al., *J Biol Chem*, 272(16): 10565-10572, 1997.

Yan et al., *J Biol Chem*, 275(45):35077-35085, 2000.

Yang et al., *J Cell Biochem*, 101(5): 1198-1209, 2007.

Zaidi et al., *Prog Lipid Res*, 52(4):585-589, 2013.

Zechel, *Mol Reprod Dev*, 72(4):550-556, 2005.

Zhang et al., *Mol Reprod Dev*, 50(1):93-102, 1998.

What is claimed is:

1. A pharmaceutical composition comprising:
(A) a compound of the formula:

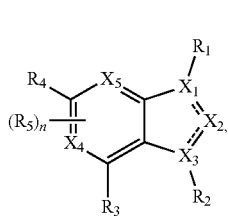

wherein:
n is 0, 1, or 2;
$R_1$ is hydrogen or -L-$R_a$, wherein:
$L_1$ is a covalent bond, —C(O)—, —S(O)$_2$—, -alkanediyl$_{(C\leq6)}$—C(O)—, -alkanediyl$_{(C\leq6)}$—C(O)—, -alkanediyl$_{(C\leq6)}$—S(O)$_2$—, or substituted -alkanediyl$_{(C\leq6)}$—S(O)$_2$—;
$R_a$ is aryl$_{(C\leq12)}$, heteroaryl$_{(C\leq12)}$, or a substituted version of any of these groups; or
a group of the formula:

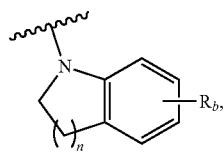

wherein:
n is 1 or 2;
$R_b$ is amino, halo, hydrogen, or hydroxy; or alkyl$_{(C\leq12)}$, alkylamino$_{(C\leq12)}$, dialkylamino$_{(C\leq12)}$, alkoxy$_{(C\leq12)}$, or a substituted version of any of these groups;
$R_2$ is hydrogen or -L$_1$-$R_a$, wherein:
$L_1$ is a covalent bond, —C(O)—, —S(O)$_2$—, -alkanediyl$_{(C=6)}$—C(O)—, substituted-alkanediyl$_{(C\leq6)}$—C(O)—, -alkanediyl$_{(C\leq6)}$—S(O)$_2$", or substituted -alkanediyl$_{(C\leq6)}$—S(O)$_2$—;
$R_a$ is alkyl$_{(C\leq12)}$, acyl$_{(C\leq12)}$, amido$_{(C\leq12)}$, or a substituted version of any of these groups;
$R_3$ is alkyl$_{(C\leq12)}$, cycloalkyl$_{(C\leq12)}$, heterocycloalkyl$_{(C\leq12)}$, or a substituted version of any of these groups;
$R_4$ is amino, halo, hydrogen, or hydroxy; or alkyl$_{(C\leq12)}$, alkylamino$_{(C\leq12)}$, dialkylamino$_{(C\leq12)}$, alkoxy$_{(C\leq12)}$, —NH-aralkyl$_{(C\leq12)}$, —NH-heteroaralkyl$_{(C\leq12)}$, —O-aralkyl$_{(C\leq12)}$, —O-heteroaralkyl$_{(C\leq12)}$, or a substituted version of any of these groups;
$R_5$ is, in each instance independently, amino, halo, or hydroxy; or alkyl$_{(C\leq12)}$, alkylamino$_{(C\leq12)}$, dialkylamino$_{(C\leq12)}$, alkoxy$_{(C\leq12)}$, or a substituted version of any of these groups; and
$X_1$, $X_2$, $X_3$, $X_4$, and $X_5$ are each independently N or CH;
or a pharmaceutically acceptable salt thereof; and
(B) an excipient.

2. The pharmaceutical composition of claim 1, wherein the pharmaceutical composition is formulated for oral, intraarterial, or intravenous administration.

3. A cell culture comprising:
(A) a cell; and
(B) a compound of the formula:

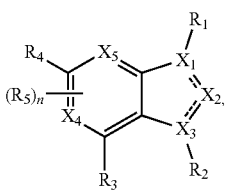

wherein:
n is 0, 1, or 2;
$R_1$ is hydrogen or -L$_1$-$R_a$, wherein:
$L_1$ is a covalent bond, —C(O)—, —S(O)$_2$—, -alkanediyl$_{(C\leq6)}$—C(O)—, substituted-alkanediyl$_{(C\leq6)}$—C(O)—, -alkanediyl$_{(C\leq6)}$—S(O)$_2$—, or substituted -alkanediyl$_{(C\leq6)}$—S(O)$_2$—;
$R_a$ is aryl$_{(C\leq12)}$, heteroaryl$_{(C\leq12)}$, or a substituted version of any of these groups; or
a group of the formula:

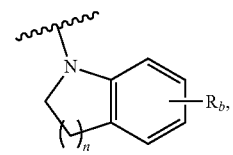

wherein:
n is 1 or 2;
$R_b$ is amino, halo, hydrogen, or hydroxy; or alkyl$_{(C\leq12)}$, alkylamino$_{(C\leq12)}$, dialkylamino$_{(C\leq12)}$, alkoxy$_{(C\leq12)}$, or a substituted version of any of these groups;
$R_2$ is hydrogen or —Li—$R_a$, wherein:
$L_1$ is a covalent bond, C (O)—, —S(O)$_2$—, -alkanediyl$_{(C\leq6)}$—C(O)—, substituted-alkanediyl$_{(C\leq6)}$—C(O)—, -alkanediyl$_{(C\leq6)}$—S(O)$_2$—, or substituted -alkanediyl$_{(C\leq6)}$—S(O)$_2$—;
$R_a$ is alkyl$_{(C\leq12)}$, acyl$_{(C\leq12)}$, amido$_{(C\leq12)}$, or a substituted version of any of these groups;
$R_3$ is alkyl$_{(C\leq12)}$, cycloalkyl$_{(C\leq12)}$, heterocycloalkyl$_{(C\leq12)}$, or a substituted version of any of these groups;
$R_4$ is amino, halo, hydrogen, or hydroxy; or alkyl$_{(C\leq12)}$, alkylamino$_{(C\leq12)}$, dialkylamino$_{(C\leq12)}$, alkoxy$_{(C\leq12)}$, —NH-aralkyl$_{(C\leq12)}$, —NH-heteroaralkyl$_{(C\leq12)}$, —O-aralkyl$_{(C\leq12)}$, —O-heteroaralkyl$_{(C\leq12)}$, or a substituted version of any of these groups;
$R_5$ is, in each instance independently, amino, halo, or hydroxy; or alkyl$_{(C\leq12)}$, alkylamino$_{(C\leq12)}$, dialkylamino$_{(C\leq12)}$, alkoxy$_{(C\leq12)}$, or a substituted version of any of these groups; and
$X_1$, $X_2$, $X_3$, $X_4$, and $X_5$ are each independently N or CH;
or a pharmaceutically acceptable salt thereof.

4. The cell culture of claim 3, wherein the cell culture comprises a cell culture medium.

5. The cell culture of claim 3, wherein the cell is a pluripotent stem cell.

6. The composition of claim 1, wherein the compound is further defined as:

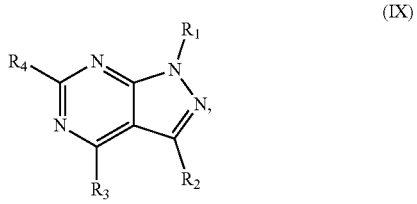
(IX)

wherein:
R$_1$ is hydrogen or -L$_1$-R$_a$, wherein:
L$_1$ is a covalent bond, —C(O)—, —S(O)$_2$—, -alkanediyl$_{(C≤6)}$—C(O)—, substituted-alkanediyl$_{(C≤6)}$—C(O)—, -alkanediyl$_{(C≤6)}$—S(O)$_2$—, or substituted-alkanediyl$_{(C=6)}$—S(O)$_2$—;
R$_a$ is aryl$_{(C≤12)}$, heteroaryl$_{(C≤12)}$, or a substituted version of any of these groups; or a group of the formula:

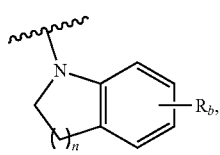

wherein:
n is 1 or 2;
R$_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;
R$_2$ is hydrogen or -L$_1$-R$_a$, wherein:
L$_1$ is a covalent bond, —C(O)—, —S(O)$_2$—, -alkanediyl$_{(C=6)}$—C(O)—, substituted-alkanediyl$_{(C≤6)}$—C(O)—, -alkanediyl$_{(C≤6)}$—S(O)$_2$—, or substituted-alkanediyl$_{(C≤6)}$—S(O)$_2$;
R$_a$ is alkyl$_{(C≤12)}$, acyl$_{(C≤12)}$, amido$_{(C≤12)}$, or a substituted version of any of these groups;
R$_3$ is alkyl$_{(C≤12)}$, cycloalkyl$_{(C≤12)}$, heterocycloalkyl$_{(C≤12)}$, or a substituted version of any of these groups; and
R$_4$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups;

or a pharmaceutically acceptable salt of either of these formulae.

7. The composition of claim 1, wherein the compound is further defined as:

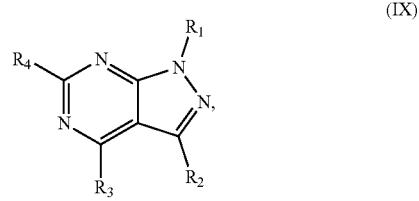
(IX)

wherein:
R$_1$ is hydrogen or —Li—R$_a$, wherein:
L$_1$ is a covalent bond, —C(O)—, —S(O)$_2$—, -alkanediyl$_{(C≤6)}$—C(O)—, substituted -alkanediyl$_{(C≤6)}$—C(O)—, -alkanediyl$_{(C≤6)}$—S(O)$_2$—, or substituted-alkanediyl$_{(C≤6)}$—S(O)$_2$—;
R$_a$ is aryl$_{(C≤12)}$, heteroaryl$_{(C≤12)}$, or a substituted version of any of these groups; or a group of the formula:

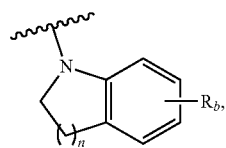

wherein:
n is 1 or 2;
R$_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;
R$_2$ is hydrogen or -L$_1$-R$_a$, wherein:
L$_1$ is a covalent bond, —C(O)—, —S(O)$_2$—, -alkanediyl$_{(C≤6)}$—C(O)—, substituted-alkanediyl$_{(C≤6)}$—C(O)—, -alkanediyl$_{(C≤6)}$—S(O)$_2$—, or substituted-alkanediyl$_{(C≤6)}$—S(O)$_2$—;
R$_a$ is alkyl$_{(C≤12)}$, acyl$_{(C≤12)}$, amido$_{(C≤12)}$, or a substituted version of any of these groups;
R$_3$ is alkyl$_{(C≤12)}$, cycloalkyl$_{(C≤12)}$, heterocycloalkyl$_{(C≤12)}$, or a substituted version of any of these groups; and R₄ is amino, halo, hydrogen, or hydroxy; or
alkyl₍C≤12₎, alkylamino₍C≤12₎, dialkylamino₍C≤12₎, alkoxy₍C≤12₎, —NH-aralkyl₍C≤12₎, —NH-heteroaralkyl₍C≤12₎, —O-aralkyl₍C≤12₎, —O-heteroaralkyl₍C≤12₎, or a substituted version of any of these groups;

or a pharmaceutically acceptable salt thereof.

8. The composition of claim 1, wherein R₁ is -L₁-Rₐ.

9. The composition of claim 1, wherein R₂ is -L₁-Rₐ.

10. The composition of claim 1, wherein R₁ is aryl₍C≤12₎ or substituted aryl₍C≤12₎.

11. The composition of claim 1, wherein R₃ is heterocycloalkyl₍C≤12₎ or substituted heterocycloalkyl₍C≤12₎.

12. The composition of claim 1, wherein R₄ is —NH-heteroaralkyl₍C≤12₎ or substituted-NH-heteroaralkyl₍C≤12₎.

13. The composition of claim 1, wherein the compound is further defined as:

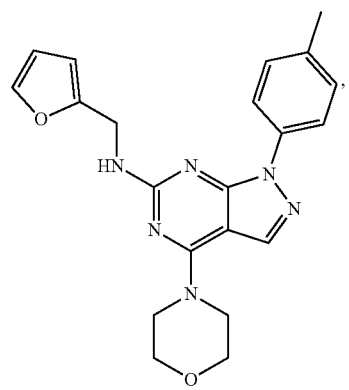

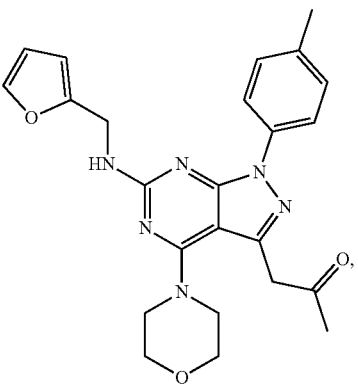

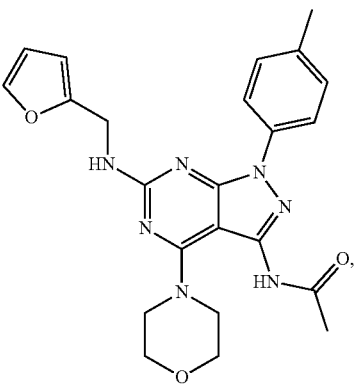

-continued

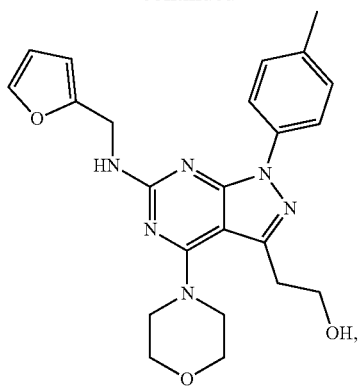

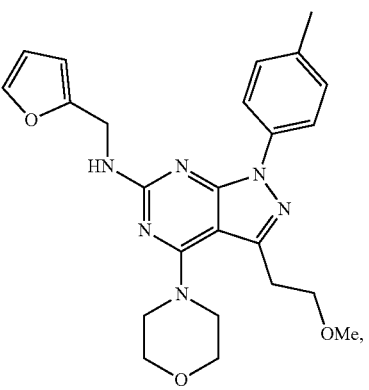

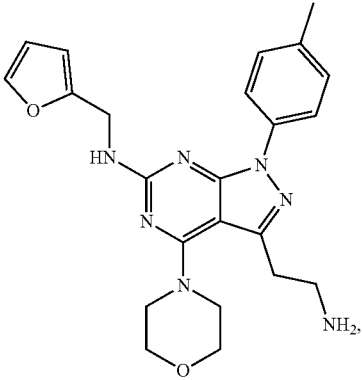

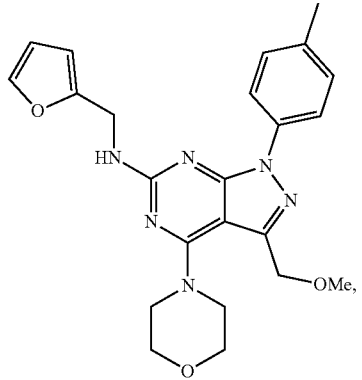

93

-continued

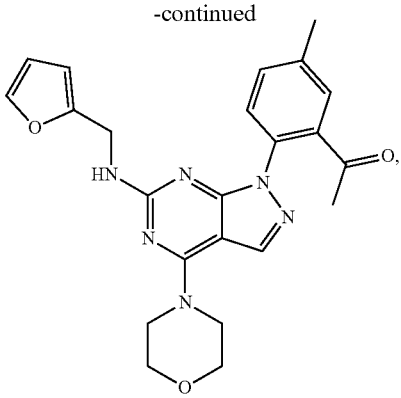

or pharmaceutically acceptable salt thereof.

14. A method of treating or preventing a disease or disorder in a patient in need thereof comprising administering to the patient a compound of the formula:

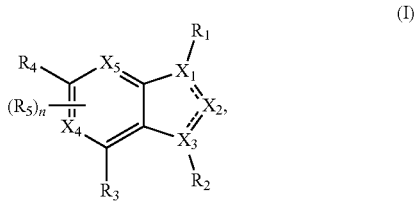

wherein:
n is 0, 1, or 2;
$R_1$ is hydrogen or -$L_1$-$R_a$, wherein:
$L_1$ is a covalent bond, —C(O)—, —S(O)$_2$—, -alkanediyl$_{(C \leq 6)}$—C(O)-substituted-alkanediyl$_{(C \leq 6)}$—C(O)—, -alkanediyl$_{(C \leq 6)}$—S(O)$_2$—, or substituted-alkanediyl$_{(C \leq 6)}$—S(O)$_2$—;
$R_a$ is aryl$_{(C \leq 12)}$, heteroaryl$_{(C \leq 12)}$, or a substituted version of any of these groups; or
a group of the formula:

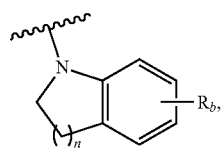

wherein:
n is 1 or 2;
$R_b$ is amino, halo, hydrogen, or hydroxy; or alkyl$_{(C \leq 12)}$, alkylamino$_{(C \leq 12)}$, dialkylamino$_{(C \leq 12)}$, alkoxy$_{(C \leq 12)}$, or a substituted version of any of these groups;
$R_2$ is hydrogen or —Li—$R_a$, wherein:
$L_1$ is a covalent bond, —C(O)—, —S(O)$_2$—, -alkanediyl$_{(C \leq 6)}$—C(O)—, substituted-alkanediyl$_{(C \leq 6)}$—C(O)—, -alkanediyl$_{(C \leq 6)}$—S(O)$_2$—, or substituted-alkanediyl$_{(C=6)}$—S(O)$_2$—;
$R_a$ is alkyl$_{(C \leq 12)}$, acyl$_{(C \leq 12)}$, amido$_{(C \leq 12)}$, or a substituted version of any of these groups;
$R_3$ is alkyl$_{(C \leq 12)}$, cycloalkyl$_{(C \leq 12)}$, heterocycloalkyl$_{(C \leq 12)}$, or a substituted version of any of these groups;

94

$R_4$ is amino, halo, hydrogen, or hydroxy; or
alkyl$_{(C \leq 12)}$, alkylamino$_{(C \leq 12)}$, dialkylamino$_{(C \leq 12)}$, alkoxy$_{(C \leq 12)}$, —NH-aralkyl$_{(C \leq 12)}$, —NH-heteroaralkyl$_{(C \leq 12)}$, —O-aralkyl$_{(C \leq 12)}$, —O-heteroaralkyl$_{(C \leq 12)}$, or a substituted version of any of these groups;
$R_5$ is, in each instance independently, amino, halo, or hydroxy; or
alkyl$_{(C \leq 12)}$, alkylamino$_{(C \leq 12)}$, dialkylamino$_{(C \leq 12)}$, alkoxy$_{(C \leq 12)}$, or a substituted version of any of these groups; and
$X_1$, $X_2$, $X_3$, $X_4$, and $X_5$ are each independently N or CH;
or a pharmaceutically acceptable salt thereof.

15. The method of claim 14, wherein the disease or disorder is associated with a misregulation of germ cell nuclear factor (GCNF).

16. The method of claim 14, wherein the disease or disorder is cancer.

17. The method of claim 14, wherein the compound is further defined as:

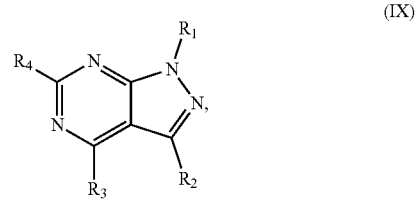

wherein:
$R_1$ is hydrogen or -$L_1$-$R_a$, wherein:
$L_1$ is a covalent bond, —C(O)—, —S(O)$_2$—, -alkanediyl$_{(C \leq 6)}$—C(O)—, substituted-alkanediyl$_{(C \leq 6)}$—C(O)—, -alkanediyl$_{(C \leq 6)}$—S(O)$_2$—, or substituted-alkanediyl$_{(C \leq 6)}$—S(O)$_2$—;
$R_a$ is aryl$_{(C \leq 12)}$, heteroaryl$_{(C \leq 12)}$, or a substituted version of any of these groups; or
a group of the formula:

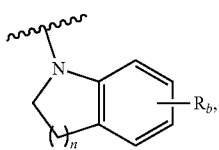

wherein:
n is 1 or 2;
$R_b$ is amino, halo, hydrogen, or hydroxy; or alkyl$_{(C≤12)}$, alkylamino$_{(C≤12)}$, dialkylamino$_{(C≤12)}$, alkoxy$_{(C≤12)}$, or a substituted version of any of these groups;

R$_2$ is hydrogen or —L$_1$—R$_a$, wherein:

L$_1$ is a covalent bond, —C(O)—, —S(O)$_2$—, -alkanediyl$_{(C≤6)}$—C(O)—, substituted-alkanediyl$_{(C≤6)}$—C(O)—, -alkanediyl$_{(C≤6)}$—S(O)$_2$—, or substituted-alkanediyl$_{(C=6)}$—S(O)$_2$—;

R$_a$ is alkyl$_{(C≤12)}$, acyl$_{(C≤12)}$, amido$_{(C≤12)}$, or a substituted version of any of these groups;

R$_3$ is alkyl$_{(C≤12)}$, cycloalkyl$_{(C≤12)}$, heterocycloalkyl$_{(C≤12)}$, or a substituted version of any of these groups; and R$_4$ is amino, halo, hydrogen, or hydroxy; or alkyl$_{(C≤12)}$, alkylamino (C_12), dialkylamino$_{(C≤12)}$, alkoxy$_{(C≤12)}$, —NH-aralkyl$_{(C≤12)}$, —NH-heteroaralkyl$_{(C≤12)}$, —O-aralkyl$_{(C≤12)}$, —O-heteroaralkyl$_{(C≤12)}$, or a substituted version of any of these groups;

or a pharmaceutically acceptable salt of either of these formulae.

18. The method of claim 14, wherein the compound is further defined as:

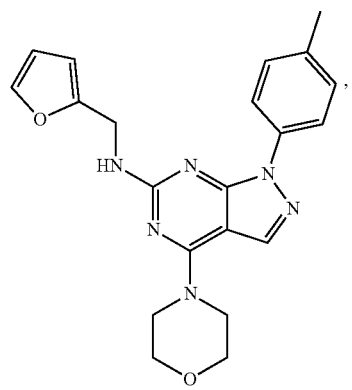

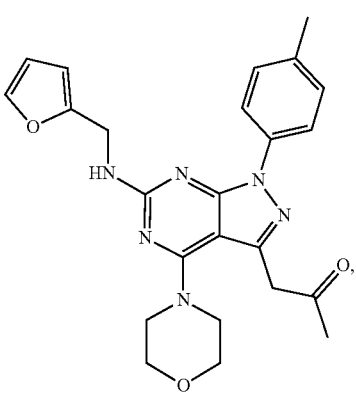

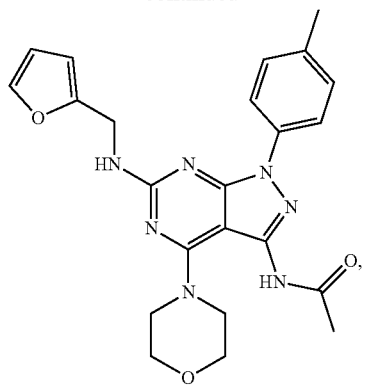

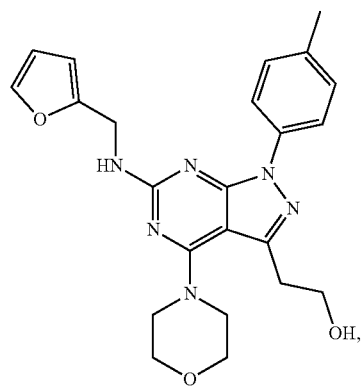

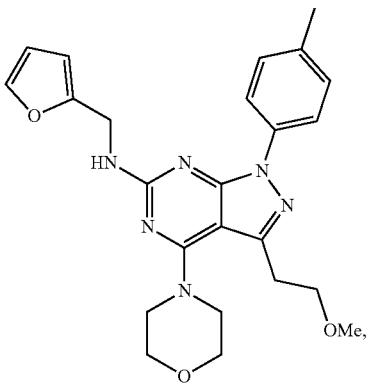

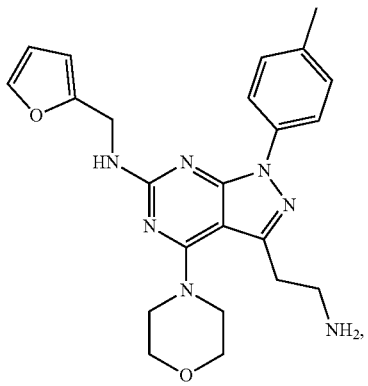

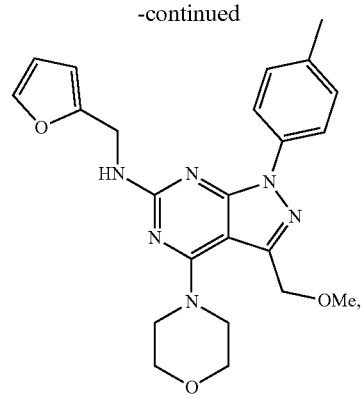
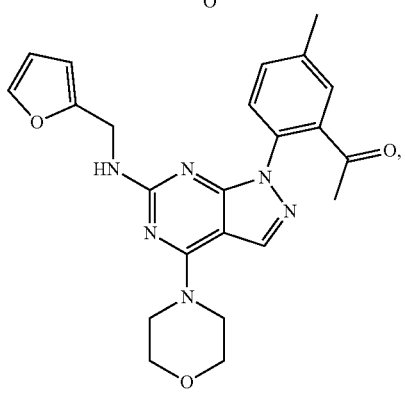
or pharmaceutically acceptable salt thereof.
* * * * *

SEQUENCE LISTING

<160> NUMBER OF SEQ ID NOS: 4

<210> SEQ ID NO 1
<211> LENGTH: 22
<212> TYPE: PRT
<213> ORGANISM: Artificial sequence
<220> FEATURE:
<223> OTHER INFORMATION: Synthetic peptide

<400> SEQUENCE: 1

Arg Thr His Leu Ile Thr Leu Ala Asp His Ile Cys Gln Ile Ile Thr
1               5                   10                  15

Gln Asp Phe Ala Arg Asn
            20

<210> SEQ ID NO 2
<211> LENGTH: 23
<212> TYPE: PRT
<213> ORGANISM: Artificial sequence
<220> FEATURE:
<223> OTHER INFORMATION: Synthetic peptide

<400> SEQUENCE: 2

Asp Pro Ala Ser Asn Leu Gly Leu Glu Asp Ile Ile Arg Lys Ala Leu
1               5                   10                  15

Met Gly Ser Phe Asp Asp Lys
            20

<210> SEQ ID NO 3
<211> LENGTH: 23
<212> TYPE: PRT
<213> ORGANISM: Artificial sequence
<220> FEATURE:
<223> OTHER INFORMATION: Synthetic peptide

<400> SEQUENCE: 3

Gly His Gln Arg Val Val Thr Leu Ala Gln His Ile Ser Glu Val Ile
1               5                   10                  15

Thr Gln Asp Tyr Thr Arg His
            20

<210> SEQ ID NO 4
<211> LENGTH: 23
<212> TYPE: PRT
<213> ORGANISM: Artificial sequence
<220> FEATURE:
<223> OTHER INFORMATION: Synthetic peptide

<400> SEQUENCE: 4

His Ala Ser Thr Asn Met Gly Leu Glu Ala Ile Ile Arg Lys Ala Leu
1               5                   10                  15

Met Gly Lys Tyr Asp Gln Trp
            20